(12) United States Patent
Tamaki

(10) Patent No.: US 12,452,555 B2
(45) Date of Patent: Oct. 21, 2025

(54) SOLID-STATE IMAGING ELEMENT

(71) Applicant: SONY SEMICONDUCTOR SOLUTIONS CORPORATION, Kanagawa (JP)

(72) Inventor: Ryo Tamaki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/577,821

(22) PCT Filed: Jan. 31, 2022

(86) PCT No.: PCT/JP2022/003521
§ 371 (c)(1),
(2) Date: Jan. 9, 2024

(87) PCT Pub. No.: WO2023/007772
PCT Pub. Date: Feb. 2, 2023

(65) Prior Publication Data
US 2024/0323554 A1    Sep. 26, 2024

(30) Foreign Application Priority Data
Jul. 26, 2021 (JP) .................. 2021-121209

(51) Int. Cl.
*H04N 25/616* (2023.01)
*H04N 25/709* (2023.01)
*H04N 25/78* (2023.01)

(52) U.S. Cl.
CPC ......... *H04N 25/616* (2023.01); *H04N 25/709* (2023.01); *H04N 25/78* (2023.01)

(58) Field of Classification Search
CPC .... H04N 25/616; H04N 25/709; H04N 25/78; H10F 39/803
See application file for complete search history.

(56) References Cited

U.S. PATENT DOCUMENTS

| | | | |
|---|---|---|---|
| 10,070,090 B2 * | 9/2018 | Mo ...................... | H04N 25/771 |
| 2023/0188867 A1 * | 6/2023 | Asakura ............... | H04N 25/771 |
| | | | 348/308 |

(Continued)

FOREIGN PATENT DOCUMENTS

| | | |
|---|---|---|
| JP | 2009-038772 A | 2/2009 |
| JP | 2019-057873 A | 4/2019 |
| WO | 2013/084408 A1 | 6/2013 |

OTHER PUBLICATIONS

International Search Report and Written Opinion of PCT Application No. PCT/JP2022/003521, issued on Apr. 5, 2022, 10 pages of ISRWO.

(Continued)

*Primary Examiner* — Shahbaz Nazrul
(74) *Attorney, Agent, or Firm* — CHIP LAW GROUP

(57) ABSTRACT

Image quality is improved by a solid-state imaging element that performs exposure at the same time with all pixels. A previous-stage circuit generates a predetermined reset level and a signal level in accordance with the amount of exposure in order and causes each of first and second capacitance elements to hold the predetermined reset level and the signal level. A selection circuit performs control of connecting one of the first and second capacitance elements to a predetermined next stage node, control of disconnecting both the first and second capacitance elements from the next stage node, and control of connecting the other one of the first and second capacitance elements to the next-stage node in order. A next-stage reset transistor initializes a level of the next-stage node when both the first and second capacitance elements are disconnected from the next-stage node. A next-stage circuit reads and outputs the reset level and the signal level from the first and second capacitance elements in order via the next-stage node.

17 Claims, 48 Drawing Sheets

(56) References Cited

U.S. PATENT DOCUMENTS

| | | | |
|---|---|---|---|
| 2024/0397239 A1* | 11/2024 | Asakura | H04N 25/78 |
| 2024/0414450 A1* | 12/2024 | Yoshita | H04N 25/532 |
| 2024/0414452 A1* | 12/2024 | Asakura | H04N 25/77 |
| 2025/0113114 A1* | 4/2025 | Okada | H04N 25/75 |
| 2025/0126375 A1* | 4/2025 | Kumagai | H10F 39/8037 |
| 2025/0150730 A1* | 5/2025 | Nakazawa | H04N 25/65 |

OTHER PUBLICATIONS

Lee, et al., "A 2.1e-Temporal Noise and -105dB Parasitic Light Sensitivity Backside-Illuminated 2.3 μm-Pixel Voltage-Domain Global Shutter CMOS Image Sensor Using High-Capacity DRAM Capacitor Technology", (ISSCC), International Solid-State Circuits Conference, 2020.

* cited by examiner

Fig. 38

| OPERATION | NOISE | RN (μVrms) | | REMARKS |
|---|---|---|---|---|
| | | FIRST EMBODIMENT | SEVENTH EMBODIMENT | |
| GLOBAL SHUTTER | PIXEL kTC NOISE | 450 | 450 | SH CAPACITANCE 50 fF |
| SEQUENTIAL READING | NOISE IN PREVIOUS-STAGE SF | 380 | 0 | — |
| | NOISE IN AND AFTER NEXT-STAGE SF | 160 | 160 | INCLUDING ADC NOISE |
| TOTAL | | 610 | 478 | — |

SOLID-STATE IMAGING ELEMENT

CROSS REFERENCE TO RELATED APPLICATIONS

This application is a U.S. National Phase of International Patent Application No. PCT/JP2022/003521 filed on Jan. 31, 2022, which claims priority benefit of Japanese Patent Application No. JP 2021-121209 filed in the Japan Patent Office on Jul. 26, 2021. Each of the above-referenced applications is hereby incorporated herein by reference in its entirety.

TECHNICAL FIELD

The present technique relates to a solid-state imaging element. Specifically, the present technique relates to a solid-state imaging element that performs analog-to-digital (AD) conversion for each column.

BACKGROUND ART

Conventionally, a column analog-to-digital converter (ADC) scheme of disposing an ADC for each of columns outside a pixel array unit and reading a pixel signal in order from each of rows is used for the purpose of miniaturizing pixels in a solid-state imaging element. If exposure is performed by a rolling shutter scheme in which exposure is started in order for each row in the column ADC scheme, there is a concern that rolling shutter strain may occur. Thus, in order to realize a global shutter scheme in which exposure is started at the same time for all pixels, a solid-state imaging element including a pair of capacitances for each pixel and causing the capacitances to hold a reset level and a signal level has been proposed (see NPL 1, for example). These pair of capacitances are connected in series to a source follower circuit via a node, and the source follower circuit reads the reset level and the signal level in order.

CITATION LIST

Non Patent Literature

[NPL 1]
Jae-kyu Lee, et al., A 2.1e-Temporal Noise and −105 dB Parasitic Light Sensitivity Backside-Illuminated 2.3 µm-Pixel Voltage-Domain Global Shutter CMOS Image Sensor Using High-Capacity DRAM Capacitor Technology, ISSCC 2020.

SUMMARY

Technical Problem

The aforementioned conventional technique realizes the global shutter scheme on the basis of the column ADC scheme by causing a pair of capacitances to hold a reset level and a signal level for each pixel. However, illuminance may be degraded due to an electric charge overflowing from a photoelectric conversion element and a black spot phenomenon of black sinking may occur when light with very high illuminance is incident on the pixels in the aforementioned circuit. There is a problem that the image quality of image data becomes degraded due to the black point phenomenon.

The present technique was produced in view of such circumstances, and an object thereof is to improve image quality of a solid-state imaging element that performs exposure at the same time for all the pixels.

Solution to Problem

The present technique was made in order to solve the aforementioned problem, and a first aspect thereof is a solid-state imaging element including: first and second capacitance elements; a previous-stage circuit that generates a predetermined reset level and a signal level in accordance with an amount of exposure in order and causes the first and second capacitance elements to hold the predetermined reset level and the signal level: a next-stage reset transistor that initializes a level of a next-stage node connected to any one of the first and second capacitance element to a predetermined potential that is lower than a power source voltage of the previous-stage circuit; a next-stage circuit that reads the reset level and the signal level via the next stage node and outputs the reset level and the signal level to a vertical signal line; a reference voltage generation circuit that generates a reference voltage with reference to the predetermined potential; and a comparator that compares the reference voltage and a potential of the vertical signal line. This leads to an effect that black spot phenomenon detection accuracy is improved.

Also, in the first aspect, the reference voltage generation circuit may include a current source that supplies a predetermined reference current, a predetermined number of resistors that are connected in series between the current source and the node of the predetermined potential, a bias selection unit that selects, as a bias voltage, a voltage of any one of connection nodes of each of the current source, the predetermined number of resistors, and the node of the predetermined potential, and a source follower circuit that generates the reference voltage from the bias voltage. This leads to an effect that a reference voltage with reference to a predetermined potential is generated.

Also, in the first aspect, the reference voltage generation circuit may include a variable current source that supplies a current in accordance with a control signal as a reference current, a resistor that is inserted between the variable current source and the node of the predetermined potential, and a source follower circuit that generates the reference voltage from a bias voltage of a connection node of the variable current source and the resistor. This leads to an effect that a reference voltage with reference to a predetermined potential is generated.

Also, in the first aspect, a sampling transistor that opens and closes a path between the previous-stage circuit and a connection node to which one end of each of the first and second capacitance elements is commonly connected may be further included, and the other end of the second capacitance element may be connected to the next-stage node. This leads to an effect that the number of transistors for each pixel is reduced.

Also, in the first aspect, a selection circuit that performs control of connecting one of the first and second capacitance elements to a predetermined next-stage node, control of disconnecting both the first and second capacitance elements from the next-stage node, and control of connecting the other one of the first and second capacitance elements to the next-stage node in order may be further included, and the next-stage reset transistor may initialize a level of the next-stage node when both the first and second capacitance elements are disconnected from the next-stage node. This leads to an effect that kTC noise is reduced.

Also, in the first aspect, a previous-stage selection transistor that opens and closes a path between the previous-stage circuit and a predetermined previous-stage node and a previous-stage reset transistor that initializes a level of the previous-stage node may be further included, one end of each of the first and second capacitance elements may be commonly connected to the previous-stage node, and the other end of each of the first and second capacitance elements may be connected to the selection circuit. This leads to an effect that noise from the previous-stage circuit is blocked.

Also, in the first aspect, the previous-stage circuit may include a photoelectric conversion element, a previous-stage transfer transistor that transfers an electric charge from the photoelectric conversion element to a floating diffusion layer, a first reset transistor that initializes the floating diffusion layer, and a previous-stage amplification transistor that amplifies a voltage of the floating diffusion layer and outputs the voltage to a predetermined previous-stage node, and one end of each of the first and second capacitance elements may be commonly connected to the previous-stage node, and the other end of each of the first and second capacitance elements may be connected to the selection circuit. This leads to an effect that a signal in accordance with a potential of the floating diffusion layer is supplied to the previous-stage node.

Also, in the first aspect, a switching unit that adjusts a source voltage to be supplied to a source of the previous-stage amplification transistor may be further included, the previous-stage circuit may further include a current source transistor that is connected to a drain of the previous-stage amplification transistor, and the current source transistor may transition from an ON state to an OFF state after an end of an exposure period. This leads to an effect that an off state is achieved during reading of the previous-stage source follower.

Also, in the first aspect, the previous-stage circuit may further include a discharge transistor that discharges the electric charge from the photoelectric conversion element. This leads to an effect that the photoelectric conversion element is initialized.

Also, in the first aspect, a control circuit that controls a reset power source voltage of the previous-stage circuit may be further included, the first reset transistor may initialize a voltage of a floating diffusion layer to the reset power source voltage, and the control circuit may change, in a reading period for reading the reset level and the signal level, the reset power source voltage to a voltage that is different from a voltage in an exposure period. This leads to an effect that sensitivity non-uniformity is improved.

Also, in the first aspect, a digital signal processing unit that adds a pair of continuous frames may be further included, and the previous-stage circuit may cause one of the first and second capacitance elements to hold the reset level and then cause the other one of the first and second capacitance elements to hold the signal level during an exposure period of one of the pair of frames, and may cause the other one of the first and second capacitance elements to hold the reset level and then cause the one of the first and second capacitance elements to hold the signal level during an exposure period of the other one of the pair of frames. This leads to an effect that sensitivity non-uniformity is improved.

Also, in the first aspect, the comparator may include a comparison machine that compares each of levels of a pair of input terminals and outputs a comparison result, and an input-side selector that selects any one of the vertical signal line and a node of the reference voltage and connects the selected one to one of the pair of input terminals, and a ramp signal may be input to the one of the pair of input terminals. This leads to an effect that a black spot phenomenon is curbed.

Also, in the first aspect, a control circuit that determines whether or not an illuminance is higher than a predetermined value on the basis of the comparison result and outputs a control signal, a counter that counts a count value over a period until the comparison result is inverted and outputs the digital signal indicating the count value, a correlated double sampling (CDS) processing unit that executes correlated double sampling processing on the digital signal, and an output-side selector that outputs any one of the digital signal on which the correlated double sampling processing has been executed and a digital signal of a predetermined value on the basis of the control signal may be further included. This leads to an effect that a black spot phenomenon is curbed.

Also, in the first aspect, a vertical scanning circuit that controls a plurality of rows in each of which a predetermined number of pixels are aligned and performs control of starting exposure at the same time may be further included, and the first and second capacitance elements, the previous-stage circuit, the selection circuit, the next-stage reset transistor, and the next-stage circuit may be arranged in each of the pixels. This provides an effect that the miniaturization of the pixel is facilitated.

Also, in the first aspect, the previous-stage circuit may be provided on a first chip, and the first and second capacitance elements, the selection circuit, the next-stage reset transistor, and the next-stage circuit may be provided on a second chip. This provides an effect that the miniaturization of the pixel is facilitated.

Also, in the first aspect, the comparator may be provided on the second chip. This provides an effect that the miniaturization of the pixel is facilitated.

Also, in the first aspect, the comparator may be provided on a third chip. This provides an effect that the miniaturization of the pixel is facilitated.

BRIEF DESCRIPTION OF DRAWINGS

FIG. 38 is a diagram for explaining effects according to the seventh embodiment of the present technique.

DESCRIPTION OF EMBODIMENTS

Modes for carrying out the present technique (hereinafter also referred to as "embodiments") will be described below. The description will be given in the following order.

1. First embodiment (example in which first and second capacitance elements are caused to hold pixel signals)

2. Second embodiment (example in which discharge transistor is added and first and second capacitance elements are caused to hold pixel signals)
3. Third embodiment (example in which first and second capacitance elements are caused to hold pixel signals and reset power source voltage is controlled)
4. Fourth embodiment (example in which first and second capacitance elements are caused to hold pixel signals and levels of holding are switched for each frame)
5. Fifth embodiment (example in which first and second capacitance elements are caused to hold pixel signals and black spot phenomenon is curbed)
6. Sixth embodiment (example in which first and second capacitance elements are caused to hold pixel signals and rolling shutter operation is performed)
7. Seventh embodiment (example in which first and second capacitance elements are caused to hold pixel signals and previous-stage source follower is brought into off state during reading)
8. Eighth embodiment (example in which first and second capacitance elements are caused to hold pixel signals and reference voltage with reference to predetermined potential that is lower than power source voltage is generated)
9. Exemplary application to moving body 1. First Embodiment

[Configuration Example of Imaging Device]

Figure 1:
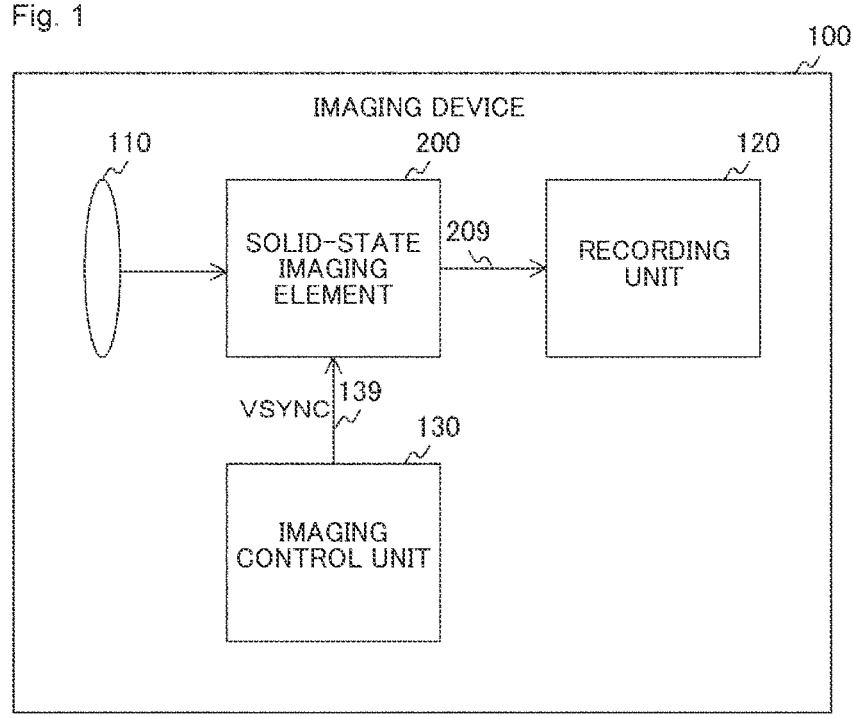
FIG. 1 is a block diagram showing a configuration example of an imaging device according to a first embodiment of the present technology.

FIG. 1 is a block diagram showing a configuration example of an imaging device 100 according to a first embodiment of the present technique. The imaging device 100 is a device capturing image data and includes an imaging lens 110, a solid-state imaging element 200, a recording unit 120, and an imaging control unit 130. As the imaging device 100, a digital camera or an electronic device equipped with an imaging function (a smartphone, a personal computer, or the like) is assumed.

The solid-state imaging element 200 captures image data under the control of the imaging control unit 130. The solid-state imaging element 200 supplies the image data to the recording unit 120 via a signal line 209.

The imaging lens 110 collects light and guides it to the solid-state imaging element 200. The imaging control unit 130 controls the solid-state imaging element 200 to capture the image data. The imaging control unit 130 supplies, for example, an imaging control signal including a vertical synchronization signal VSYNC to the solid-state imaging element 200 via a signal line 139. The recording unit 120 records the image data.

Here, the vertical synchronization signal VSYNC is a signal indicating timing of imaging, and a periodic signal having a constant frequency (60 hertz, etc.) is used for the vertical synchronization signal VSYNC.

Also, although the imaging device 100 records the image data, the image data may be transmitted to the outside of the imaging device 100. In this case, an external interface for transmitting the image data is further provided. Alternatively, the imaging device 100 may further display the image data. In this case, a display unit is further provided.

[Configuration Example of Solid-State Imaging Element]

Figure 2:
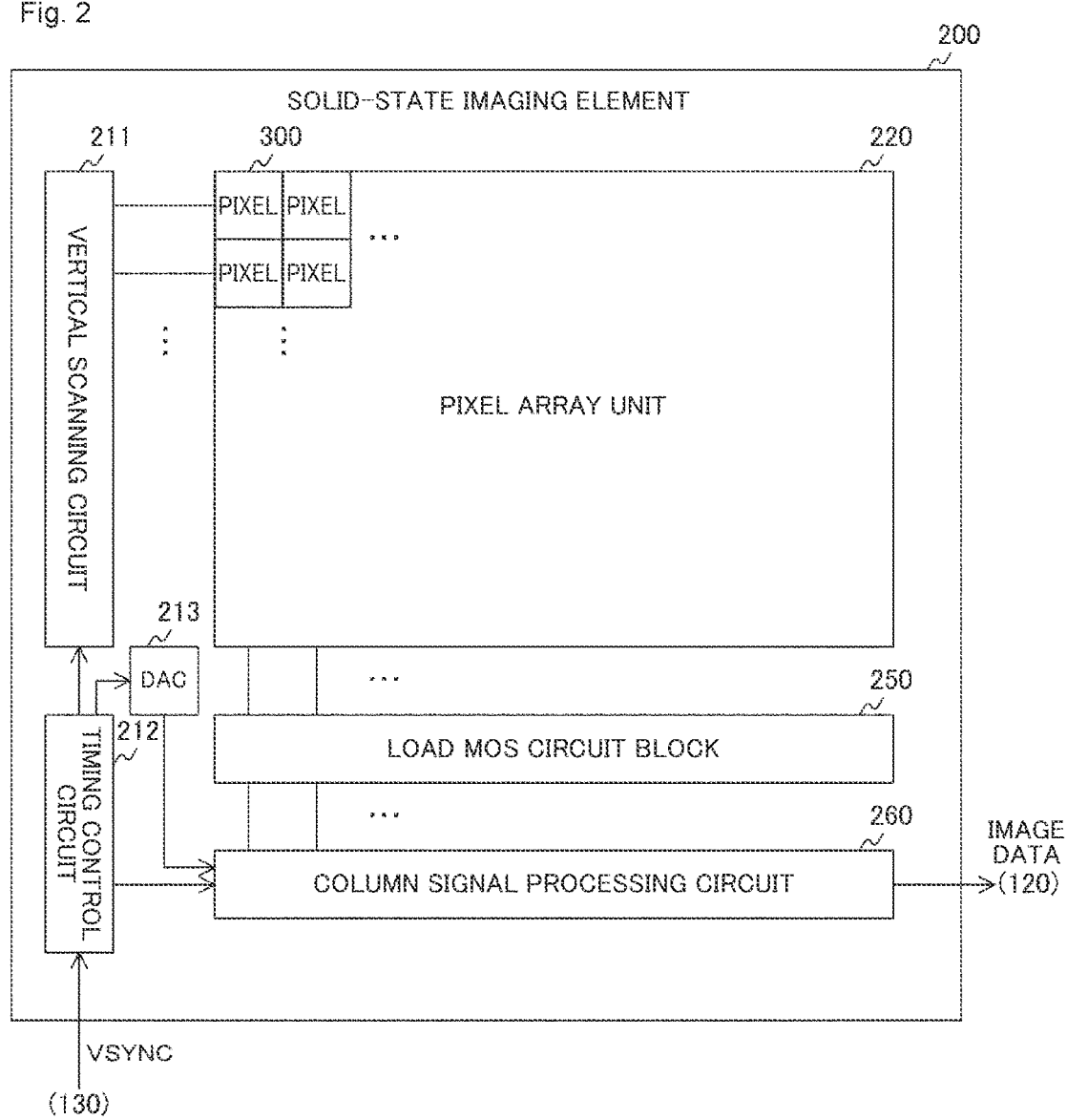
FIG. 2 is a block diagram showing a configuration example of a solid-state imaging element according to the first embodiment of the present technique.

FIG. 2 is a block diagram illustrating a configuration example of the solid-state imaging element 200 according to the first embodiment of the present technique. The solid-state imaging element 200 includes a vertical scanning circuit 211, a pixel array unit 220, a timing control circuit 212, a digital-to-analog converter (DAC) 213, a load MOS circuit block 250, and a column signal processing circuit 260. A plurality of pixels 300 are arranged in a two-dimensional grid pattern in the pixel array unit 220. Also, each circuit inside the solid-state imaging element 200 is provided on a single semiconductor chip, for example.

Hereinafter, a set of pixels 300 arranged in a horizontal direction will be referred to as a "row", and a set of pixels 300 arranged in a direction perpendicular to the row will be referred to as a "column".

The timing control circuit 212 controls operation timing of the vertical scanning circuit 211, the DAC 213, and the column signal processing circuit 260 in synchronization with the vertical synchronization signal VSYNC from the imaging control unit 130.

The DAC 213 generates a ramp signal with a sawtooth wave shape through digital-to-analog (DA) conversion. The DAC 213 supplies the generated ramp signal to the column signal processing circuit 260.

The vertical scanning circuit 211 selects and drives rows in order and outputs analog pixel signals. The pixels 300 photoelectrically convert incident light to generate the analog pixel signals. The pixels 300 supply the pixel signals to the column signal processing circuit 260 via the load MOS circuit block 250.

The load MOS circuit block 250 is provided with MOS transistors that supply a constant current for each column.

The column signal processing circuit 260 executes signal processing such as AD conversion processing and CDS processing on a pixel signal for each column. The column signal processing circuit 260 supplies image data including the processed signals to the recording unit 120. Also, the column signal processing circuit 260 is an example of the signal processing circuit described in the claims.

[Configuration Example of Pixel]

Figure 3:
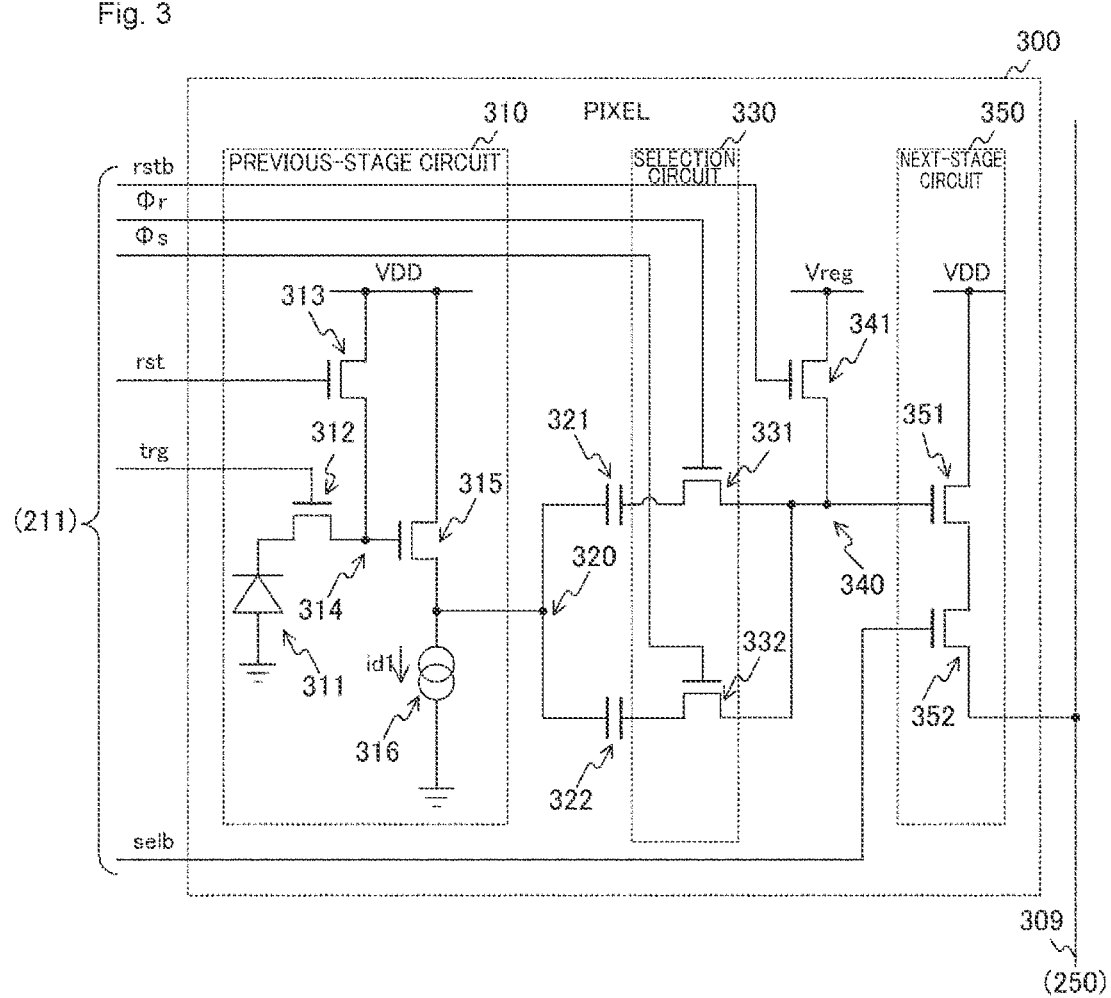
FIG. 3 is a circuit diagram showing a configuration example of a pixel according to the first embodiment of the present technique.

FIG. 3 is a circuit diagram showing a configuration example of the pixel 300 according to the first embodiment of the present technique. The pixel 300 includes a previous-stage circuit 310, capacitance elements 321 and 322, a selection circuit 330, a next-stage reset transistor 341, and a next-stage circuit 350.

The previous-stage circuit 310 includes a photoelectric conversion element 311, a transfer transistor 312, a floating diffusion (FD) reset transistor 313, an FD 314, a previous-stage amplification transistor 315, and a current source transistor 316.

The photoelectric conversion element 311 generates an electric charge by photoelectric conversion. The transfer transistor 312 transfers an electric charge from the photoelectric conversion element 311 to the FD 314 in accordance with a transfer signal trg from the vertical scanning circuit 211.

The FD reset transistor 313 pulls out the electric charge from the FD 314 and performs initialization in accordance with an FD reset signal rst from the vertical scanning circuit 211. The FD 314 accumulates the electric charge and generates a voltage in accordance with the amount of electric charge. The previous-stage amplification transistor 315 amplifies the voltage level of the FD 314 and outputs the voltage to the previous-stage node 320. Note that the FD reset transistor 313 is an example of the first reset transistor described in the claims. Also, the previous-stage amplification transistor 315 is an example of the first amplification transistor described in the claims.

Additionally, the FD reset transistor 313 and a source of the previous-stage amplification transistor 315 are connected to a power source voltage VDD. The current source transistor 316 is connected to a drain of the previous-stage amplification transistor 315. The current source transistor 316 supplies a current id 1 in accordance with control of the vertical scanning circuit 211.

One end of each of the capacitance elements 321 and 322 is commonly connected to the previous-stage node 320, and the other end of each of the capacitance elements 321 and 322 is connected to the selection circuit 330. Note that the capacitance elements 321 and 322 are examples of the first and second capacitance elements described in the claims.

The selection circuit 330 includes a selection transistor 331 and a selection transistor 332. The selection transistor 331 opens and closes a path between the capacitance element 321 and the next-stage node 340 in accordance with a selection signal Φr from the vertical scanning circuit 211. The selection transistor 332 opens and closes a path between the capacitance element 322 and the next-stage node 340 in accordance with a selection signal Φs from the vertical scanning circuit 211.

The next-stage reset transistor 341 initializes the level of the next-stage node 340 to a predetermined potential Vreg in accordance with a next-stage reset signal rstb from the vertical scanning circuit 211. As the potential Vreg, a potential that is different from the power source voltage VDD (for example, a potential that is lower than VDD) is set.

The next-stage circuit 350 includes a next-stage amplification transistor 351 and a next-stage selection transistor 352. The next-stage amplification transistor 351 amplifies the level of the next-stage node 340. The next-stage selection transistor 352 outputs a signal of a level amplified by the next stage amplification transistor 351 as a pixel signal to the vertical signal line 309 in accordance with a next-stage selection signal selb from the vertical scanning circuit 211. Note that the next-stage amplification transistor is an example of the second amplification transistor described in the claims.

Note that n-channel metal oxide semiconductor (nMOS) transistors, for example, are used as various transistors (the transfer transistor 312 and the like) inside the pixel 300.

The vertical scanning circuit 211 supplies the FD reset signal rst and the transfer signal trg in a high level to all the pixels at the time of a start of exposure. In this manner, the photoelectric conversion element 311 is initialized. Hereinafter, this control will be referred to as "PD reset".

Then, the vertical scanning circuit 211 sets the next-stage reset signal rstb and the selection signal Φr in a high level for all the pixels immediately before an end of exposure and supplies the FD reset signal rst in a high level over a pulse period. In this manner, the FD 314 is initialized, and a level in accordance with the level of the FD 314 at that time is held by the capacitance element 321. Hereinafter, this control will be referred to as "FD reset".

The level of the FD 314 at the time of the FD reset and the level corresponding to that level (the level held by the capacitance element 321 or the level of the vertical signal line 309) will be collectively referred to as a "P phase" or a "reset level" below.

The vertical scanning circuit 211 sets the next-stage reset signal rstb and the selection signal Φs for all the pixels at the time of the end of exposure in a high level and supplies the transfer signal trg in a high level over the pulse period. In this manner, a signal electrical charge in accordance with the amount of exposure is transferred to the FD 314, and the level in accordance with the level of the FD 314 at that time is held by the capacitance element 322.

The level of the FD 314 at the time of transfer of the signal electrical charge and the level corresponding to the level at that time (the level held by the capacitance element 322 or the level of the vertical signal line 309) will be collectively referred to as a "D phase" or a "signal level" below.

The exposure control of starting and ending the exposure at the same time for all the pixels in this manner is called a global shutter scheme. The previous-stage circuit 310 of all the pixels generates a reset level and a signal level in order through the exposure control. The reset level is held by the capacitance element 321, and the signal level is held by the capacitance element 322.

The vertical scanning circuit 211 selects a row in order after an end of exposure and causes the reset level and the signal level of the row to be output in order. The vertical scanning circuit 211 sets the FD reset signal rst of the selected row and the next-stage selection signal selb in a high level when the reset level is output and supplies the selection signal Φr in a high level over a predetermined period. In this manner, the capacitance element 321 is connected to the next-stage node 340, and the reset level is read.

The vertical scanning circuit 211 supplies the next-stage reset signal rstb in a high level over the pulse period while keeping the FD reset signal rst and the next-stage selection signal selb of the selected row in a high level after reading the reset level. In this manner, the level of the next-stage node 340 is initialized. At this time, both the selection transistor 331 and the selection transistor 332 are in an open state, and the capacitance elements 321 and 322 are disconnected from the next-stage node 340.

After the initialization of the next-stage node 340, the vertical scanning circuit 211 supplies the selection signal Φs in a high level over a predetermined period while keeping the FD reset signal rst of the selected row and the next-stage selection signal selb in a high level. In this manner, the capacitance element 322 is connected to the next-stage node 340, and the signal level is read.

The selection circuit 330 of the selected row performs control of connecting the capacitance element 321 to the next-stage node 340, control of disconnecting the capacitance elements 321 and 322 from the next-stage node 340, and control of connecting the capacitance element 322 to the next-stage node 340 in order through the aforementioned reading control. In addition, when the capacitance elements 321 and 322 are disconnected from the next-stage node 340, the next-stage reset transistor 341 of the selected row initializes the level of the next-stage node 340. Also, the next-stage circuit 350 of the selected row reads the reset level and the signal level from the capacitance elements 321 and 322 via the next-stage node 340 in order and outputs the reset level and the signal level to the vertical signal line 309.

[Configuration Example of Column Signal Processing Circuit]

Figure 4:
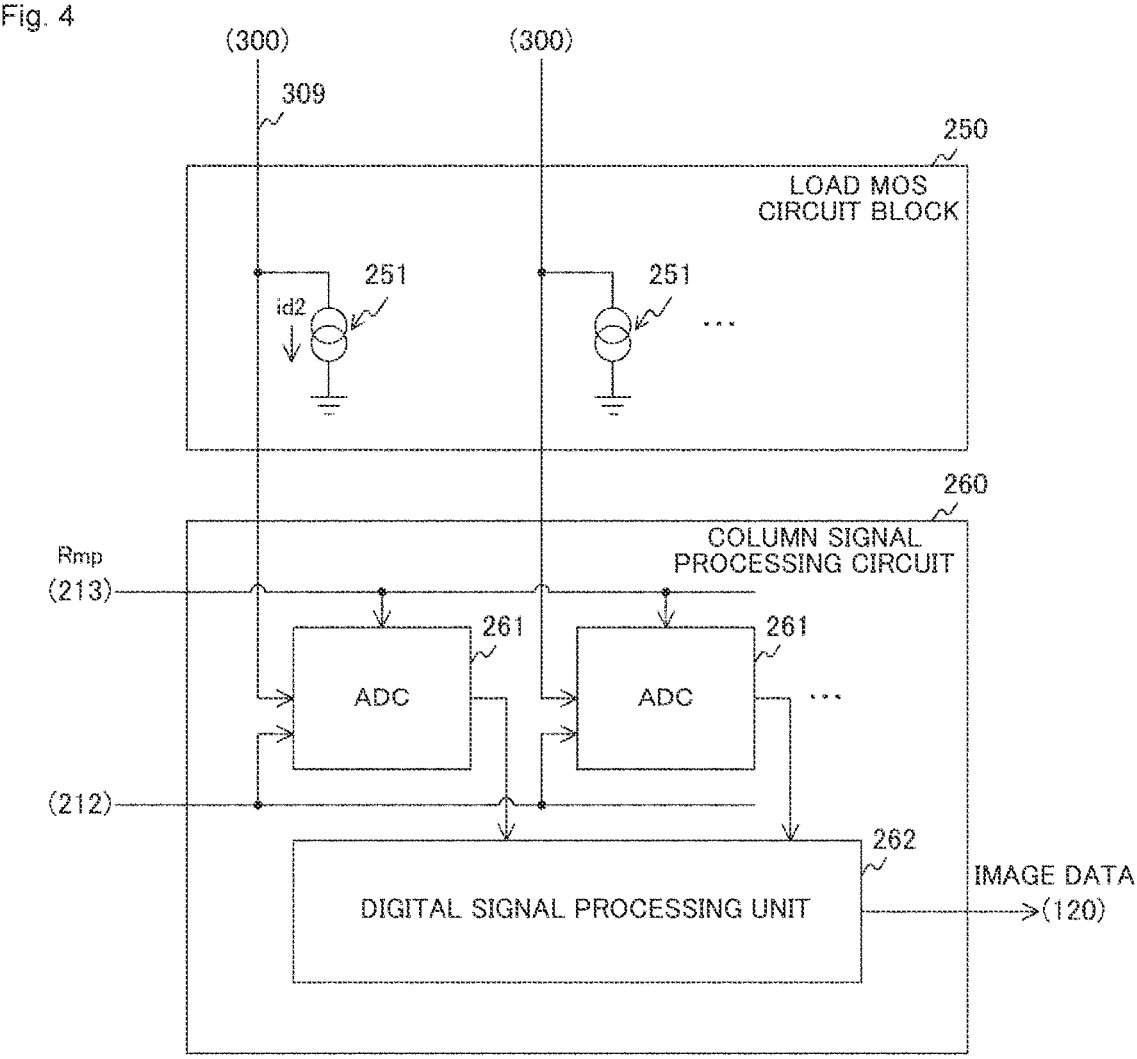
FIG. 4 is a block diagram showing a configuration example of a column signal processing circuit and a load MOS circuit block according to the first embodiment of the present technique.

FIG. 4 is a block diagram showing a configuration example of a load MOS circuit block 250 and a column signal processing circuit 260 according to the first embodiment of the present technique.

The vertical signal line 309 is arranged for each column in the load MOS circuit block 250. If the number of columns is defined as I (I is an integer), I vertical signal lines 309 are arranged. Additionally, the load MOS transistor 251 that supplies a constant current id 2 is connected to each vertical signal line 309.

A plurality of ADCs 261 and a digital signal processing unit 262 are disposed in the column signal processing circuit 260. The ADCs 261 are disposed for each row. When the number of columns is set to I, I ADCs 261 are disposed.

The ADCs 261 convert analog pixel signals from corresponding columns to digital signals by using a ramp signal Rmp from the DAC 213. The ADCs 261 supply the digital signals to the digital signal processing unit 262. For example, single-slope-type ADCs including comparators and counters are disposed as the ADCs 261.

The digital signal processing unit 262 performs predetermined signal processing such as CDS processing on each digital signal for each column. The digital signal processing unit 262 supplies image data including the processed digital signals to the recording unit 120.

[Operation Example of Solid-State Imaging Element]

Figure 5:
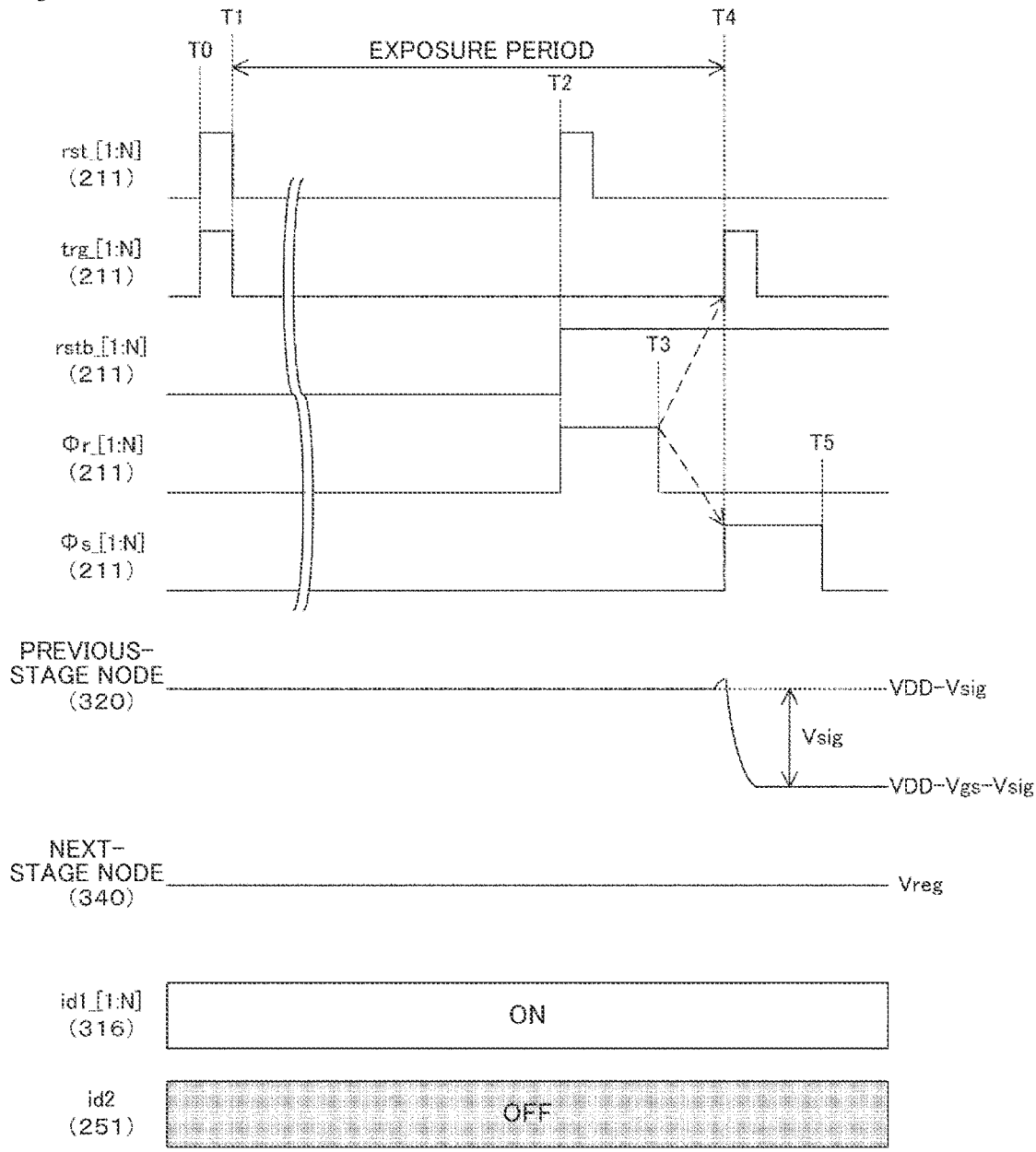
FIG. 5 is a timing chart showing an example of a global shutter operation according to the first embodiment of the present technique.

FIG. 5 is a timing chart showing an example of a global shutter operation according to the first embodiment of the present technique. The vertical scanning circuit 211 supplies the FD reset signal rst and the transfer signal trg in a high level to all the rows (in other words, all the pixels) from the timing T0 immediately before a start of exposure to the timing T1 after elapse of the pulse period. In this manner, all the pixels are PD reset, and exposure is started at the same time for all the rows.

Here, rst_[n] and trg_[n] in the drawing denote signals to the pixels of the n-th row from among N rows. N is an integer indicating the total number of rows, and n is an integer from 1 to N.

Moreover, the vertical scanning circuit 211 sets the next-stage reset signal rstb and the selection signal Φr in a high level for all the pixels at the timing T2 immediately before an end of exposure and supplies the FD reset signal rst in a high level over the pulse period. In this manner, all the pixels are FD-reset, and the reset level is sample-held. Here, rstb_[n] and Φr_[n] in the drawing denote signals to the pixels of the n-th row.

At the timing T3 after the timing T2, the vertical scanning circuit 211 returns the selection signal Φr to a low level.

At the timing T4 after an end of exposure, the vertical scanning circuit 211 sets the next stage reset signal rstb and the selection signal Φs in a high level for all the pixels and supplies the transfer signal trg in a high-level over the pulse period. In this manner, the signal level is sample-held. Additionally, the level of the previous-stage node 320 drops from the reset level (VDD-Vsig) to the signal level (VDD-Vgs-Vsig). Here, VDD is a power source voltage, and Vsig is a net signal level obtained through CDS processing. Vgs is a voltage between a gate and a source of the previous-stage amplification transistor 315. Also, Φs_[n] in the drawing denotes a signal to the pixels of the n-th row.

At the timing T5 after the timing T4, the vertical scanning circuit 211 returns the selection signal Φs to a low level.

In addition, the vertical scanning circuit 211 controls the current source transistors 316 of all rows (all pixels) and causes them to supply a current id1. Here, id1_[n] in the drawing denotes a current of the pixels of the n-th row. Since IR drop increases when the current id is a large current, it is necessary for the current id1 to be in the order of several nanoamperes (nA) to several tens of nanoamperes (nA). On the other hand, the load MOS transistors 251 of all the columns are in an OFF state, and a current id2 is not supplied to the vertical signal line 309.

Figure 6:
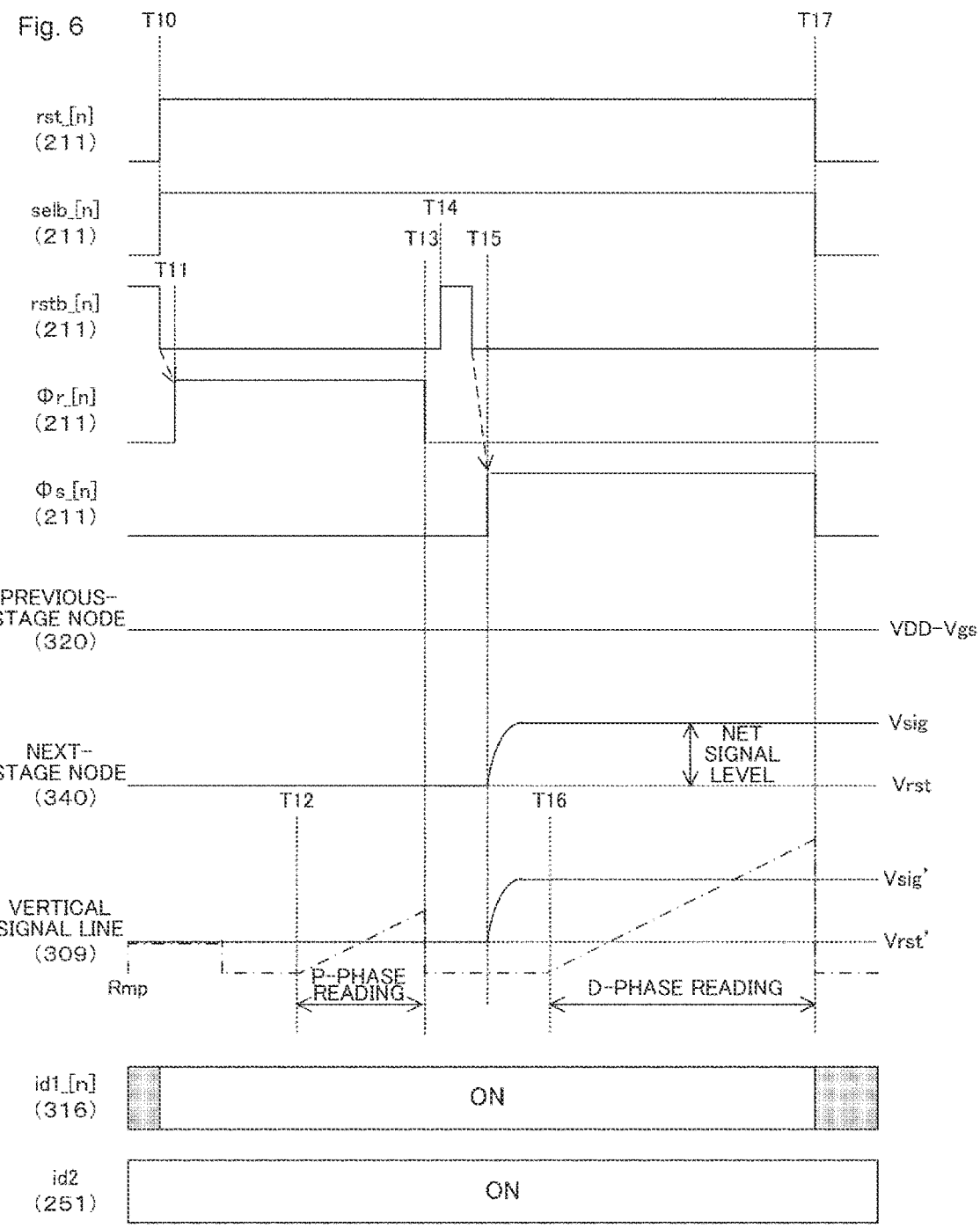
FIG. 6 is a timing chart showing an example of a reading operation according to the first embodiment of the present technique.

FIG. 6 is a timing chart showing an example of a reading operation according to the first embodiment of the present technique. In the n-th row reading period from the timing T10 to the timing T17, the vertical scanning circuit 211 sets the FD reset signal rst of the n-th row and the next-stage selection signal selb in a high level. Also, the next-stage reset signal rstb of all the rows is controlled to a low level during the reading period. Here, selb_[n] in the drawing denotes a signal to the pixels of the n-th row.

The vertical scanning circuit 211 supplies a selection signal Φr in a high level to the n-th row over the period from the timing T11 immediately after the timing T10 to the timing T13. The potential of the next-stage node 340 is in the reset level Vrst.

The DAC 213 gradually raises the ramp signal Rmp over the period from the timing T12 after the timing T11 to the timing T13. The ADC 261 compares the ramp signal Rmp with a level Vrst' of the vertical signal line 309 and counts the count value until the comparison result is inverted. In this manner, a P-phase level (reset level) is read.

Over the pulse period from the timing T14 immediately after the timing T13, the vertical scanning circuit 211 supplies the next-stage reset signal rstb in a high level to the n-th row. It is thus possible to delete the history of the previous signal held by a parasitic capacitance when the parasitic capacitance is present in the next-stage node 340.

Over the period from the timing T15 immediately after the initialization of the next-stage node 340 to the timing T17, the vertical scanning circuit 211 supplies the selection signal Φs in a high level to the n-th row. The potential of the next-stage node 340 is in a signal level Vsig. Although the signal level is lower than the reset level at the time of exposure, the signal level becomes higher than the reset level at the time of reading since the next-stage node 340 is used as a reference. A difference between the reset level Vrst and the signal level Vsig corresponds to a net signal level obtained by deleting reset noise and offset noise of FD.

Over a period from the timing T16 after the timing T15 to the timing T17, the DAC 213 gradually raises the ramp signal Rmp. The ADC 261 compares the ramp signal Rmp with the level Vrst' of the vertical signal line 309 and counts the count value until the comparison result is inverted. In this manner, the D phase level (signal level) is read.

Also, the vertical scanning circuit 211 controls the current source transistor 316 of the n-th row as a target of reading and causes the current source transistor 316 to supply the current id1 over the period from the timing T10 to the timing T17. In addition, the timing control circuit 212 controls the load MOS transistors 251 of all the columns and cause them to supply the current id2 within the reading period of all the rows.

Figure 7:
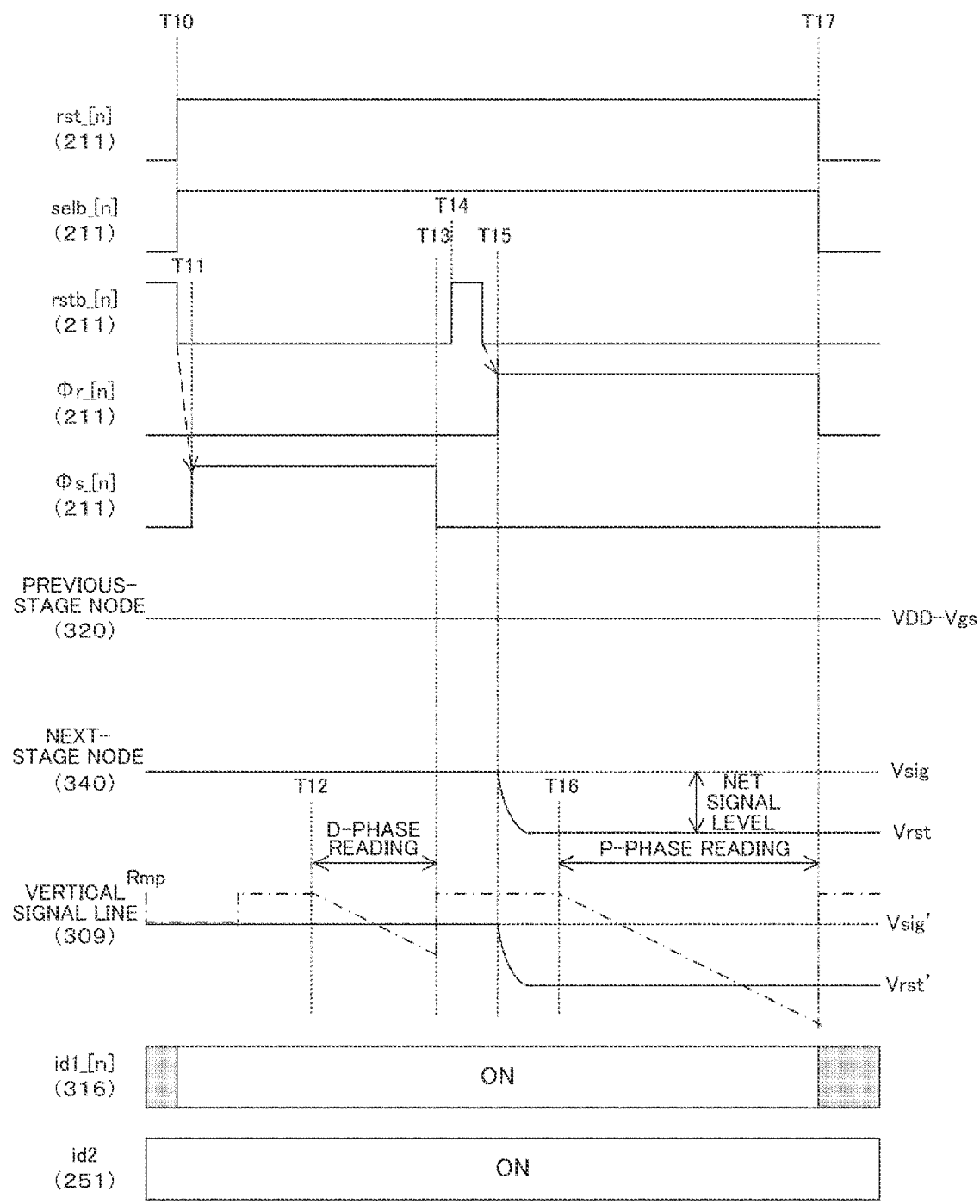
FIG. 7 is a timing chart showing another example of the reading operation according to the first embodiment of the present technique.

Note that although the solid-state imaging element 200 reads the signal level after the reset level, the order is not limited thereto. As shown as an example in FIG. 7, the solid-state imaging element 200 can also read the reset level after the signal level. In this case, the vertical scanning circuit 211 supplies the selection signal Φs in a high level and then the selection signal Φr in a high level as shown as an example in the drawing. In this case, it is necessary for an inclination of the slope of the ramp signal to be inverted.

Figure 8:
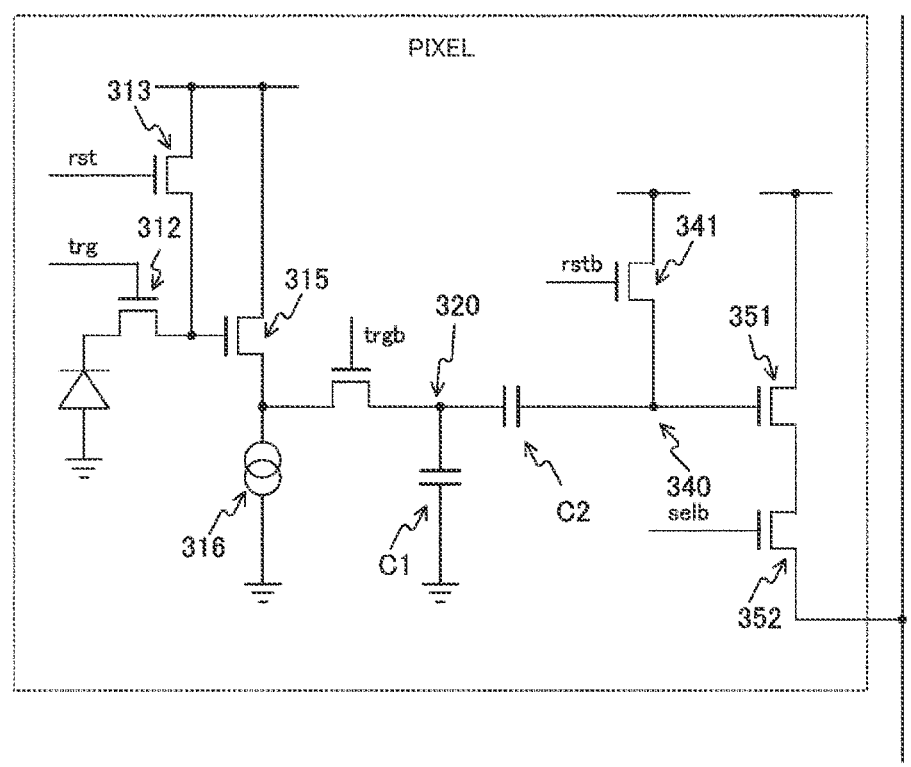
FIG. 8 is a circuit diagram showing a configuration example of a pixel in a comparative example.

FIG. 8 is a circuit diagram illustrating a configuration example of a pixel according to a comparative example. In this comparative example, the selection circuit 330 is not provided, and a transfer transistor is inserted between the previous-stage node 320 and the previous-stage circuit. In addition, capacitances C1 and C2 are inserted instead of the capacitance elements 321 and 322. The capacitance C1 is inserted between the previous-stage node 320 and a ground terminal, and the capacitance C2 is inserted between the previous-stage node 320 and the next-stage node 340.

The pixel exposure control and reading control of the comparison example are described in FIG. 5.5.2 of NPL 1, for example. In the comparative example, a level Vn of kTC noise at the time of exposure and reading are represented by the following expression on the assumption that the capacitance value of each of the capacitances C1 and C2 is C.

$$Vn = (3*kT/C)^{1/2} \quad \text{Expression 1}$$

In the above expression, k is a Boltzmann constant, and the unit is, for example, joule per kelvin (J/K). T is an absolute temperature, and the unit is kelvin (K), for example. Also, the unit of Vn is volt (V), for example, and the unit of C is farad (F).

Figure 9A:
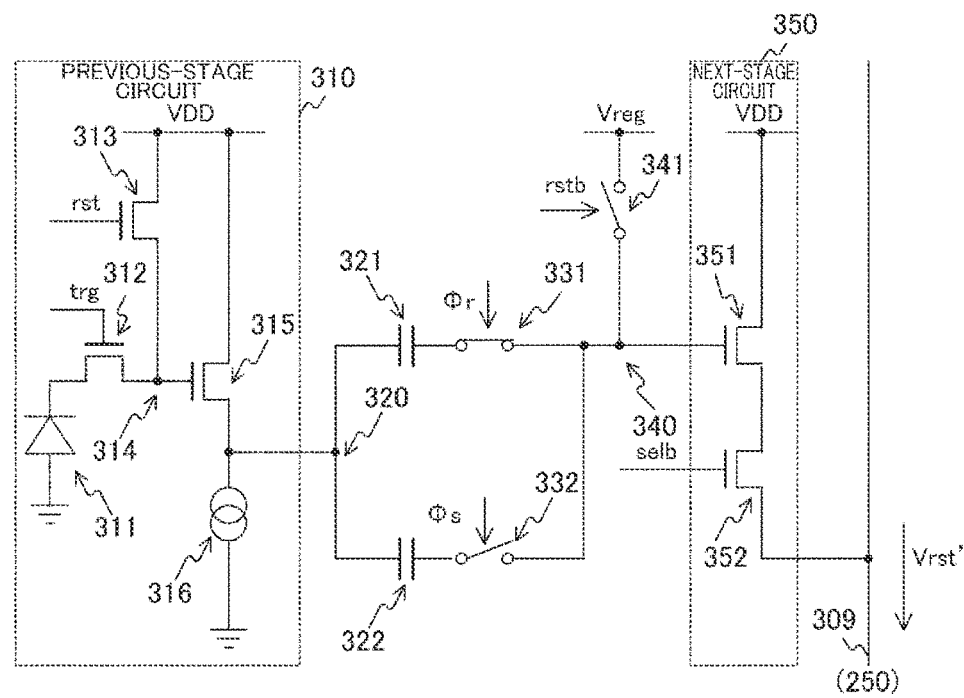
FIGS. 9A and 9B are diagrams showing an example of a state of a pixel in each of reset level reading and next-stage node initialization according to the first embodiment of the present technique.
Figure 9B:
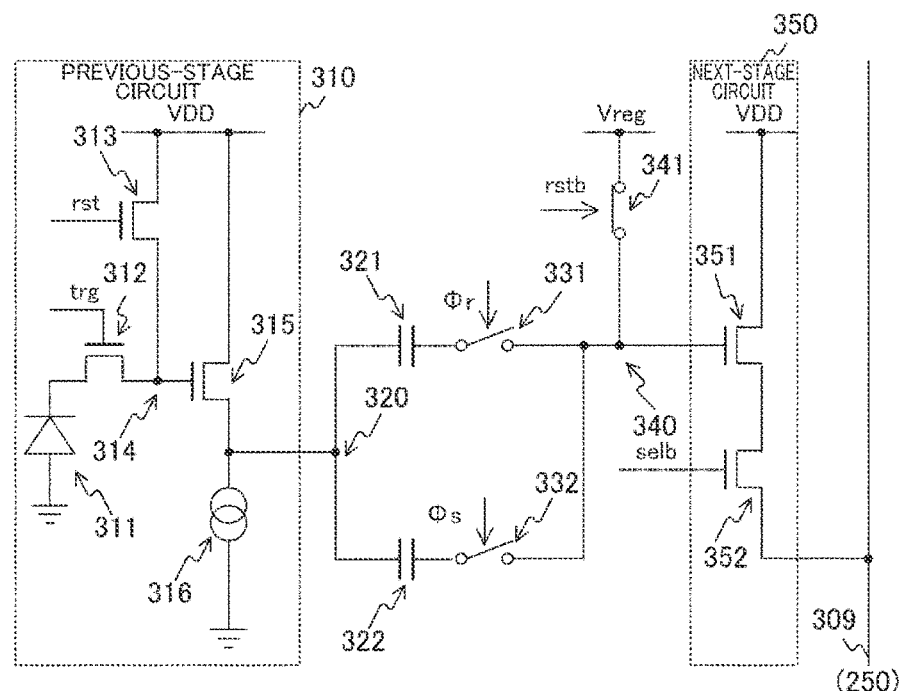

FIGS. 9A and 9B are diagrams showing an example of a state of a pixel in each of reading of the reset level and initialization of the next-stage node according to the first embodiment of the present technique. FIG. 9A in the drawing denotes the state of the pixel 300 at the time of reading of the reset level, and FIG. 9B in the drawing denotes the state of the pixel 300 at the time of initialization of the next-stage node 340. Also, the selection transistor 331, the selection transistor 332, and the next-stage reset transistor 341 are represented by switch diagram symbols in the drawing for convenience of explanation in the drawing.

As shown as an example by FIG. 9A in the drawing, the vertical scanning circuit 211 brings the selection transistor 331 into a close state and brings the selection transistor 332 and the next-stage reset transistor 341 into an open state. In this manner, the reset level is read via the next-stage circuit 350.

As shown as an example by FIG. 9B in the drawing, the vertical scanning circuit 211 brings the selection transistor 331 and the selection transistor 332 into an open state and brings the next-stage reset transistor 341 into a closed state after reading of the reset level. In this manner, the capacitance elements 321 and 322 are disconnected from the next-stage node 340, and the level of the next-stage node 340 is initialized.

The capacitance value of the parasitic capacitance Cp of the next-stage node 340 in this state in which the parasitic capacitance Cp is disconnected from the capacitance elements 321 and 322 is much smaller than those of the capacitance elements 321 and 322. If the parasitic capacitance Cp is assumed to be several femtofarads (fF), for example, the capacitance elements 321 and 322 are in the order of several tens of femtofarads.

Figure 10:
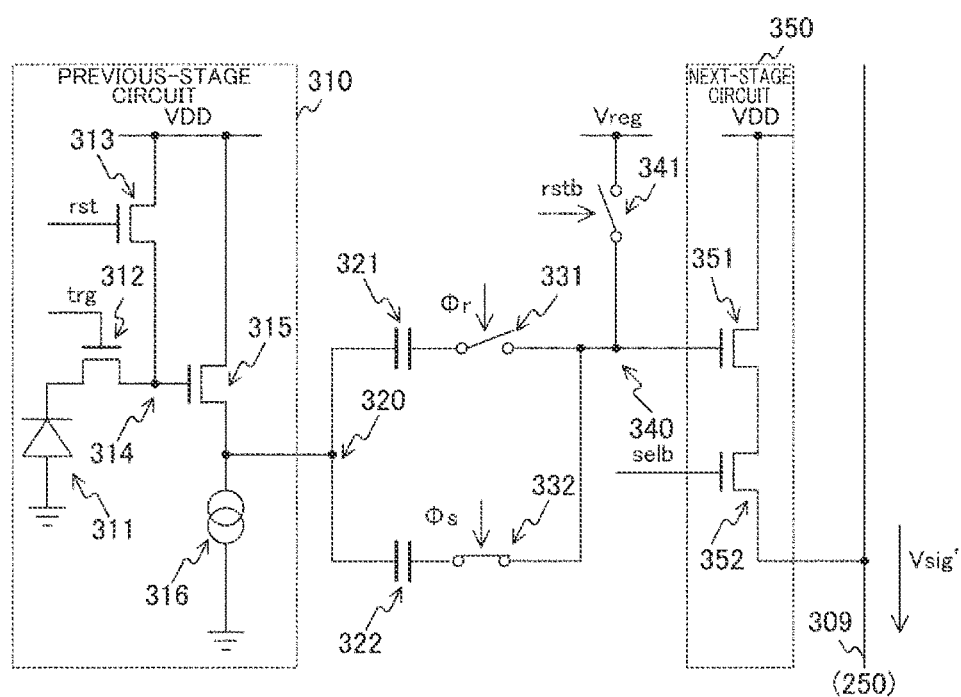
FIG. 10 is a diagram showing an example of a state of a pixel in a signal level reading according to the first embodiment of the present technique.

FIG. 10 is a diagram showing an example of a state of the pixel 300 at the time of reading of the signal level according to the first embodiment of the present technique.

After the initialization of the next-stage node 340, the vertical scanning circuit 211 brings the selection transistor 332 into a closed state and brings the selection transistor 331 and the next-stage reset transistor 341 into an open state. In this manner, the signal level is read via the next-stage circuit 350.

Here, kTC noise at the time of exposure of the pixel 300 will be considered. At the time of exposure, kTC noise is generated in each of sampling of the reset level and sampling of the signal level immediately before an end of the exposure. If the capacitance value of each of the capacitance elements 321 and 322 is assumed to be C, the level Vn of the kTC noise at the time of the exposure is represented by the following expression.

$$Vn = (2*kT/C)^{1/2} \quad \text{Expression 2}$$

Also, as shown as an example in FIGS. 9A, 9B, and 10, the next-stage reset transistor 341 is being driven at the time of reading, and kTC noise is thus generated at that time.

However, the capacitance elements 321 and 322 are disconnected at the time of driving of the next-stage reset transistor 341, and the parasitic capacitance Cp at the time is small. Therefore, the kTC noise at the time of reading is more negligible than kTC noise at the time of exposure. Therefore, kTC noise at the time of exposure and reading are represented by Expression 2.

According to Expression 1 and Expression 2, kTC noise of the pixel 300 from which the capacitance is disconnected at the time of reading becomes smaller than that in the comparative example in which the capacitance cannot be disconnected at the time of reading. In this manner, it is possible to improve image quality of image data.

Figure 11:
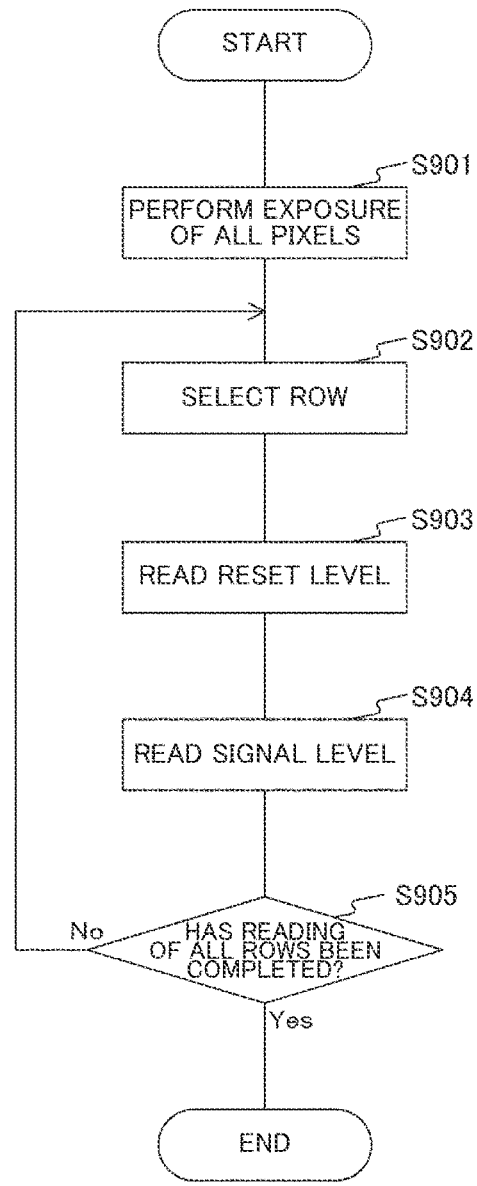
FIG. 11 is a flowchart showing an example of an operation of the solid-state imaging element according to the first embodiment of the present technique.

FIG. 11 is a flowchart showing an example of an operation of the solid-state imaging element 200 according to the first embodiment of the present technique. This operation starts, for example, when a predetermined application for capturing image data is executed.

The vertical scanning circuit 211 performs exposure of all the pixels (Step S901). Then, the vertical scanning circuit 211 selects a row to be read (Step S902). The column signal processing circuit 260 performs reading of the reset level of the row (Step S903) and then performs reading of the signal level (Step S904).

The solid-state imaging element 200 determines whether or not the reading of all the rows has been completed (Step S905). In a case where the reading of all the rows has not been completed (Step S905: No), the solid-state imaging element 200 repeats Step S902 and the following steps. On the other hand, in a case where the reading of all the pixels has been completed (Step S905: Yes), the solid-state imaging element 200 executes CDS processing and the like and ends the operations for image capturing. In a case where a plurality of pieces of image data is continuously captured, Steps S901 to S905 are repeatedly executed in synchronization with the vertical synchronization signal.

In this manner, the next-stage reset transistor 341 initializes the next-stage node 340 when the selection circuit 330 disconnects the capacitance elements 321 and 322 from the next-stage node 340 according to the first embodiment of the present technique. Since the capacitance elements 321 and 322 are disconnected, the level of the reset noise due to the driving becomes a level in accordance with a parasitic capacitance that is smaller than the capacitances. It is possible to improve image quality of the image data through the noise reduction.

First Modification Example

Although the signal is read with the previous-stage circuit 310 connected to the previous-stage node 320 in the aforementioned first embodiment, noise from the previous-stage node 320 cannot be blocked at the time of reading with this configuration. A pixel 300 according to the first modification example of the first embodiment is different from that in the first embodiment in that a transistor is inserted between a previous-stage circuit 310 and a previous-stage node 320.

Figure 12:
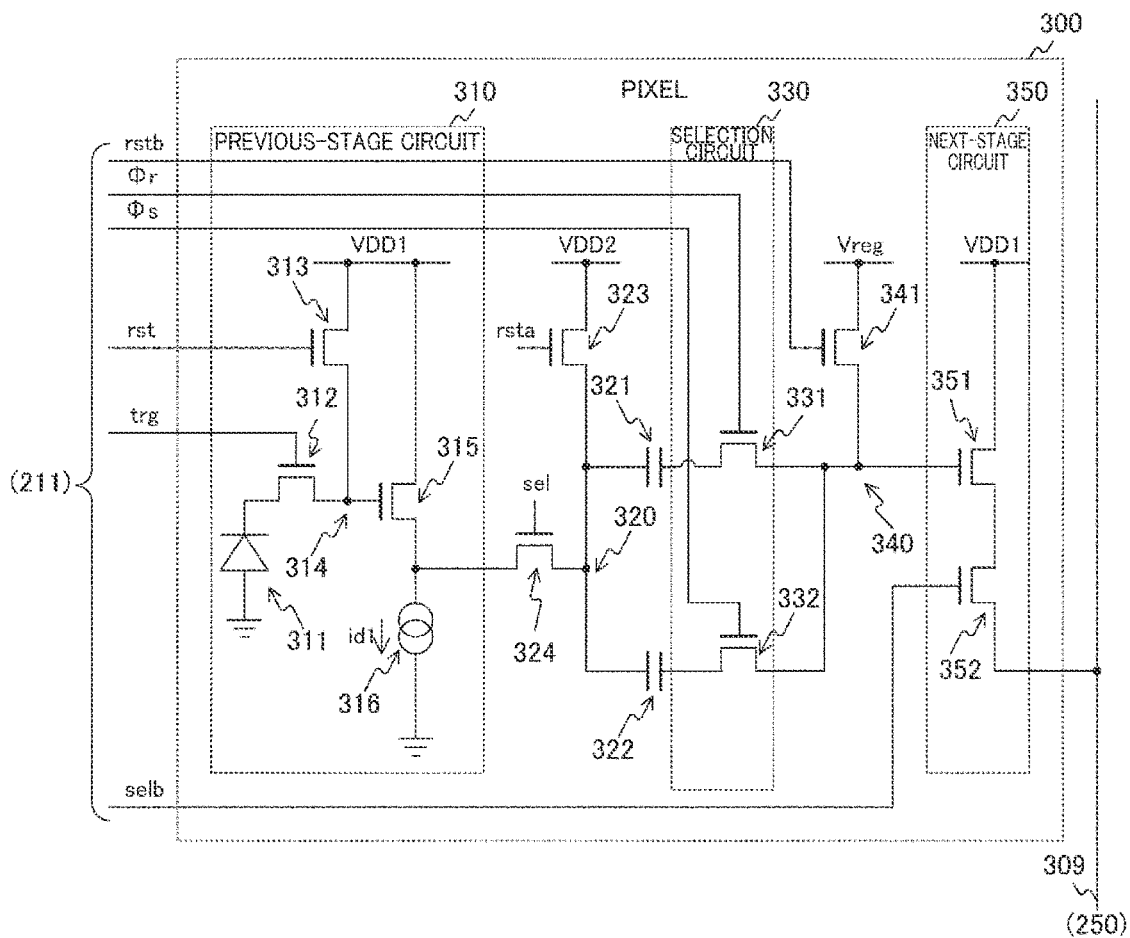
FIG. 12 is a circuit diagram showing a configuration example of a pixel in a first modification example of the first embodiment of the present technique.

FIG. 12 is a circuit diagram showing a configuration example of the pixel 300 according to the first modification example of the first embodiment of the present technique. The pixel 300 according to the first modification example of the first embodiment is different from that in the first embodiment in that the pixel 300 according to the first modification example further includes a previous-stage reset transistor 323 and a previous-stage selection transistor 324. Also, a power source voltage of the previous-stage circuit 310 and the next-stage circuit 350 according to the first modification example of the first embodiment is assumed to be VDD1.

The previous-stage reset transistor 323 initializes the level of the previous-stage node 320 with a power source voltage VDD2. It is desirable that the power source voltage VDD2 be set to a value that satisfies the following expression.

$$VDD2 = VDD1 \cdot Vgs \qquad \text{Expression 3}$$

In the above expression, Vgs is a voltage between a gate and a source of the previous-stage amplification transistor 315.

It is possible to reduce variations in potential between the previous-stage node 320 and the next-stage node 340 in darkness by setting the value to satisfy Expression 3. It is thus possible to improve sensitivity non-uniformity (photo response non-uniformity: PRNU).

The previous-stage selection transistor 324 opens and closes a path between the previous-stage circuit 310 and the previous-stage node 320 in accordance with a previous-stage selection signal sel from a vertical scanning circuit 211.

Figure 13:
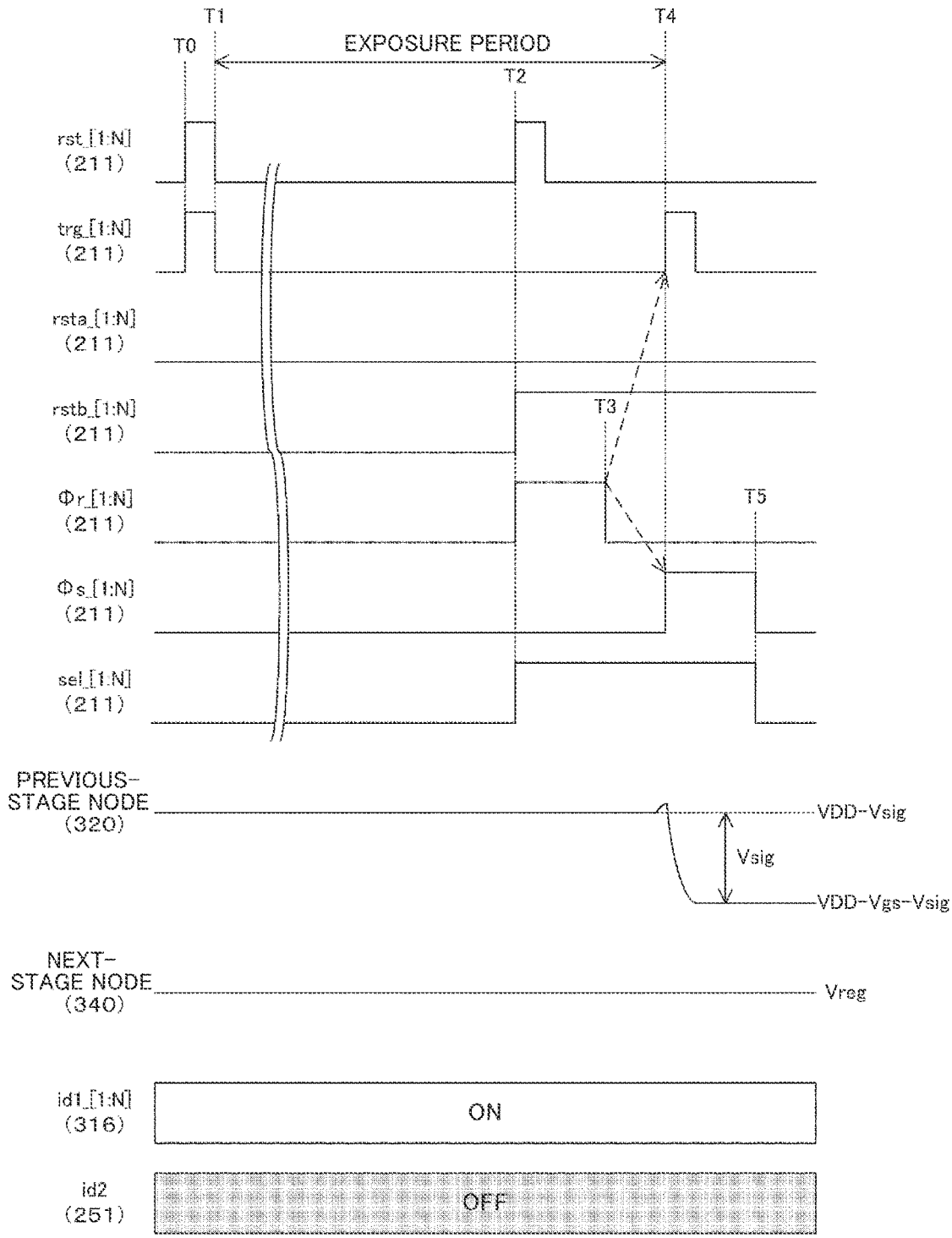
FIG. 13 is a timing chart showing an example of a global shutter operation in the first modification example of the first embodiment of the present technique.

FIG. 13 is a timing chart showing an example of a global shutter operation according to the first modification example of the first embodiment of the present technique. The timing chart according to the first modification example of the first embodiment is different from that according to the first embodiment in that the vertical scanning circuit 211 further supplies a previous-stage reset signal rsta and a previous-stage selection signal sel. In the drawing, rsta_[n] and sel_[n] denote signals to the pixels of the n-th row.

The vertical scanning circuit 211 supplies the previous-stage selection signal sel in a high level to all the pixels from the timing T2 immediately after an end of exposure to the timing T5. The previous-stage reset signal rsta is controlled to a low level.

Figure 14:
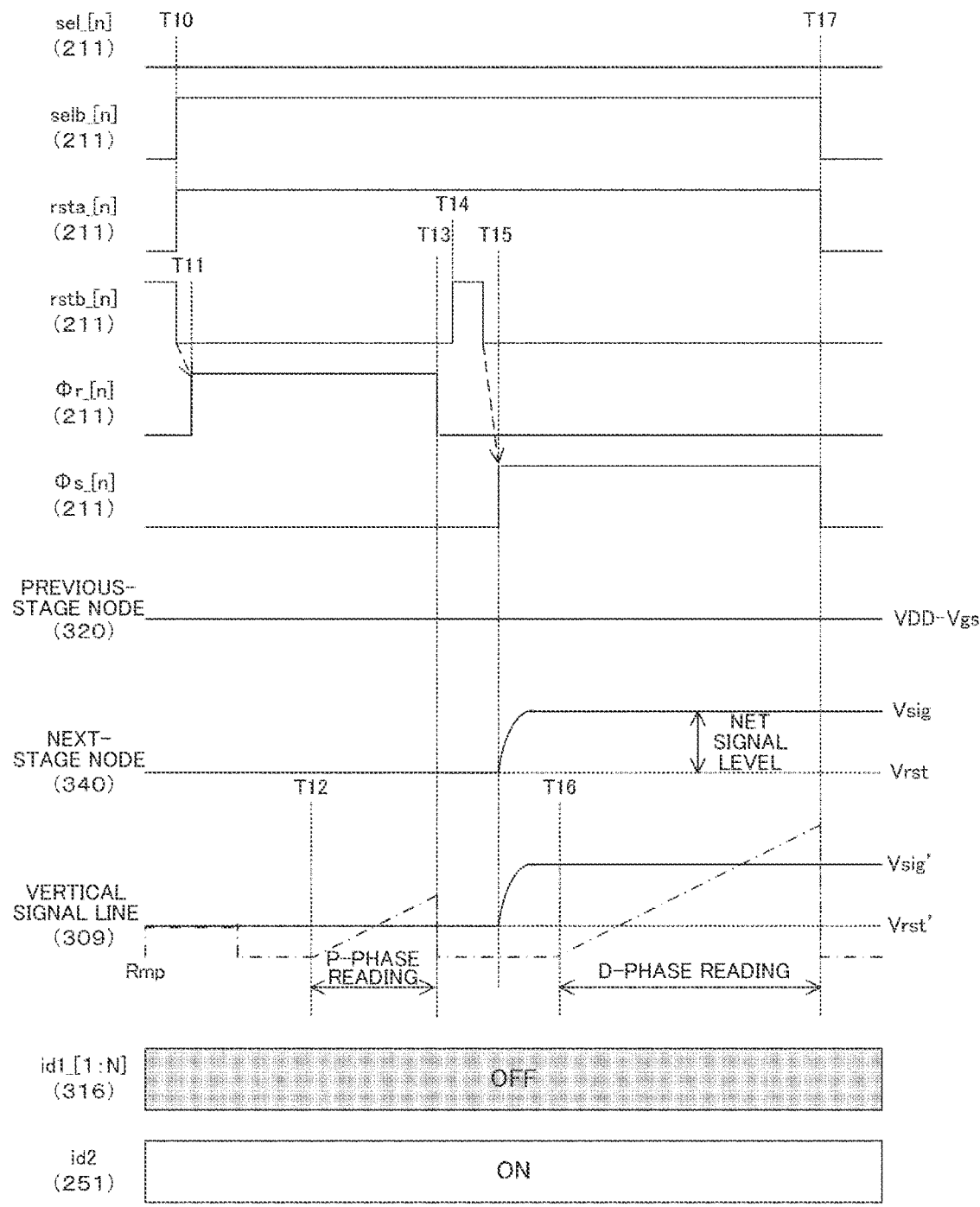
FIG. 14 is a timing chart showing an example of a reading operation in the first modification example of the first embodiment of the present technique.

FIG. 14 is a timing chart showing an example of a reading operation according to the first modification example of the first embodiment of the present technique. The previous-stage selection signal sel is controlled to a low level at the time of reading of each row. Through the control, the previous-stage selection transistor 324 transitions to an open state, and the previous-stage node 320 is disconnected from the previous-stage circuit 310. In this manner, noise from the previous-stage node 320 can be blocked at the time of reading.

Also, the vertical scanning circuit 211 supplies the previous-stage reset signal rsta in a high level to the n-th row during a reading period of the n-th row from the timing T10 to the timing T17.

Also, the vertical scanning circuit 211 controls the current source transistors 316 for all the pixels and stops the supply of the current id1 at the time of the reading. The current id2 is supplied similarly to the first embodiment. In this manner, the control of the current id1 is simpler as compared with the first embodiment.

According to the first modification example of the first embodiment of the present technique, the previous-stage selection transistor 324 transitions to the open state at the time of the reading, the previous-stage circuit 310 is disconnected from the previous-stage node 320 in this manner, and noise from the previous-stage circuit 310 can thus be blocked.

Second Modification Example

Although the circuits in the solid-state imaging element 200 are provided in a single semiconductor chip in the aforementioned first embodiment, there is a concern that the element may not be accommodated in the semiconductor chip when the pixels 300 are miniaturized with this configuration. A solid-state imaging element 200 according to the second modification example of the first embodiment is different from that according to the first embodiment in that circuits in the solid-state imaging element 200 are disposed in a distributed manner on two semiconductor chips.

Figure 15:
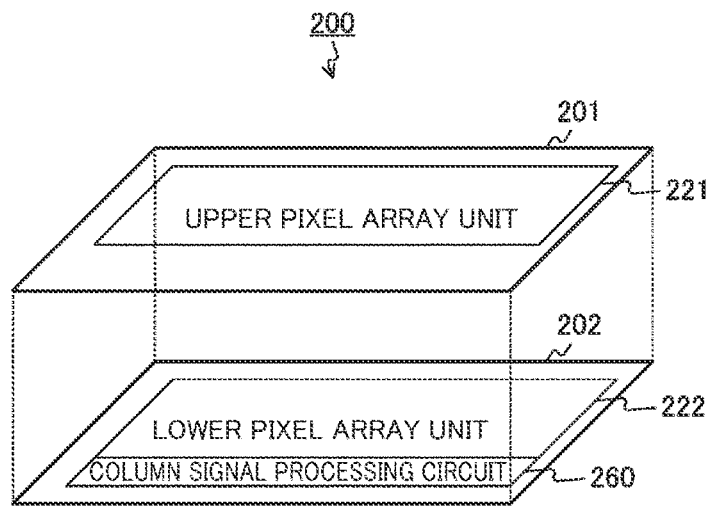
FIG. 15 is a diagram showing an example of a laminated structure of a solid-state imaging element according to a second modification example of the first embodiment of the present technique.

FIG. 15 is a diagram showing an example of a laminated structure of the solid-state imaging element 200 according to the second modification example of the first embodiment of the present technique. The solid-state imaging element 200 according to the second modification example of the first embodiment includes a lower pixel chip 202 and an upper pixel chip 201 laminated on the lower pixel chip 202. These chips are electrically connected with Cu-Cu junction, for example. Note that the connection can be established by using a via or a bump instead of the Cu-Cu junction.

An upper pixel array unit 221 is disposed on the upper pixel chip 201. A lower pixel array unit 222 and a column signal processing circuit 260 are disposed on the lower pixel chip 202. Some of the pixels inside the pixel array unit 220 are disposed in the upper pixel array unit 221, while the others are disposed in the lower pixel array unit 222.

Additionally, a vertical scanning circuit 211, a timing control circuit 212, a DAC 213, and a load MOS circuit block 250 are disposed on the lower pixel chip 202. These circuits are omitted in the drawing.

Also, the upper pixel chip 201 is manufactured by a pixel dedicated process, for example, and the lower pixel chip 202 is manufactured by a complementary MOS (CMOS) process, for example. Note that the upper pixel chip 201 is an example of the first chip described in the claims while the lower pixel chip 202 is an example of the second chip described in the claims.

Figure 16:
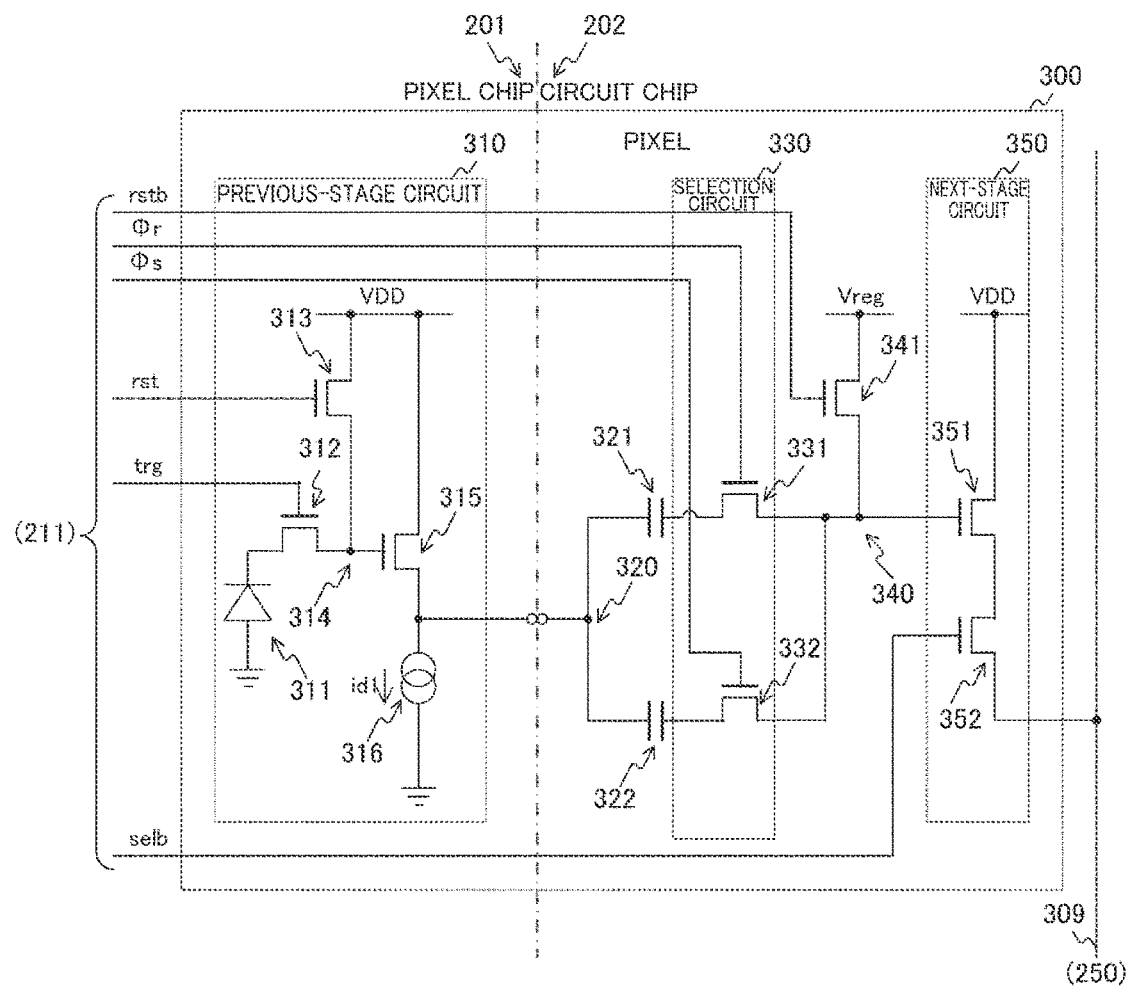
FIG. 16 is a circuit diagram showing a configuration example of a pixel according to the second modification example of the first embodiment of the present technique.

FIG. 16 is a circuit diagram showing a configuration example of a pixel 300 according to the second modification example of the first embodiment of the present technique. In the pixel 300, the previous-stage circuit 310 is disposed on the upper pixel chip 201, and the other circuits and elements (such as capacitance elements 321 and 322) are disposed on the lower pixel chip 202. Note that it is also possible to further dispose a current source transistor 316 on the lower pixel chip 202. As shown as an example in the drawing, it is possible to reduce the area of the pixel and to facilitate miniaturization of the pixel by disposing the elements in the pixel 300 in a distributed manner on the laminated upper pixel chip 201 and lower pixel chip 202.

According to the second modification example of the first embodiment of the present technique, the circuits and the elements in the pixel 300 are disposed in a distributed manner on the two semiconductor chips in this manner, and miniaturization of the pixel is thus facilitated.

Third Modification Example

According to the aforementioned second modification example of the first embodiment, a part of the pixel 300 and the peripheral circuits (such as the column signal processing circuit 260) are provided on the lower pixel chip 202 on the lower side. With this configuration, however, the disposition area of the circuits and the elements on the side of the lower pixel chip 202 becomes larger than that of the upper pixel chip 201 corresponding to the peripheral circuits, and there is thus a concern that an unnecessary space with no circuits and elements may be generated on the upper pixel chip 201. The solid-state imaging element 200 according to the third modification example of the first embodiment is different from that according to the second modification example of the first embodiment in that the circuits in the solid-state imaging element 200 are disposed in a distributed manner on three semiconductor chips.

Figure 17:
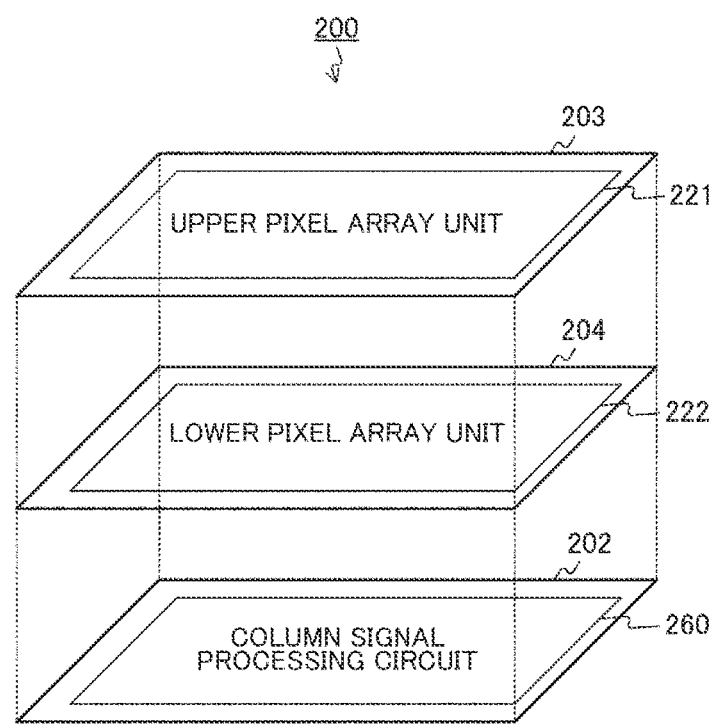
FIG. 17 is a diagram showing an example of a laminated structure of a solid-state imaging element in a third modification example of the first embodiment of the present technique.

FIG. 17 is a diagram showing an example of a laminated structure of the solid-state imaging element 200 according to the third modification example of the first embodiment of the present technique. The solid-state imaging element 200 according to the third modification example of the first embodiment includes an upper pixel chip 201, a lower pixel chip 202, and a circuit chip 203. These chips are laminated and are electrically connected with Cu-Cu junction, for example. Note that the connection can be established by using a via or a bump instead of the Cu-Cu junction.

An upper pixel array unit 221 is disposed on the upper pixel chip 201. A lower pixel array unit 222 is disposed on the lower pixel chip 202. Some of the pixels inside the pixel array unit 220 are disposed in the upper pixel array unit 221, while the others are disposed in the lower pixel array unit 222.

In addition, a column signal processing circuit 260, a vertical scanning circuit 211, a timing control circuit 212, a DAC 213, and a load MOS circuit block 250 are disposed on the circuit chip 203. The circuits other than the column signal processing circuit 260 are omitted in the drawing.

Note that the upper pixel chip 201 is an example of the first chip described in the claims while the lower pixel chip 202 is an example of the second chip described in the claims. The circuit chip 203 is an example of the third chip described in the claims.

It is possible to save the unnecessary space as compared with the two-layer configuration and to further miniaturize the pixel by employing the three-layer configuration as shown as an example in the drawing. Additionally, it is possible to manufacture the lower pixel chip 204 that is a second layer by a dedicated process for the capacitances and switches.

According to the third modification example of the first embodiment of the present technique, the circuits in the solid-state imaging element 200 are disposed in a distributed manner on the three semiconductor chips in this manner, it is possible to further miniaturize the pixel as compared with the case where the circuits are disposed in a distributed manner on the two semiconductor chips.

2. Second Embodiment

Although the reset level is sample-held during an exposure period according to the aforementioned first embodiment, it is not possible to shorten the exposure period than the reset level sample holding period with this configuration. A solid-state imaging element 200 according to a second embodiment is different from that according to the first embodiment in that the exposure period is further shortened by adding a transistor that discharges an electric charge from a photoelectric conversion element.

Figure 18:
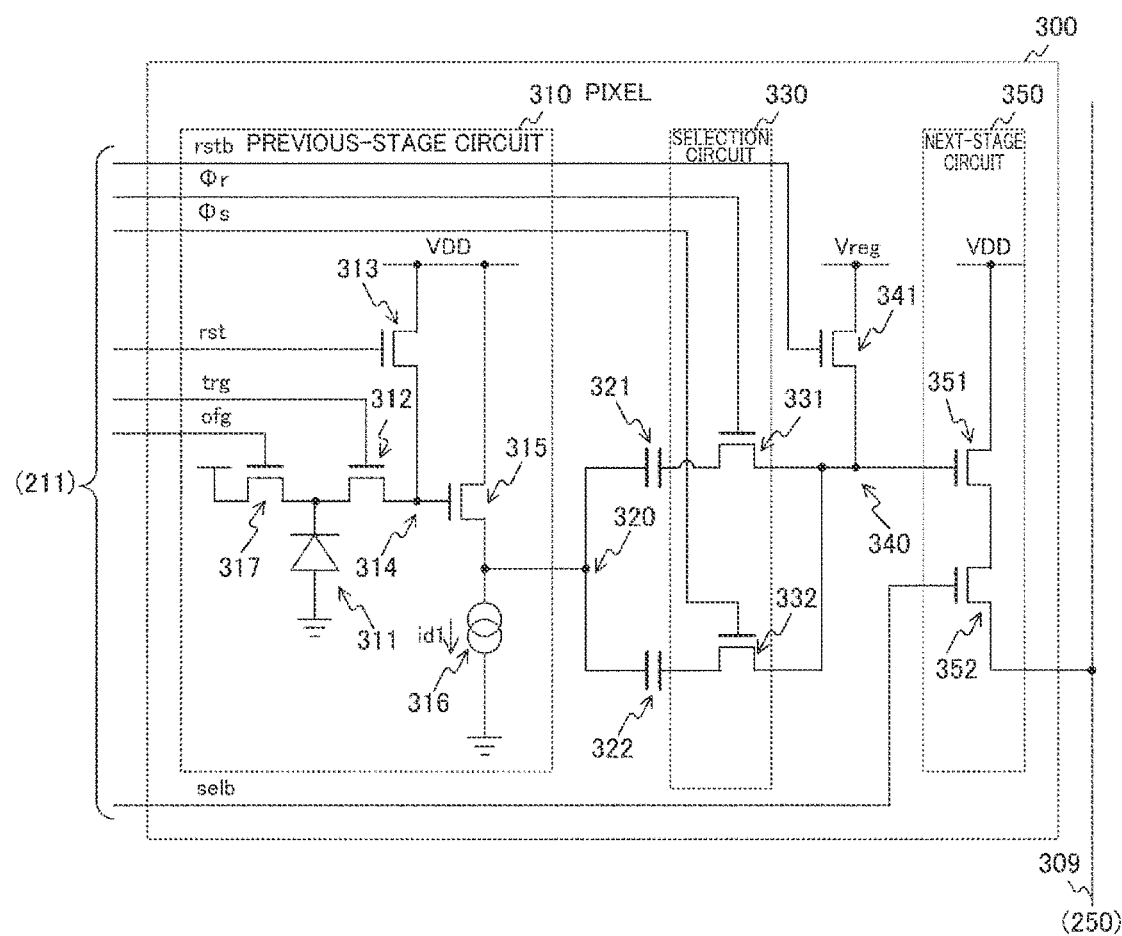
FIG. 18 is a circuit diagram showing a configuration example of a pixel according to a second embodiment of the present technique.

FIG. 18 is a circuit diagram showing a configuration example of the pixel 300 according to the second embodiment of the present technique. The pixel 300 according to the second embodiment is different from that according to the first embodiment in that the pixel 300 according to the second embodiment further includes a discharge transistor 317 in a previous-stage circuit 310.

The discharge transistor 317 functions as an overflow drain that discharges an electric charge from the photoelectric conversion element 311 in accordance with a discharge signal ofg from the vertical scanning circuit 211. As the discharge transistor 317, an nMOS transistor, for example, is used.

With the configuration in which the discharge transistor 317 is not provided as in the first embodiment, blooming may occur when an electric charge is transferred from a photoelectric conversion element 311 to an FD 314 for all pixels. Then, potentials of the FD 314 and a previous-stage node 320 drop at the time of an FD reset. Currents of charge and discharge of the capacitance elements 321 and 322 are continuously generated by following the potential drop, and IR drop of the power source and the ground change from the constant state with no blooming.

On the other hand, a state where the photoelectric conversion element 311 is empty of electric charge after transfer of a signal charge when the signal level of all the pixel is sample-held, no blooming is thus generated, and a constant state where IR drop of the power source and the ground does not cause blooming is achieved. Streaking noise occurs due to a difference in IR drop at the time of the sample-holding of the reset level and the signal level.

On the other hand, the electric charge of the photoelectric conversion element 311 is discharged to the side of the overflow drain in the second embodiment in which the discharge transistor 317 is provided. Therefore, the IR drop at the time of the sample-holding of the reset level and the signal level becomes a similar level, and streaking noise can be curbed.

Figure 19:
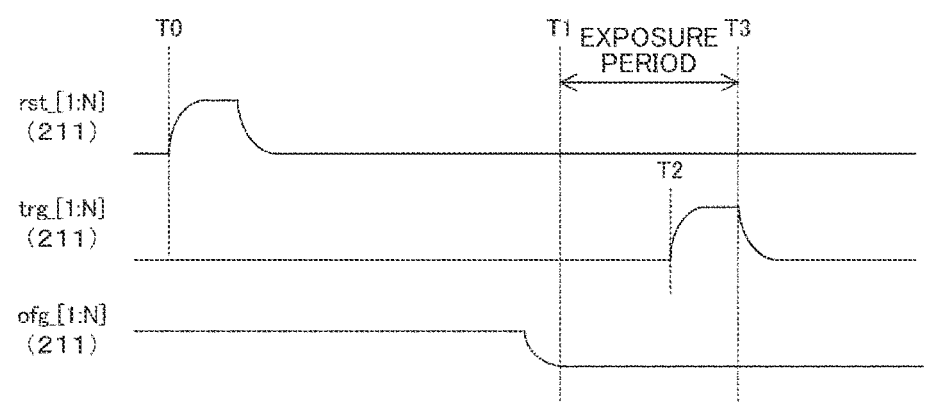
FIG. 19 is a timing chart showing an example of a global shutter operation in the second embodiment of the present technique.

FIG. 19 is a timing chart showing an example of a global shutter operation according to the second embodiment of the present technique. At the timing T0 before the timing of a start of exposure, the vertical scanning circuit 211 sets a discharge signal ofg of all the pixels in a high level and supplies an FD reset signal rst in a high level to all the pixels over a pulse period. In this manner, PD reset and FD reset are performed for all the pixels. Also, the reset level is sample-held. Here, ofg_[n] in the drawing denotes a signal to the pixels of the n-th row from among N rows.

Then, the vertical scanning circuit 211 returns a discharge signal ofg of all the pixels to a low level at the timing T1 of a start of exposure. Then, the vertical scanning circuit 211 supplies a transfer signal trg in a high level to all the pixels over a period from the timing T2 immediately after an end of exposure to T3 of the end of exposure. In this manner, the signal level is sample-held.

As in the first embodiment, both the transfer transistor 312 and the FD reset transistor 313 have to be brought into an ON state at the time of a start of exposure (that is, at the time of a PD reset) with the configuration in which the discharge transistor 317 is not provided. Under the control, the FD 314 also has to be simultaneously reset at the time of the PD reset. Therefore, it is necessary to perform FD reset again during the exposure period and to sample-hold the reset level, and it is not possible to reduce the exposure period to be shorter than the sample-holding period of the reset level. When the reset level of all the pixels is sample-held, some waiting time is needed until the voltage and the current settle down, and a sample holding time of several microseconds (us) to several tens of microseconds (us), for example, is needed.

On the other hand, the PD reset and the FD reset can be individually performed in the second embodiment in which the discharge transistor 317 is provided. Therefore, it is possible to perform the FD reset before release of the PD reset (start of exposure) and to sample-hold the reset level as shown as an example in the drawing. It is thus possible to reduce the exposure period to be shorter than the sample-holding period of the reset level.

Note that it is also possible to adapt the first to third modification examples of the first embodiment to the second embodiment.

In this manner, according to the second embodiment of the present technique, the discharge transistor 317 that discharges an electric charge from the photoelectric conversion element 311 is provided, and it is thus possible to perform the FD reset before a start of exposure and to sample-hold the reset level. It is thus possible to reduce the exposure period to be shorter than the sample-holding period of the reset level.

3. Third Embodiment

Although the FD 314 is initialized by the power source voltage VDD in the aforementioned first embodiment, there is a concern that sensitivity non-uniformity (PRNU) may be degraded due to variations in capacitance elements 321 and 322 and the parasitic capacitance with this configuration. A solid-state imaging element 200 according to the third embodiment is different from that according to the first embodiment in that PRNU is improved by lowering the power source of the FD reset transistor 313 at the time of reading.

Figure 20:
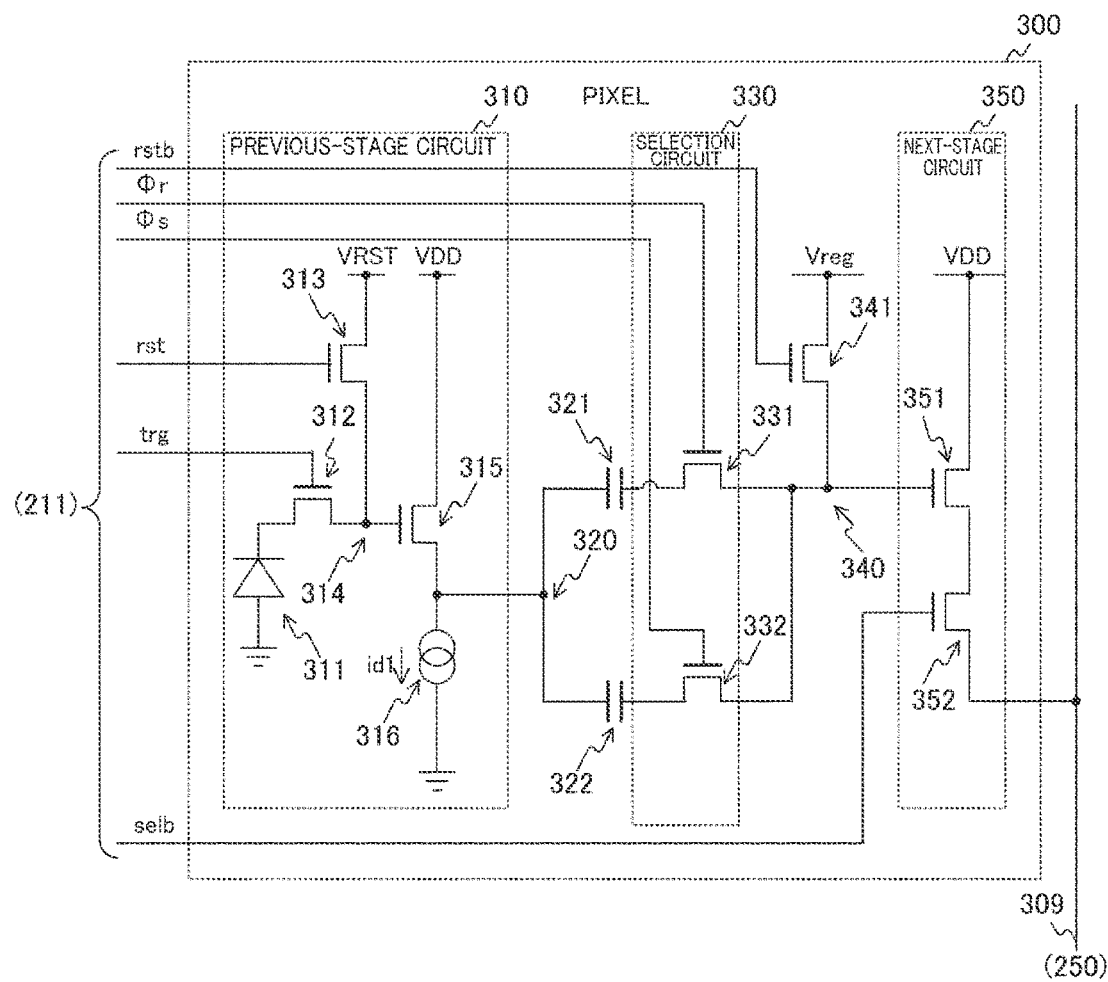
FIG. 20 is a circuit diagram showing a configuration example of a pixel according to a third embodiment of the present technique.

FIG. 20 is a circuit diagram showing a configuration example of a pixel 300 according to the third embodiment of the present technology. The pixel 300 according to the third embodiment is different from that according to the first embodiment in that a power source of an FD reset transistor 313 is separated from a power source voltage VDD of the pixel 300.

A drain of the FD reset transistor 313 according to the third embodiment is connected to a reset power source voltage VRST. The reset power source voltage VRST is controlled by a timing control circuit 212, for example. Note that the timing control circuit 212 is an example of the control circuit described in the claims.

Figure 21:
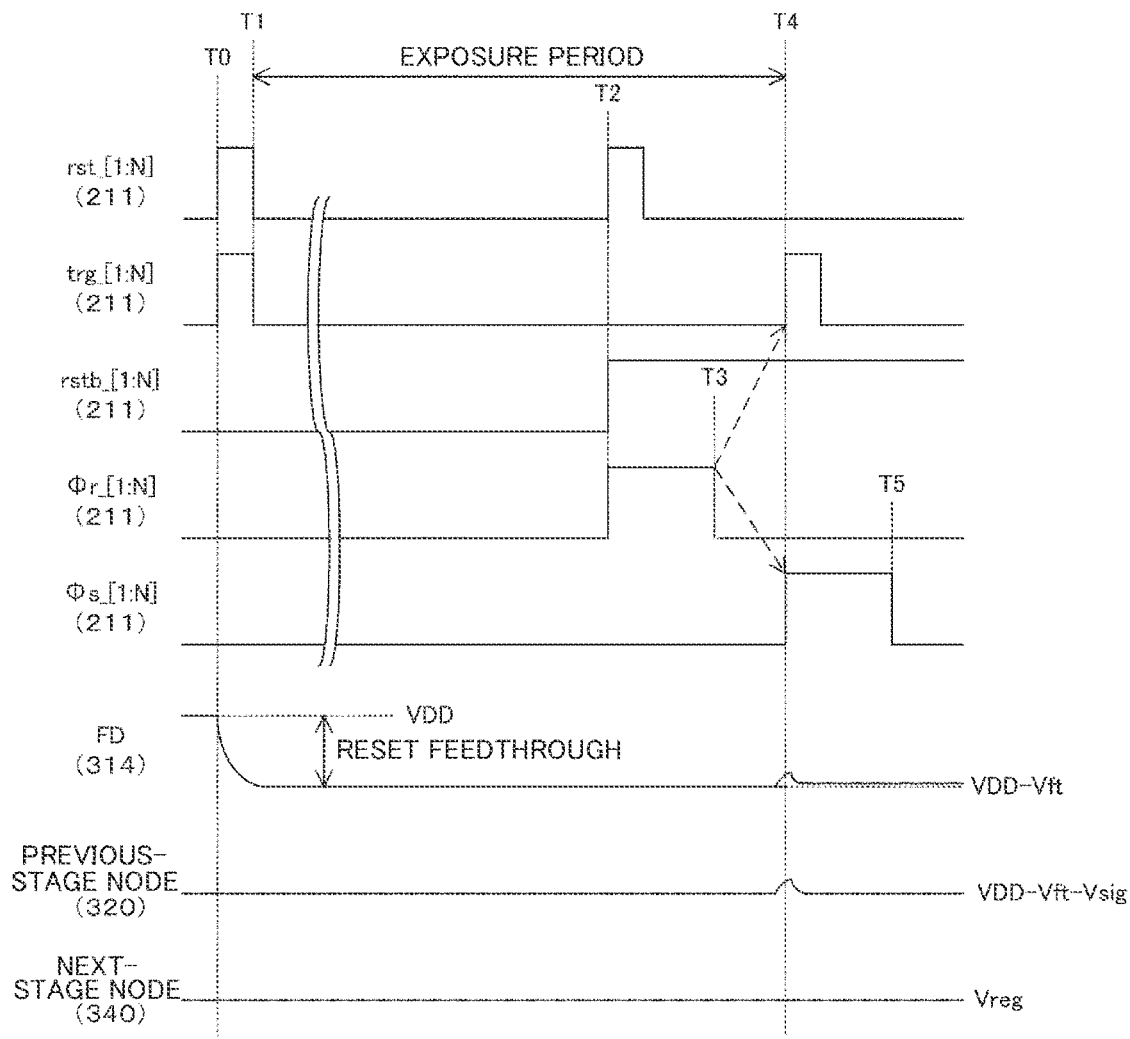
FIG. 21 is a diagram for explaining a reset feedthrough according to the third embodiment of the present technique.
Figure 22:
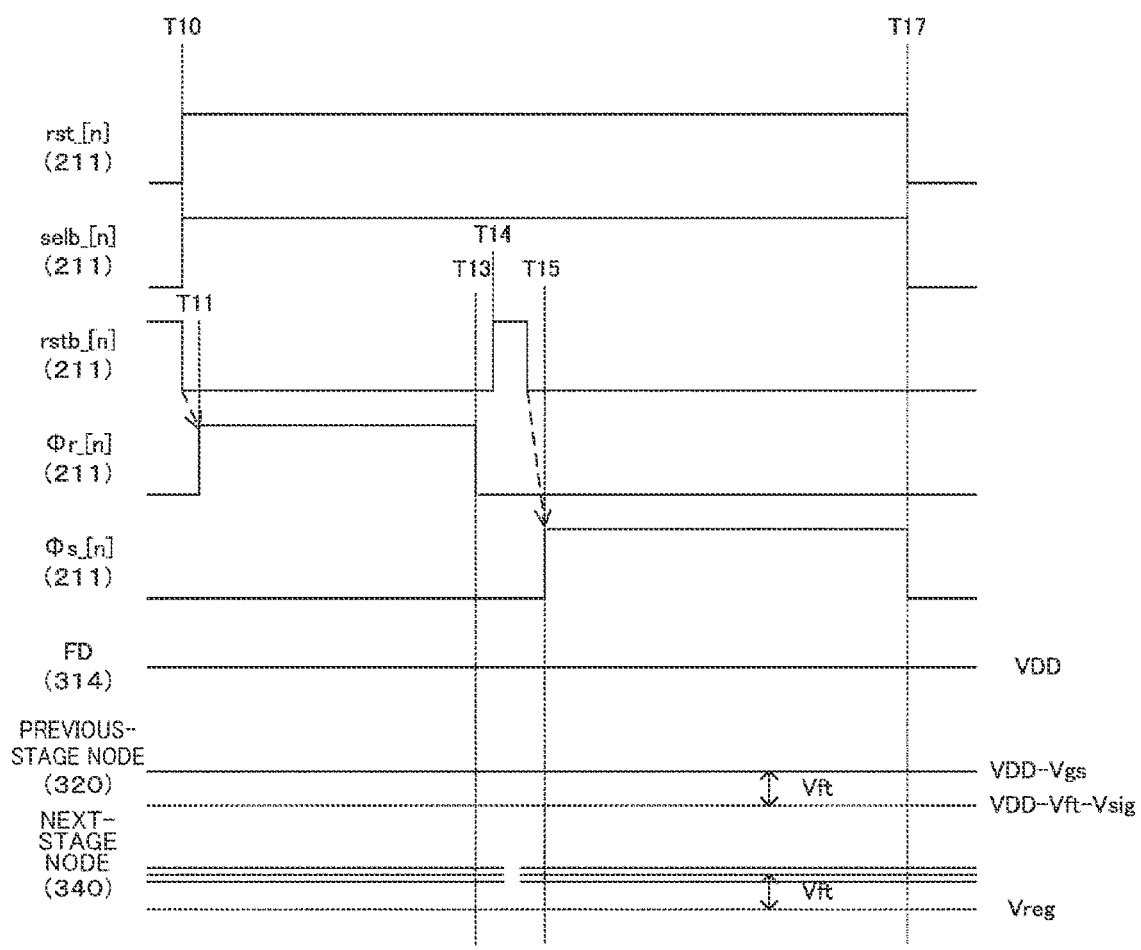
FIG. 22 is a diagram for explaining variations in level due to reset feedthrough according to the third embodiment of the present technique.

Here, referring to FIGS. 21 and 22, degradation of PRNU in the pixel 300 in the first embodiment will be considered. In the first embodiment, the potential of the FD 314 is lowered due to reset feedthrough of the FD reset transistor 313 at the timing T0 immediately before a start of exposure as shown as an example in FIG. 21. The amount of variations is denoted as Vft.

In the first embodiment, the power source voltage of the FD reset transistor 313 is VDD, and the potential of the FD 314 varies from VDD to VDD-Vft at the timing T0. In addition, the potential of the previous-stage node 320 at the time of exposure is VDD-Vft-Vsig.

Moreover, the FD reset transistor 313 transitions to the ON state at the time of reading as shown as an example in FIG. 22, and the FD 314 is fixed to the power source voltage VDD in the first embodiment. The potentials of the previous-stage node 320 and the next stage node 340 at the time of reading are shifted to be higher by about Vft by the amount of variation Vft of the FD 314. However, the amount of shifting voltage due to variations in capacitance values of the capacitance elements 321 and 322 and the parasitic capacitance leads to variations for each pixel and degradation of PRNU.

The amount of transition of the next-stage node 340 in a case where the previous-stage node 320 transitions by Vft is represented by the following expression, for example.

$$\{(Cs + \delta Cs)/(Cs + \delta Cs + Cp)\} * Vft \qquad \text{Expression 4}$$

In the above expression, Cs is a capacitance value of the capacitance element 322 on the side of the signal level, and δCs is variations in Cs. Cp is a capacitance value of the parasitic capacitance of the next-stage node 340.

Expression 4 can be approximated to the following expression.

$$\{1 - (\delta Cs/Cs) * (Cp/Cs)\} * Vft \qquad \text{Expression 5}$$

From Expression 5, Variations in the next-stage node 340 can be represented by the following expression.

$$\{(\delta Cs/Cs) * (Cp/Cs)\} * Vft \qquad \text{Expression 6}$$

On the assumption that (δCs/Cs) is $10^{-2}$, (Cp/Cs) is $10^{-1}$ and Vft is 400 millivolts (mV), PRNU is 400 µVrms by Expression 6 and becomes a relatively large value.

When kTC noise at the time of the sampling-holding of the capacitance in terms of an input is reduced, it is necessary to increase electric charge voltage conversion efficiency of the FD 314. Although the capacitance of the FD 314 has to be reduced in order to increase the charge voltage conversion efficiency, the amount of variations Vft increases as the capacitance of the FD 314 decreases and becomes several hundreds of millivolts (mV). In this case, the influence of PRNU may be in a non-negligible level due to Expression 6.

Figure 23:
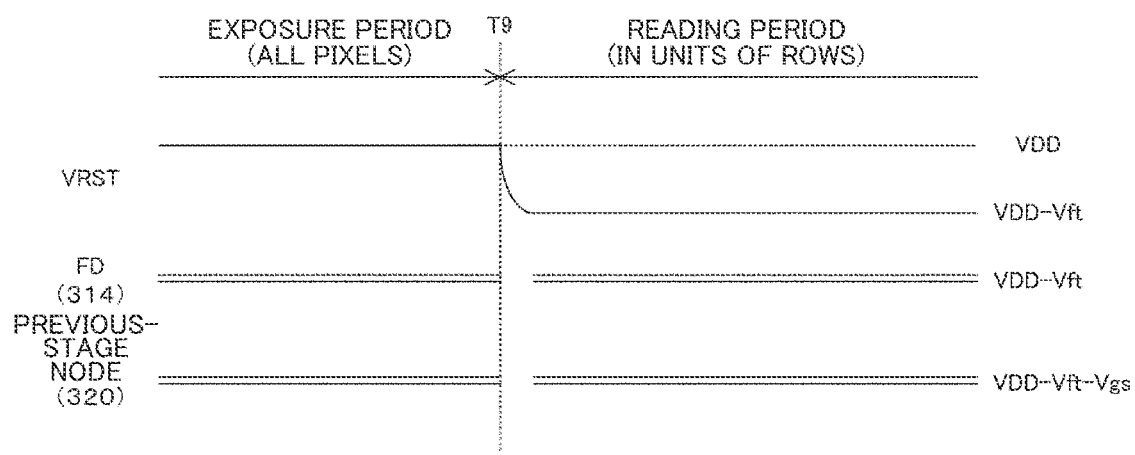
FIG. 23 is a timing chart showing an example of voltage control according to the third embodiment of the present technique.

FIG. 23 is a timing chart showing an example of voltage control according to the third embodiment of the present technique.

In a reading period in units of rows at and after the timing T9, the timing control circuit 212 controls a reset power source voltage VRST to a value that is different from that in an exposure period.

For example, the timing control circuit 212 sets the reset power source voltage VRST to be the same value as the power source voltage VDD in the exposure period. On the other hand, the timing control circuit 212 lowers the reset power source voltage VRST to VDD-Vft in the reading period. In other words, the timing control circuit 212 lowers the reset power source voltage VRST by the amount that substantially coincides with the amount of variations Vft due to reset feedthrough in the reading period. It is possible to have the same reset level of the FD 314 at the time of exposure and at the time of reading through the control.

It is possible to reduce the amounts of variations in voltages of the FD 314 and the previous-stage node 320 as illustrated as an example in the drawing through the control of the reset power source voltage VRST. In this manner, it is possible to curb degradation of PRNU due to variations in capacitance elements 321 and 322 and the parasitic capacitance.

Note that it is also possible to adapt the first to third modification examples of the first embodiment and the second embodiment to the third embodiment.

According to the third embodiment of the present technique, the timing control circuit 212 lowers the reset power source voltage VRST by the amount of variations Vft due to the reset feedthrough at the time of reading in this manner, and it is thus possible to obtain the same reset level for the exposure and for the reading. It is thus possible to curb degradation of sensitivity non-uniformity (PRNU).

4. Fourth Embodiment

Although the reset level is read and the signal level is then read for each frame in the aforementioned first embodiment, there is a concern that sensitivity non-uniformity (PRNU) may be degraded due to variations in capacitance elements 321 and 322 and the parasitic capacitance in this configuration. A solid-state imaging element 200 according to a fourth embodiment is different from that according to the first embodiment in that PRNU is improved by switching a level held in the capacitance element 321 with a level held in the capacitance element 322 for each frame.

The solid-state imaging element 200 according to the fourth embodiment continuously images a plurality of frames in synchronization with a vertical synchronization signal. Frames of the odd orders will be referred to as "odd frames", and frames of the even orders will be referred to as "even frames". Note that the odd frames and the even frames are an example of the pair of frames described in the claims.

Figure 24:
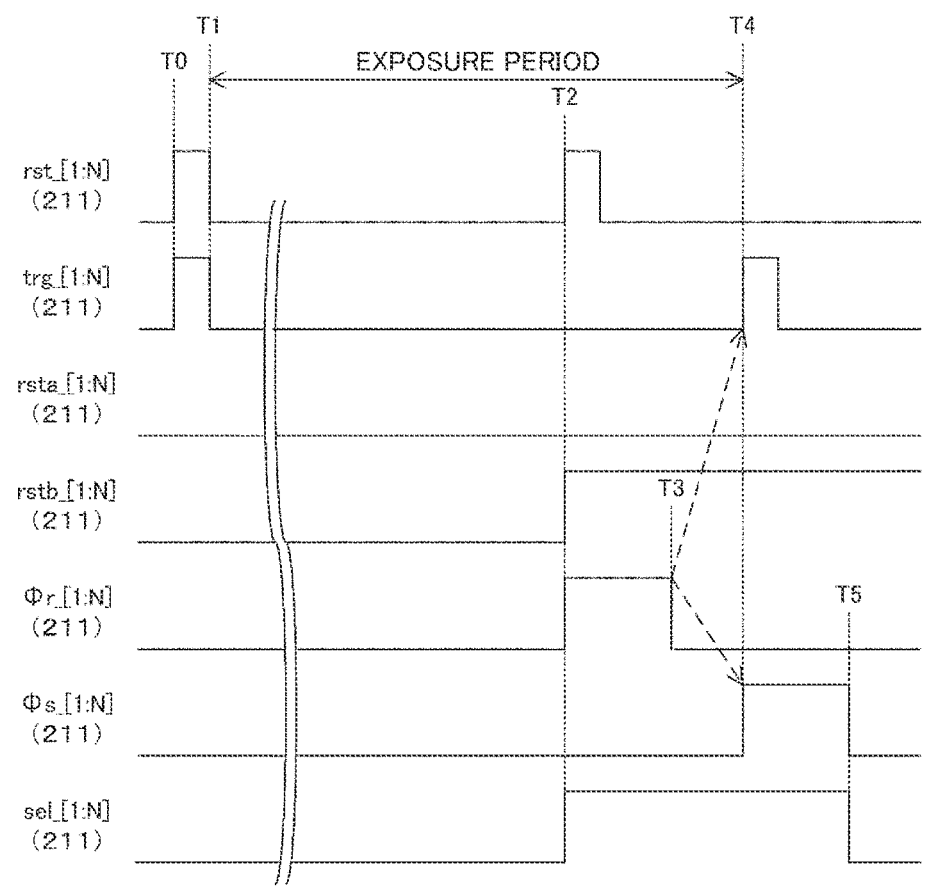
FIG. 24 is a timing chart showing an example of a global shutter operation of an odd frame according to a fourth embodiment of the present technique.

FIG. 24 is a timing chart showing an example of a global shutter operation of odd frames according to the fourth embodiment. A previous-stage circuit 310 in the solid-state imaging element 200 causes a capacitance element 321 to hold a reset level and then causes a capacitance element 322 to hold a signal level by changing the selection signal Φr and then the selection signal Φs to a high level in the exposure period of the odd frames.

Figure 25:
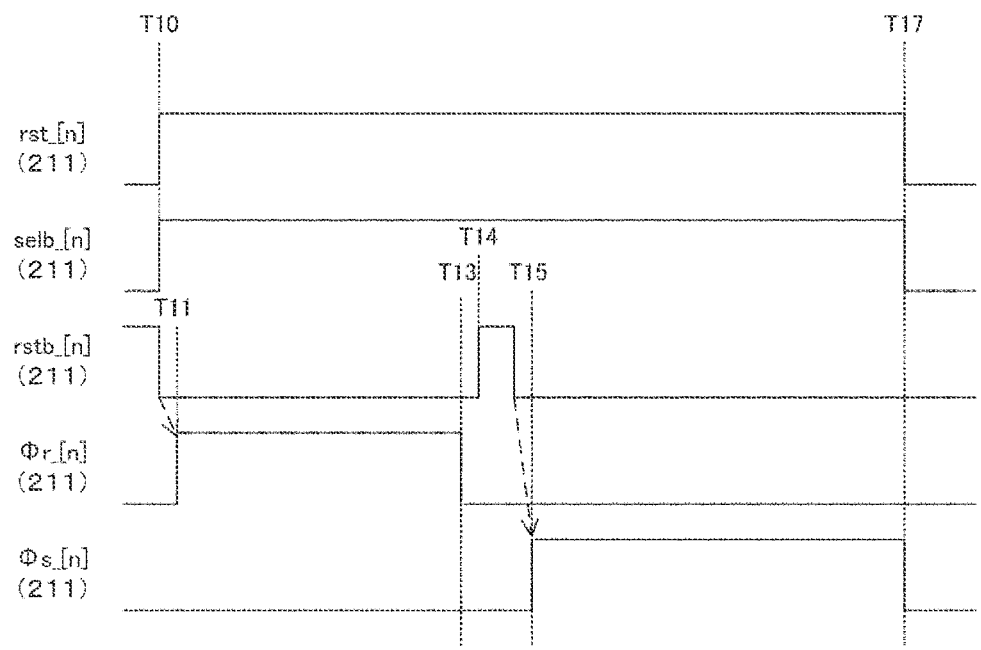
FIG. 25 is a timing chart showing an example of an odd frame reading operation according to the fourth embodiment of the present technique.

FIG. 25 is a timing chart showing an example of an odd frame reading operation according to the fourth embodiment of the present technique. A next-stage circuit 350 in the solid-state imaging element 200 sets the selection signal Φr and then the selection signal Φs in a high level and reads the reset level and then the signal level during the odd frame reading period.

Figure 26:
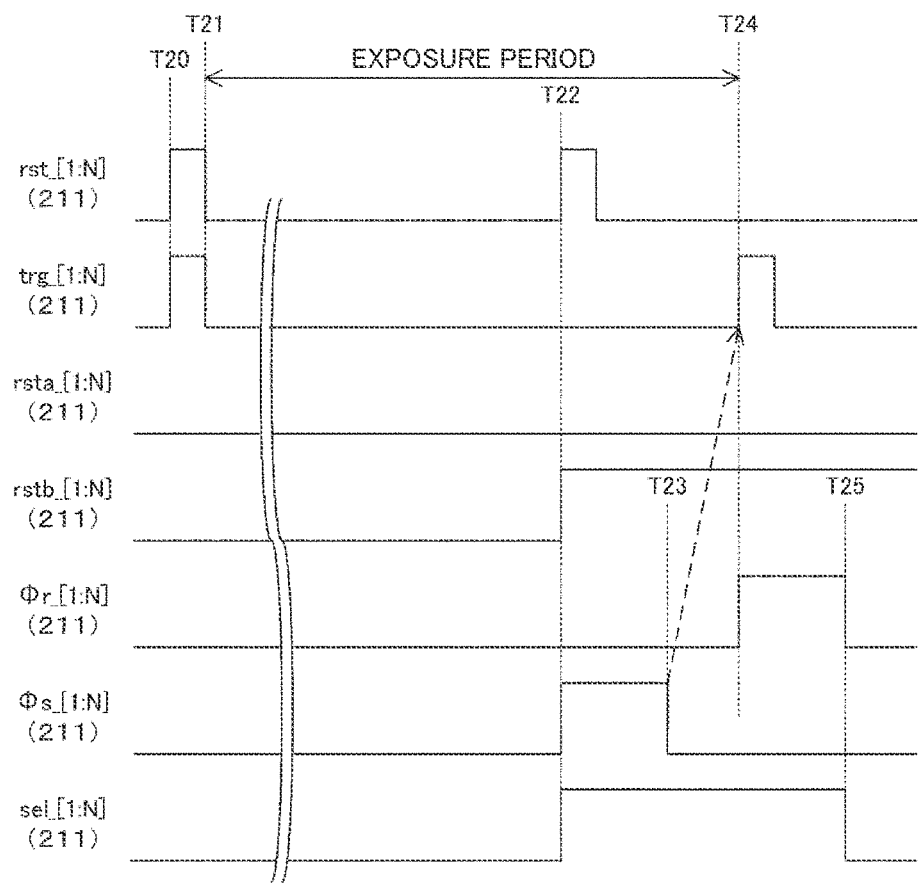
FIG. 26 is a timing chart showing an example of an even frame global shutter operation according to the fourth embodiment of the present technique.

FIG. 26 is a timing chart showing an example of an even frame global shutter operation according to the fourth embodiment. The previous-stage circuit 310 of the solid-state imaging element 200 causes the capacitance element 322 to hold the reset level and then causes the capacitance element 321 to hold the signal level by setting the selection signal Φs and then selection signal Φr in a high level during the even frame exposure period.

Figure 27:
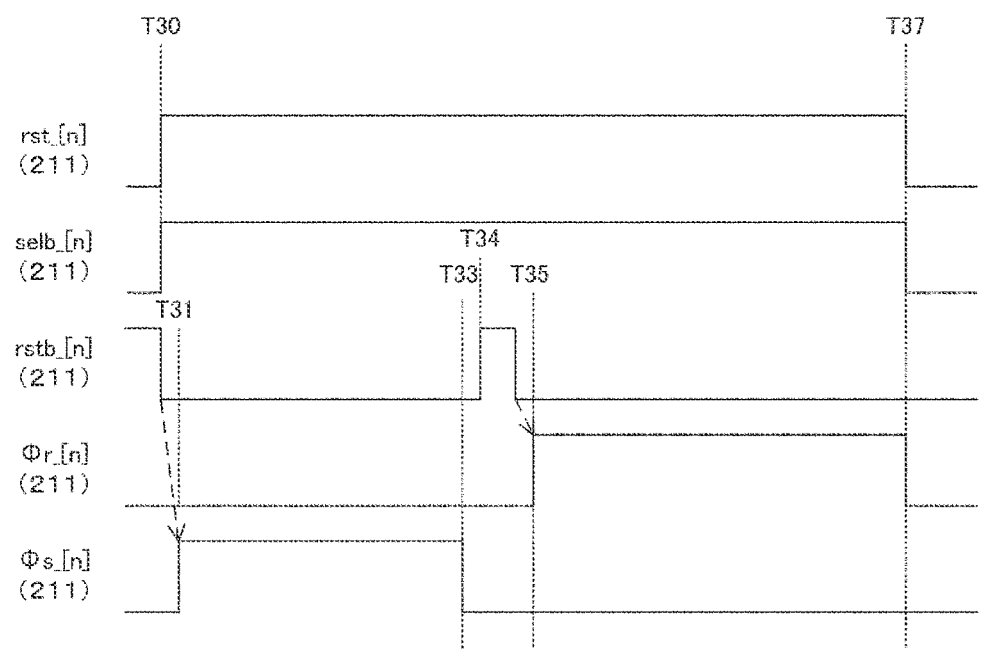
FIG. 27 is a timing chart showing an even frame reading operation according to the fourth embodiment of the present technique.

FIG. 27 is a timing chart showing an example of an even frame reading operation according to the fourth embodiment of the present technique. The next stage circuit 350 in the solid-state imaging element 200 sets the selection signal Φs and then the selection signal Φr in a high level and reads the reset level and then the signal level during the even frame reading period.

As shown as an example in FIGS. 24 and 26, the levels to be held by the capacitance elements 321 and 322 are opposite in the even frames and the odd frames. In this manner, the polarities of PRNU are also opposite in the even frames and the odd frames. The column signal processing circuit 260 in the next stage obtains an addition average in the odd frames and the even frames. It is thus possible to cancel out PRNU of opposite polarities.

The control is control effective for imaging a video and adding frames. In addition, it is not necessary to add an element to the pixel 300, and it is possible to realize the control only by changing a drive scheme.

Note that it is also possible to apply the first to third modification examples of the first embodiment and the second and third embodiments to the fourth embodiment.

According to the fourth embodiment of the present technique, the level held by the capacitance element 321 and the level held by the capacitance element 322 are opposite in the odd frames and the even frames in this manner, and it is thus possible to have opposite polarities of PRNU in the odd frames and the even frames. It is possible to curb degradation of PRNU by the column signal processing circuit 260 adding these odd frames and even frames.

5. Fifth Embodiment

In the aforementioned first embodiment, the column signal processing circuit 260 obtains a difference between the reset level and the signal level for each column. However, there is a concern of occurrence of a black spot phenomenon in which illuminance is lowered due to an electric charge overflowing from the photoelectric conversion element 311 and black sinking occurs when light with very high illuminance is incident on the pixel with this configuration. A solid-state imaging element 200 according to the fifth embodiment is different from that according to the first embodiment in that whether or not the black spot phenomenon has occurred is determined for each pixel.

Figure 28:
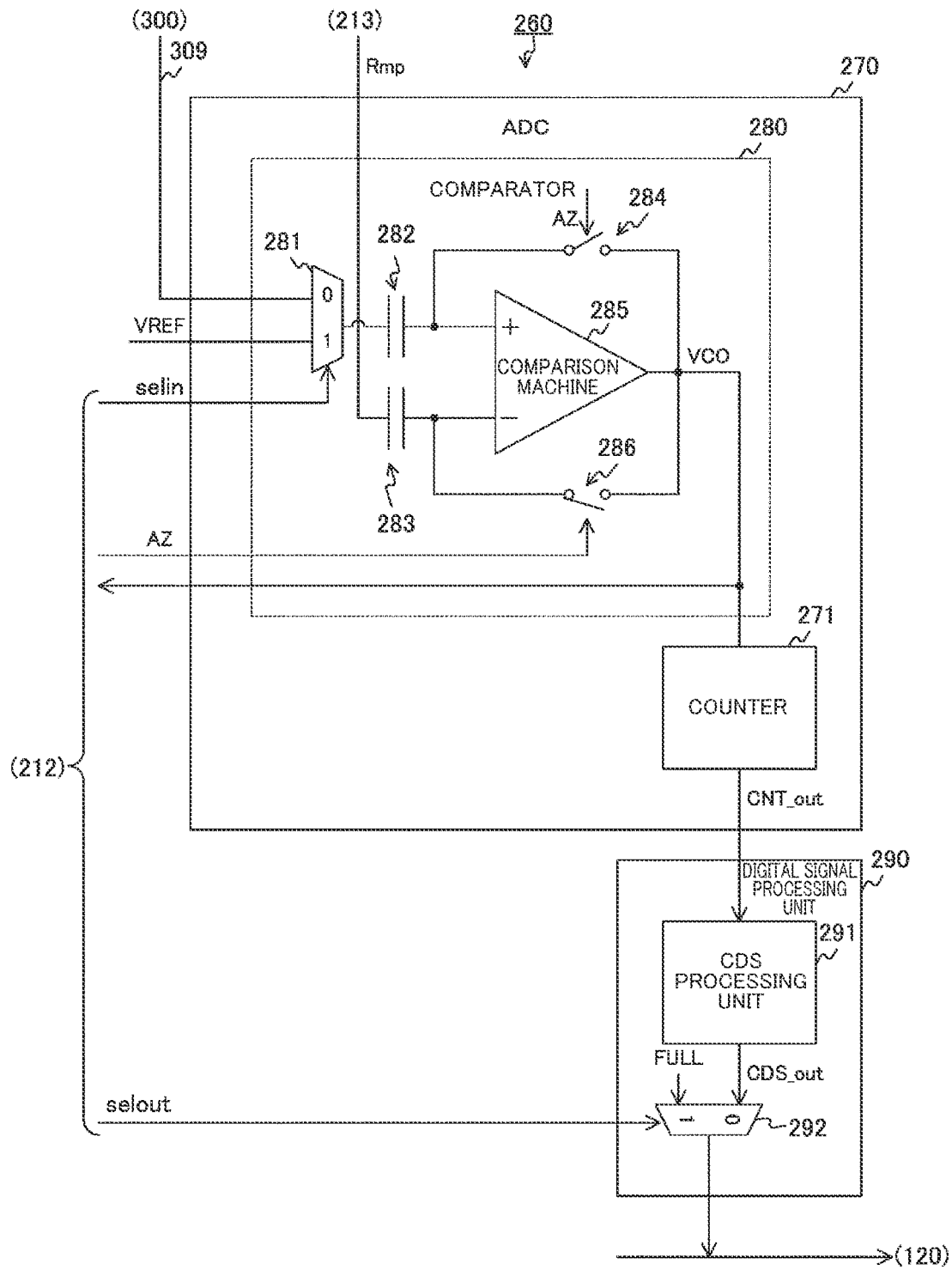
FIG. 28 is a circuit diagram showing a configuration example of a column signal processing circuit according to a fifth embodiment of the present technique.

FIG. 28 is a circuit diagram illustrating a configuration example of a column signal processing circuit 260 according to a fifth embodiment of the present technique. In the column signal processing circuit 260 according to the fifth embodiment, a plurality of ADCs 270 and a digital signal processing unit 290 are disposed. Also, a plurality of CDS processing units 291 and a plurality of selectors 292 are disposed in the digital signal processing unit 290. The ADCs 270, the CDS processing units 291, and the selector 292 are provided for each column.

In addition, each ADC 270 includes a comparator 280 and a counter 271. The comparator 280 compares a level of a vertical signal line 309 with a ramp signal Rmp from the DAC 213 and outputs a comparison result VCO. The comparison result VCO is supplied to a counter 271 and a timing control circuit 212. The comparator 280 includes a selector 281, capacitance elements 282 and 283, auto-zero switches 284 and 286, and a comparison machine 285.

The selector 281 connects either the vertical signal line 309 of a corresponding column or a node of a predetermined reference voltage VREF to a non-inverting input terminal (+) of the comparison machine 285 via a capacitance element 282 in accordance with an input-side selection signal selin. The input-side selection signal selin is supplied from the timing control circuit 212. Note that the selector 281 is an example of the input-side selector described in the claims.

The comparison machine 285 compares each of the levels of the non-inverting input terminal (+) and the inverting input terminal (−) and outputs the comparison result VCO to the counter 271. The ramp signal Rmp is input to the inverting input terminal (−) via the capacitance element 283.

The auto-zero switch 284 short-circuits the non-inverting input terminal (+) and the output terminal of the comparison result VCO in accordance with the auto-zero signal Az from the timing control circuit 212. The auto-zero switch 286 short-circuits the inverting input terminal (−) and the output terminal of the comparison result VCO in accordance with the auto-zero signal Az.

The counter 271 counts the count value over a period until the comparison result VCO is inverted and outputs a digital signal CNT_out indicating the count value to the CDS processing unit 291.

The CDS processing unit 291 performs CDS processing on the digital signal CNT_out. The CDS processing unit 291 performs an arithmetic operation for a difference between the digital signal CNT_out corresponding to the reset level and the digital signal CNT_out corresponding to the signal level and outputs the difference as CDS_out to the selector 292.

The selector 292 outputs either the digital signal CDS_out after the CDS processing and the digital signal FULL of the full code as pixel data of the corresponding column in accordance with an output-side selection signal selout from the timing control circuit 212. Note that the selector 292 is an example of the output-side selector described in the claims.

Figure 29:
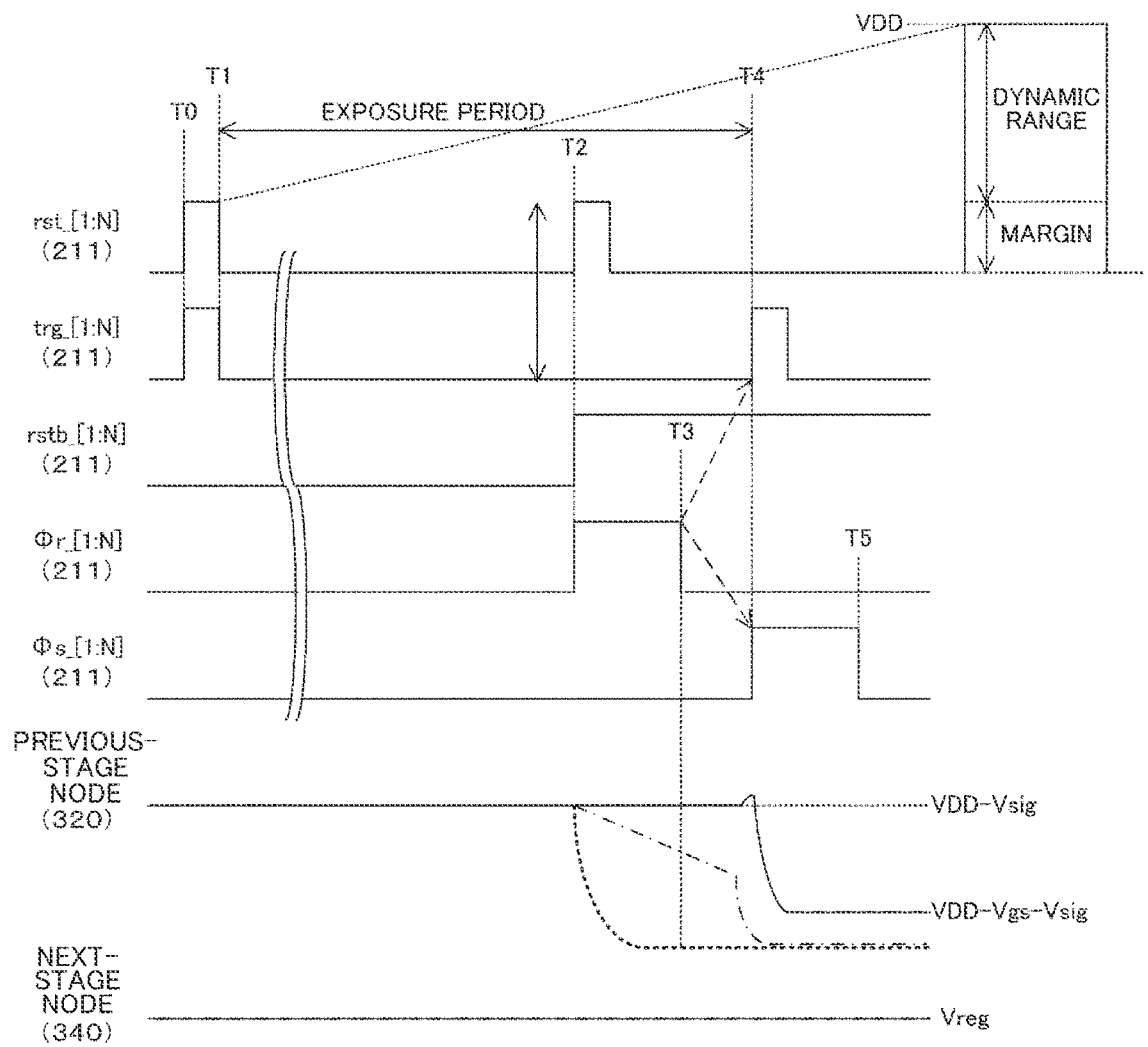
FIG. 29 is a timing chart showing an example of a global shutter operation according to the fifth embodiment of the present technique.

FIG. 29 is a timing chart showing an example of a global shutter operation according to the fifth embodiment of the present technique. A method of controlling the transistor at the time of global shutter according to the fifth embodiment is similar to that in the first embodiment.

Here, it is assumed that light with very high illuminance has been incident on the pixel 300. In this case, the photoelectric conversion element 311 is full of electric charge, the electric charge overflows from the photoelectric conversion element 311 to the FD 314, and the potential of the FD 314 after the FD reset is lowered. The one-dotted chain line in the drawing indicates variations in potential of the FD 314 when weak sunlight that leads to a relatively small amount of overflowing electric charge is incident. The dotted line in the drawing indicates variations in potential of the FD 314 when strong sunlight that leads to a relatively large amount of overflowing electric charge is incident.

Although the reset level is lowered before the timing T3 when the FD reset is completed when weak sunlight is incident, the level is not completely lowered at this point.

On the other hand, the reset level is completely lowered at the point of the timing T3 when strong sunlight is incident. In this case, the signal level becomes the same as the reset level, and the potential difference therebetween is "0", the digital signal after the CDS processing becomes the same as that in a case of a dark state, and dark sinking occurs. In this manner, the phenomenon that the pixel becomes black regardless of incidence of light with very high illuminance such as sunlight is called a black point phenomenon or blooming.

Also, if the level of the FD 314 of the pixel where the black spot phenomenon has occurred is excessively lowered, it is not possible to secure an operation point of the previous-stage circuit 310, and the current id1 of the current source transistor 316 varies. The current source transistor 316 of each pixel is connected to a common power source or a ground, variations in IR drop of the pixel affect sample levels of the other pixels when a current varies in a certain pixel. The pixel where the black spot phenomenon has occurred serves as an aggressor, while the pixels with sample levels varied due to the pixel serve as victims. As a result, streaking noise occurs.

Note that in a case where the discharge transistor 317 is provided as in the second embodiment, the overflowing electric charge is discarded on the side of the discharge transistor 317 for the pixel with the black spot (blooming), and the black spot phenomenon is thus less likely to occur. However, there is a likelihood that a part of the electric charge flows to the FD 314 even if the discharge transistor 317 is provided, and there is a likelihood that the black spot phenomenon is not completely solved. Furthermore, there is also a disadvantage that the addition of the discharge transistor 317 may lead to a degrease in a ratio of the effective area/the amount of charge per pixel. Therefore, it is desirable that the black spot phenomenon be curbed without using the discharge transistor 317.

As methods of curbing the black spot phenomenon without using the discharge transistor 317, two methods are conceivable. The first one is adjustment of a clip level of the FD 314. The second one is a method of determining whether or not a black spot phenomenon has occurred at the time of reading and replacing an output with a full code when a black spot phenomenon occurs.

In regard to the first method, the high level of the FD reset signal rst (in other words, the gate of the FD reset transistor 313) in the drawing is the power source voltage VDD, and the low level corresponds to the clip level of the FD 314. In the first embodiment, a difference between the high level and the low level (that is, the amplitude) is set to a value corresponding to a dynamic range. On the other hand, adjustment is made to a value obtained by further adding a margin to the value in the fifth embodiment. Here, the value corresponding to the dynamic range corresponds to a difference between the power source voltage VDD and the potential of the FD 314 when the digital signal becomes a full code.

It is possible to prevent the FD 314 from being excessively lowered due to blooming and collapsing the operation point of the previous-stage amplification transistor 315, by lowering the gate voltage (the low level of the FD reset signal rst) when the FD reset transistor 313 is turned off.

Note that the dynamic range changes depending on the analog gain of the ADC. A large dynamic range is needed when the analog gain is low, and on the contrary, only a small dynamic range is needed when the analog gain is high. Therefore, it is possible to change the gate voltage when the FD reset transistor 313 is turned off in accordance with the analog gain.

Figure 30:
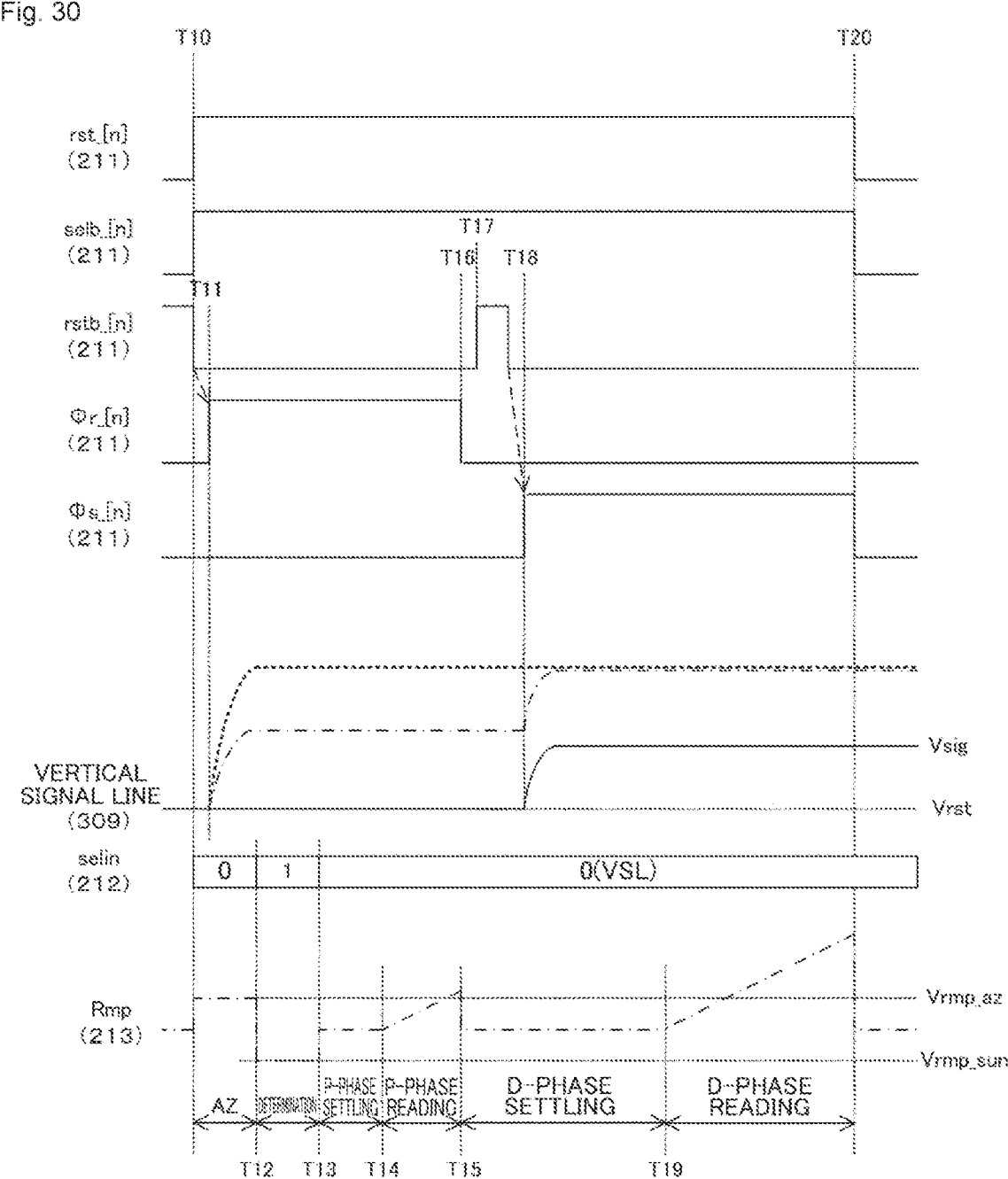
FIG. 30 is a timing chart showing an example of a reading operation according to the fifth embodiment of the present technique.

FIG. 30 is a timing chart showing an example of a reading operation according to the fifth embodiment of the present technique. Once the selection signal Φr is brought into a high level at the timing T11 immediately after the timing T10 when the reading is started, the potential of the vertical signal line 309 varies at the pixel on which sunlight has been incident. The one-dotted chain line in the drawing illustrates variations in potential of the vertical signal line 309 when weak sunlight is incident. The dotted line in the drawing illustrates variations in potential of the vertical signal line 309 when strong sunlight is incident.

The timing control circuit 212 supplies an input-side selection signal selin of "0", for example, and connects the comparison machine 285 to the vertical signal line 309 in an auto-zero period from the timing T10 to the timing T12. The timing control circuit 212 performs auto-zero with the auto-zero signal Az within the auto-zero period.

In regard to the second method, the timing control circuit 212 supplies an input-side selection signal selin of "1", for example, within a determination period from the timing T12 to the timing T13. The comparison machine 285 is disconnected from the vertical signal line 309 with the input-side selection signal selin, and is then connected to the node of the reference voltage VREF. The reference voltage VREF is set to an expected value in the level of the vertical signal line 309 when no blooming has occurred. Vrst corresponds to Vreg-Vgs2 on the assumption that the voltage between the gate and the source of the next stage amplification transistor 351 is Vgs2, for example. Also, the DAC 213 lowers the level of the ramp signal Rmp from Vrmp_az to Vrmp_sun within the determination period.

Also, in a case where blooming has not occurred in the determination period, Vrst of the reset level of the vertical signal line 309 is substantially the same as the reference voltage VREF, and the potential of the inverting input terminal (+) of the comparison machine 285 is not very different from that at the time of auto-zero. On the other hand, the non-inverting input terminal (−) is lowered from Vrmp_az to Vrmp_sun, and the comparison result VCO is thus brought into a high level.

On the contrary, in a case where blooming has occurred, the reset level Vrst becomes sufficiently higher than the reference voltage VREF, and the comparison result VCO is brought into a low level when the following expression is established.

$$Vrst - VREF > \text{Vrmp\_az} \cdot \text{Vrmp\_sun} \qquad \text{Expression 7}$$

In other words, the timing control circuit 212 can determine whether or not blooming has occurred depending on whether the comparison result VCO is brought into a low level in the determination period.

Note that it is necessary to secure a large margin (the right side of Expression 7) for sun determination to some extent to prevent erroneous determination from occurring due to variations in threshold voltage of the next-stage amplification transistor 351, a difference in IR drop of Vreg in the plane, and the like.

At and after the timing T13 after elapse of the determination period, the timing control circuit 212 causes the comparison machine 285 to be connected to the vertical signal line 309. Also, once a P-phase settling period from the timing T13 to T14 elapses, the P phase is read within a period from the timing T14 to T15. Once a D-phase settling period from the timing T15 to T19 elapses, the D phase is read within a period from the timing T19 to T20.

In a case where it is determined that no blooming has occurred during the determination period, the timing control circuit 212 controls the selector 292 with an output-side selection signal selout and causes a digital signal CDS_out after the CDS processing to be output as it is.

On the other hand, in a case where it is determined that blooming has occurred in the determination period, the timing control circuit 212 controls the selector 292 with the output-side selection signal selout and causes a full code FULL to be output instead of the digital signal CDS_out after the CDS processing. It is thus possible to curb the black spot phenomenon.

Note that it is also possible to apply the first to third modification examples of the first embodiment and the second to fourth embodiments to the fifth embodiment.

According to the fifth embodiment of the present technique, the timing control circuit 212 determines whether or not the black point phenomenon has occurred on the basis of the comparison result VCO and causes the full code to be output when the black point phenomenon has occurred in this manner, it is thus possible to curb the black point phenomenon.

6. Sixth Embodiment

In the aforementioned first embodiment, the vertical scanning circuit 211 performs control of causing all the rows (all the pixels) to perform exposure at the same time (that is, the global shutter operation). However, in a case where simultaneous exposure is not needed and low noise is required, such as during a test or when analysis is conducted, it is desirable that a rolling shutter operation be performed. A solid-state imaging element 200 according to the sixth embodiment is different from that according to the first embodiment in that the rolling shutter operation is performed during a test and the like.

Figure 31:
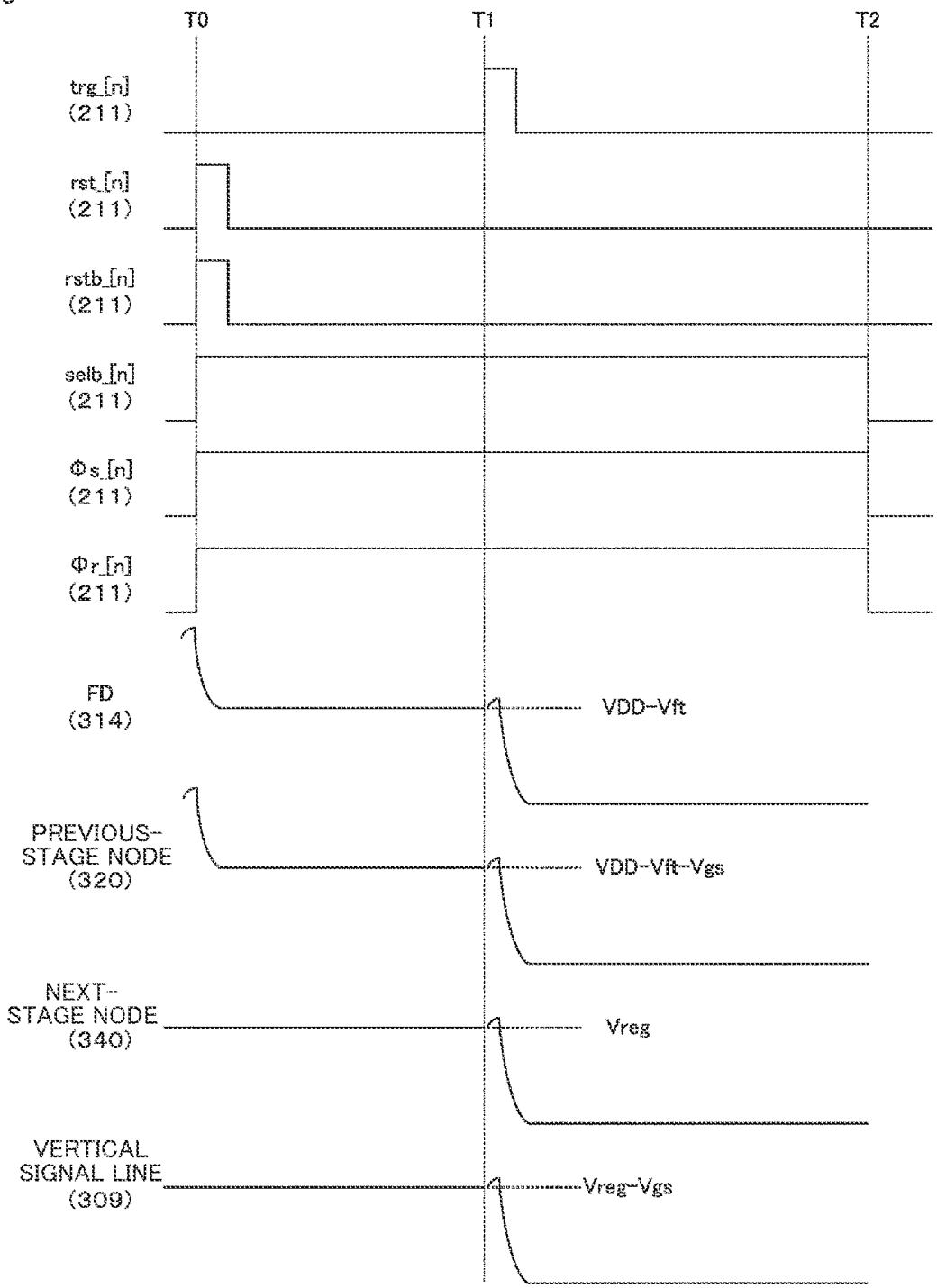
FIG. 31 is a timing chart showing an example of a rolling shutter operation according to a sixth embodiment of the present technique.

FIG. 31 is a timing chart showing an example of the rolling shutter operation according to the sixth embodiment of the present technique. The vertical scanning circuit 211 performs control of selecting a plurality of rows in order and causing them to start exposure. The drawing illustrates exposure control of the n-th row.

The vertical scanning circuit 211 supplies a next-stage selection signal selb in a high level, a selection signal Φr, and a selection signal Φs to the n-th row in the period from the timing T0 to T2. Also, the vertical scanning circuit 211 supplies an FD reset signal rst in a high level and a next-stage reset signal rstb to the n-th row over the pulse period at the timing T0 when the exposure is started. The vertical scanning circuit 211 supplies a transfer signal trg to the n-th row at the timing T1 when the exposure is ended. The solid-state imaging element 200 can generate image data with low noise through the rolling shutter operation in the drawing.

Note that the solid-state imaging element 200 according to the sixth embodiment performs the global shutter operation similarly to the first embodiment at the time of normal imaging.

In addition, it is also possible to apply the first to third modification examples of the first embodiment and the second to fifth embodiments to the sixth embodiment.

According to the sixth embodiment of the present technique, the vertical scanning circuit 211 performs control of selecting a plurality of rows in order and causing them to start exposure (that is, the rolling shutter operation) in this manner, and it is thus possible to generate image data with low noise.

7. Seventh Embodiment

According to the aforementioned first embodiment, a source of the previous-stage source follower (the previous-stage amplification transistor 315 and the current source transistor 316) is connected to the power source voltage VDD and reading is performed in units of rows in a state where the source follower is turned on. However, according to the driving method, there is a concern that circuit noise of the previous-stage source follower may be propagated to the next stage at the time of the reading in units of rows and random noise may increase. A solid-state imaging element 200 according to the seventh embodiment is different from that according to the first embodiment in that the noise is reduced by bringing the previous-stage source follower into an OFF state at the time of reading.

Figure 32:
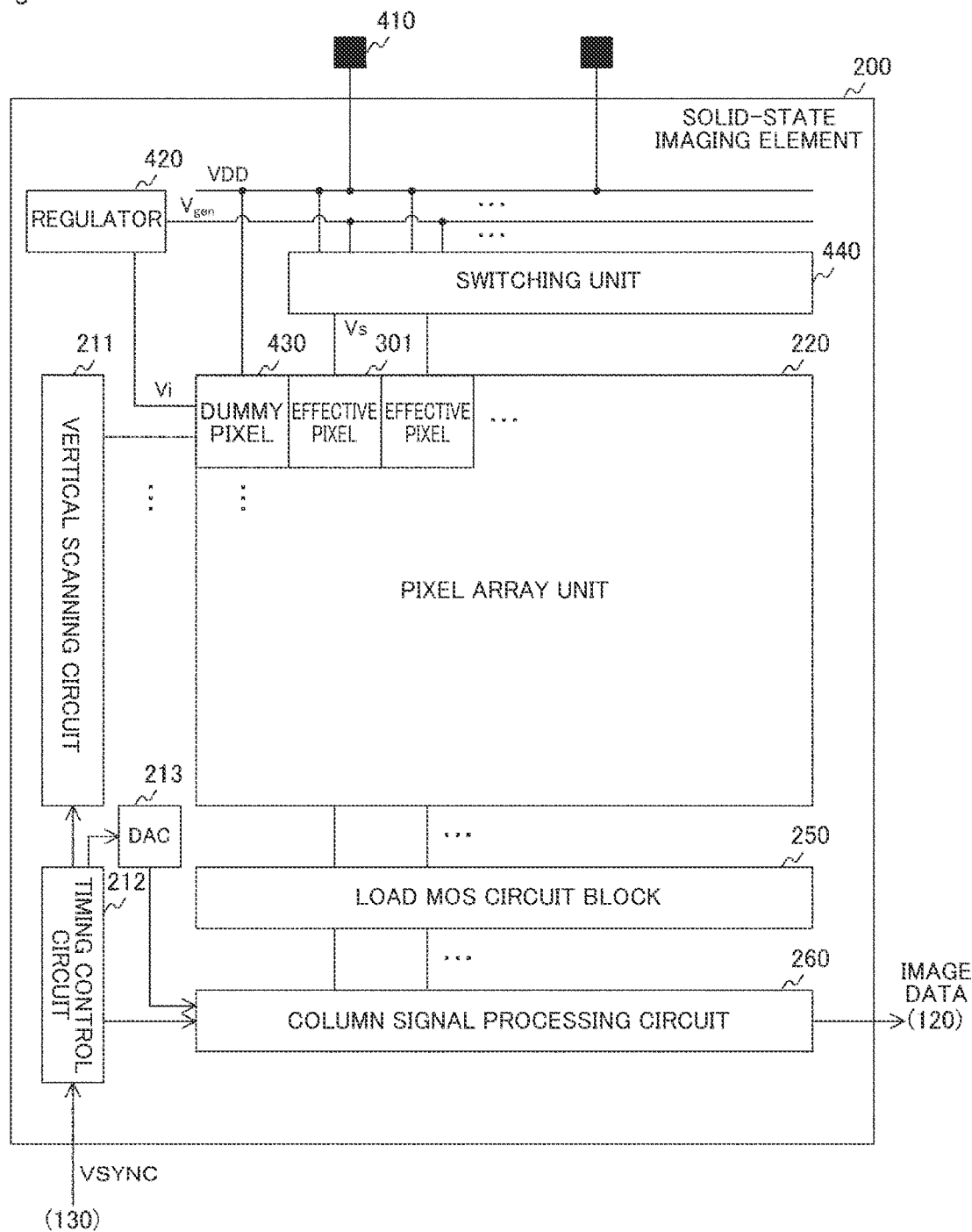
FIG. 32 is a block diagram showing a configuration example of a solid-state imaging element according to a seventh embodiment of the present technique.

FIG. 32 is a block diagram showing a configuration example of the solid-state imaging element 200 according to the seventh embodiment of the present technique. The solid-state imaging element 200 according to the seventh embodiment is different from that according to the first embodiment in that the solid-state imaging element 200 according to the seventh embodiment further includes a regulator 420 and a switching unit 440. In addition, a plurality of effective pixels 301 and a predetermined number of dummy pixels 430 are aligned in a pixel array unit 220 according to the seventh embodiment. The dummy pixels 430 are aligned in the surroundings of a region where the effective pixels 301 are aligned.

In addition, a power source voltage VDD is supplied to each of the dummy pixels 430, and a power source voltage VDD and a source voltage Vs are supplied to each of the effective pixels 301. A signal line that supplies the power source voltage VDD to the effective pixels 301 is omitted in the drawing. Also, the power source voltage VDD is supplied from a pad 410 outside the solid-state imaging element 200.

The regulator 420 generates a specific generation voltage $V_{gen}$ and supplies the generation voltage $V_{gen}$ to the switching unit 440 on the basis of an input voltage Vi from the dummy pixel 430. The switching unit 440 selects either the power source voltage VDD from the pad 410 and the generation voltage $V_{gen}$ from the regulator 420 and supplies the selected one to each of columns of the effective pixels 301 as a source voltage Vs.

Figure 33A:
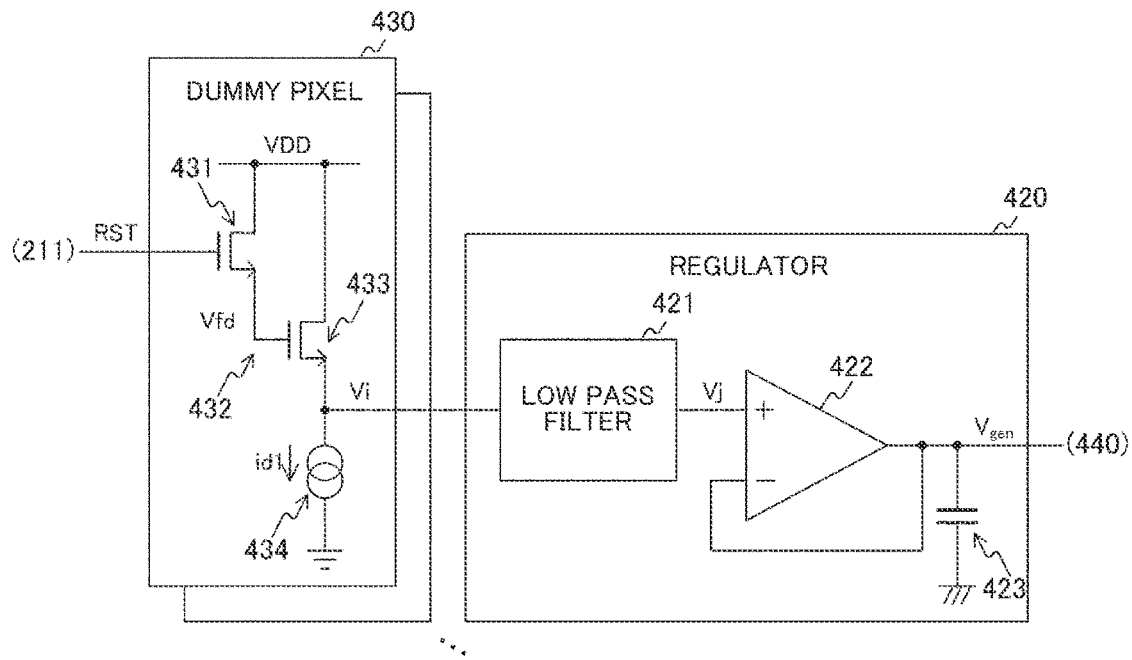
FIGS. 33A and 33B are circuit diagrams showing a configuration example of a dummy pixel, a regulator, and a switching unit according to the seventh embodiment of the present technique.
Figure 33B:
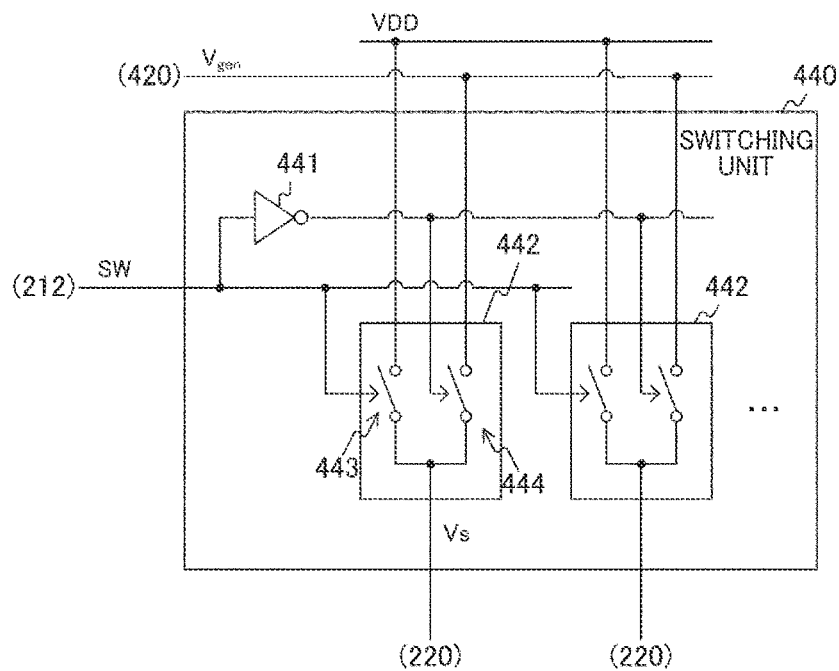

FIGS. 33A and 33B are circuit diagrams showing a configuration example of the dummy pixel 430, the regulator 420, and the switching unit 440 according to the seventh embodiment of the present technique. FIG. 33A in the drawing is a circuit diagram of the dummy pixel 430 and the regulator 420, and FIG. 33B in the drawing is a circuit diagram of the switching unit 440.

As shown as an example in FIG. 33A of the drawing, the dummy pixel 430 includes a reset transistor 431, an FD 432, an amplification transistor 433, and a current source transistor 434. The reset transistor 431 initializes the FD 432 in accordance with a reset signal RST from the vertical scanning circuit 211. The FD 432 accumulates an electric charge and generates a voltage in accordance with the amount of electric charge. The amplification transistor 433 amplifies the voltage level of the FD 432 and supplies the voltage as an input voltage Vi to the regulator 420.

Also, the reset transistor 431 and a source of the amplification transistor 433 are connected to the power source voltage VDD. The current source transistor 434 is connected to a drain of the amplification transistor 433. The current source transistor 434 supplies a current id1 in accordance with control of the vertical scanning circuit 211.

The regulator 420 includes a low pass filter 421, a buffer amplifier 422, and a capacitance element 423. The low pass filter 421 allows a low frequency band component of less than a predetermined frequency in a signal of the input voltage Vi to pass therethrough as an output voltage Vj.

The output voltage Vj is input to a non-inverting input terminal (+) of the buffer amplifier 422. An inverting input terminal (−) of the buffer amplifier 422 is connected to the output terminal thereof. The capacitance element 423 holds a voltage of the output terminal of the buffer amplifier 422 as $V_{gen}$. $V_{gen}$ is supplied to the switching unit 440.

As shown as an example in FIG. 33A of the drawing, the switching unit 440 includes an inverter 441 and a plurality of switching circuits 442. The switching circuits 442 are disposed for each column of the effective pixels 301.

The inverter 441 inverts a switching signal SW from the timing control circuit 212. The inverter 441 supplies the inverted signal to each of the switching circuits 442.

The switching circuits 442 selects either the power source voltage VDD and the generation voltage $V_{gen}$ and supplies the selected one as a source voltage Vs to a corresponding column in the pixel array unit 220. The switching circuits 442 include switches 443 and 444. The switch 443 opens and closes a path between the node of the power source voltage VDD and the corresponding column in accordance with the switching signal SW. The switch 444 opens and closes a path between the node of the generation voltage $V_{gen}$ and the corresponding column in accordance with the inverted signal of the switching signal SW.

Figure 34:
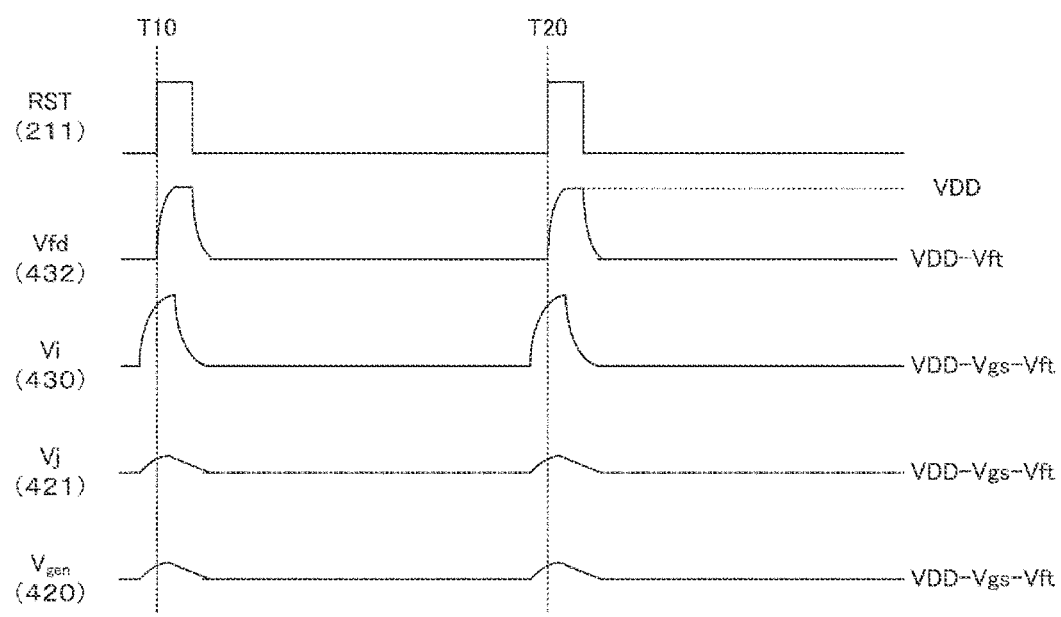
FIG. 34 is a timing chart showing an example of operations of the dummy pixel and the regulator according to the seventh embodiment of the present technique.

FIG. 34 is a timing chart showing an example of operations of the dummy pixel 430 and the regulator 420 according to the seventh embodiment of the present technique. The vertical scanning circuit 211 supplies a reset signal RST in a high level (the power source voltage VDD here) to each dummy pixel 430 at the timing T10 immediately before reading of a certain row. A potential Vfd of the FD 432 in the dummy pixel 430 is initialized to the power source voltage VDD. Then, the potential Vfd varies to VDD-Vft through reset feedthrough when the reset signal RST is brought into a low level.

In addition, the input voltage Vi drops to VDD-Vgs-Vsig after reset. Vj and $V_{gen}$ become substantially constant voltages through passage through the low pass filter 421.

At and after the timing T20 immediately before reading of the next row, similar control is performed for each row, and a specific generation voltage $V_{gen}$ is supplied.

Figure 35:
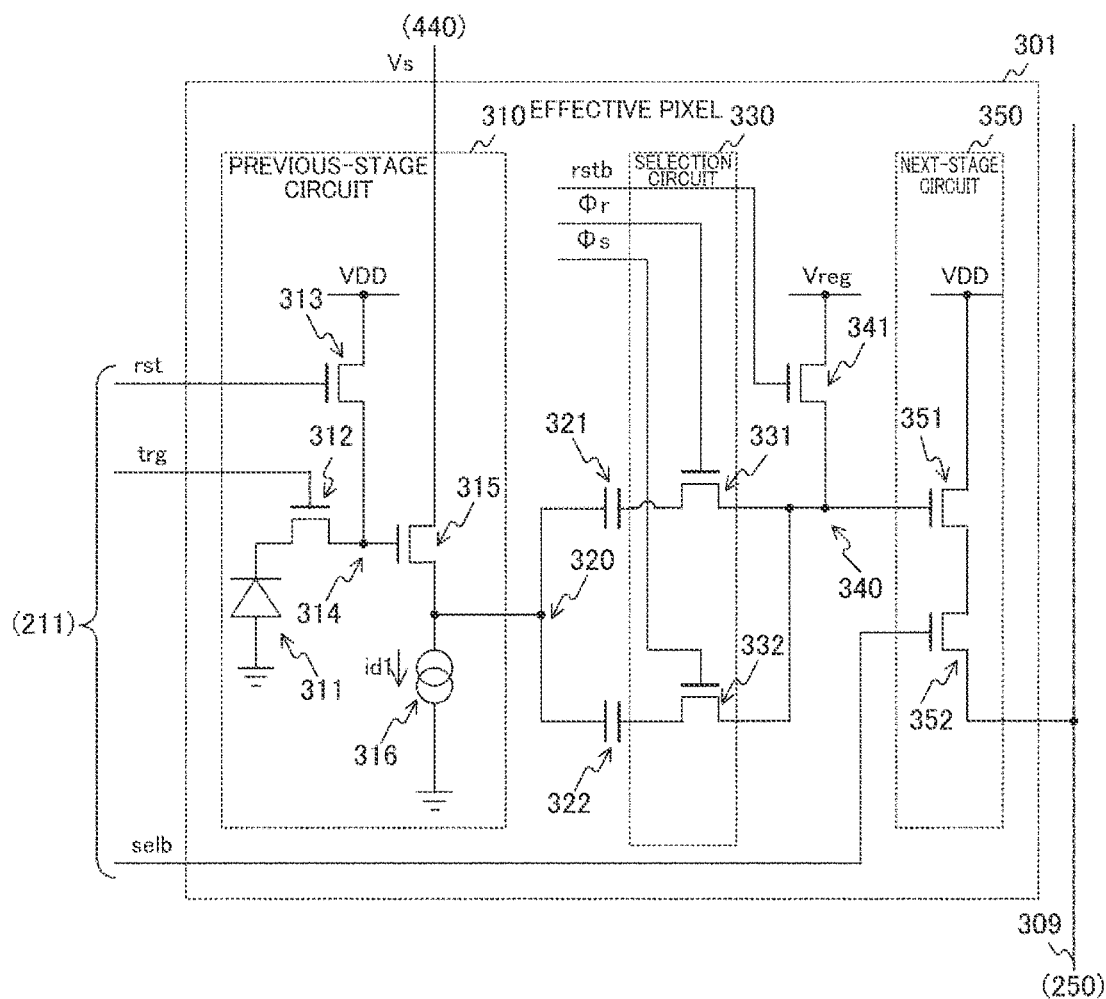
FIG. 35 is a circuit diagram showing a configuration example of an effective pixel according to the seventh embodiment of the present technique.

FIG. 35 is a circuit diagram showing a configuration example of the effective pixel 301 according to the seventh embodiment of the present technique. The circuit configuration of the effective pixel 301 is similar to that of the pixel 300 according to the first embodiment in that the source voltage Vs from the switching unit 440 is supplied to the source of the previous-stage amplification transistor 315.

Figure 36:
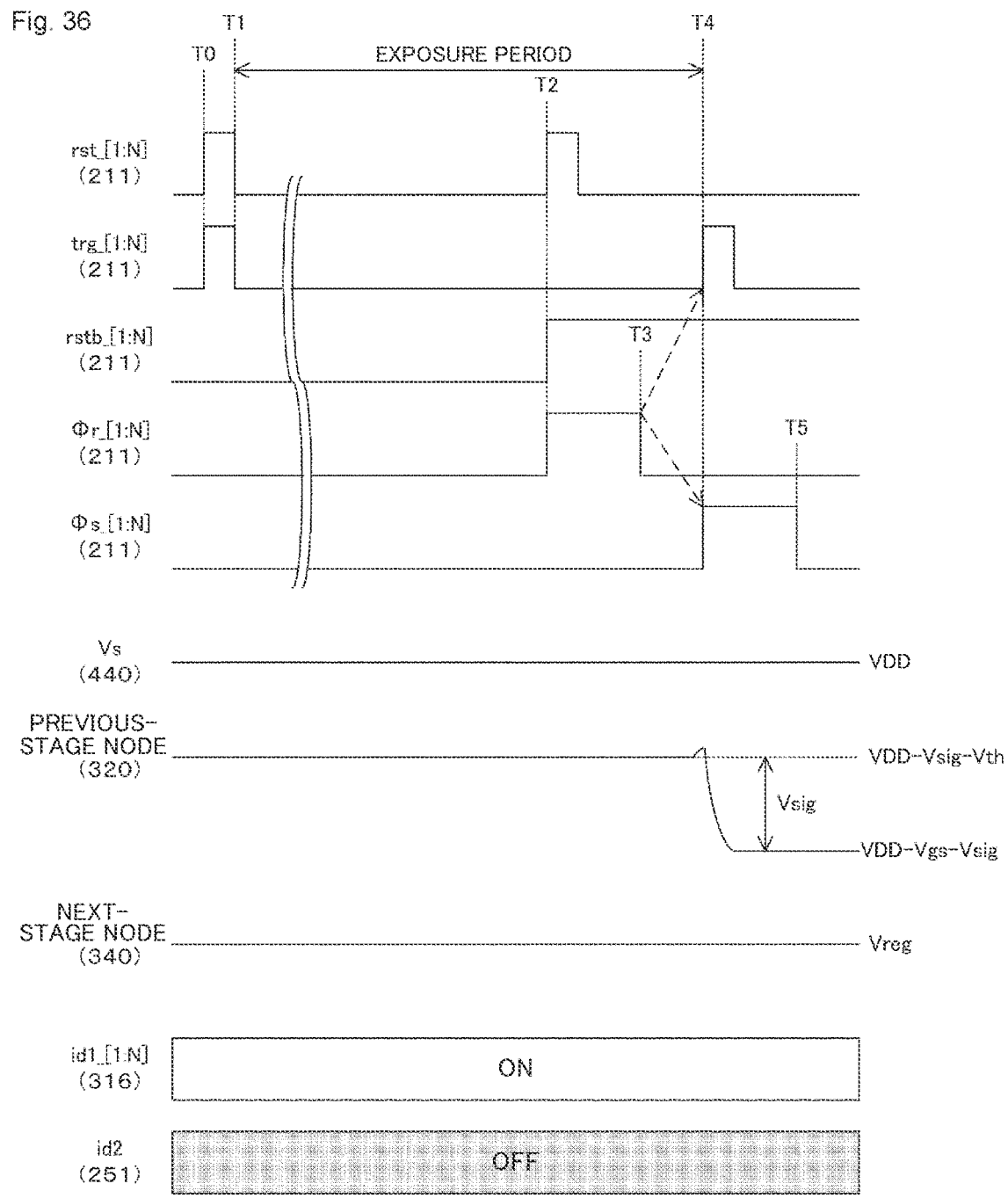
FIG. 36 is a timing chart showing an example of a global shutter operation according to the seventh embodiment of the present technique.

FIG. 36 is a timing chart showing an example of the global shutter operation according to the seventh embodiment of the present technique. In the seventh embodiment, the switching unit 440 selects the power source voltage VDD and supplies the power source voltage VDD as a source voltage Vs when exposure is performed at the same time at all the pixels. Also, the voltage of the previous-stage node drops from VDD-Vgs-Vth to VDD-Vgs-Vsig at the timing T4. Here, Vth is a threshold voltage of the transfer transistor 312.

Figure 37:
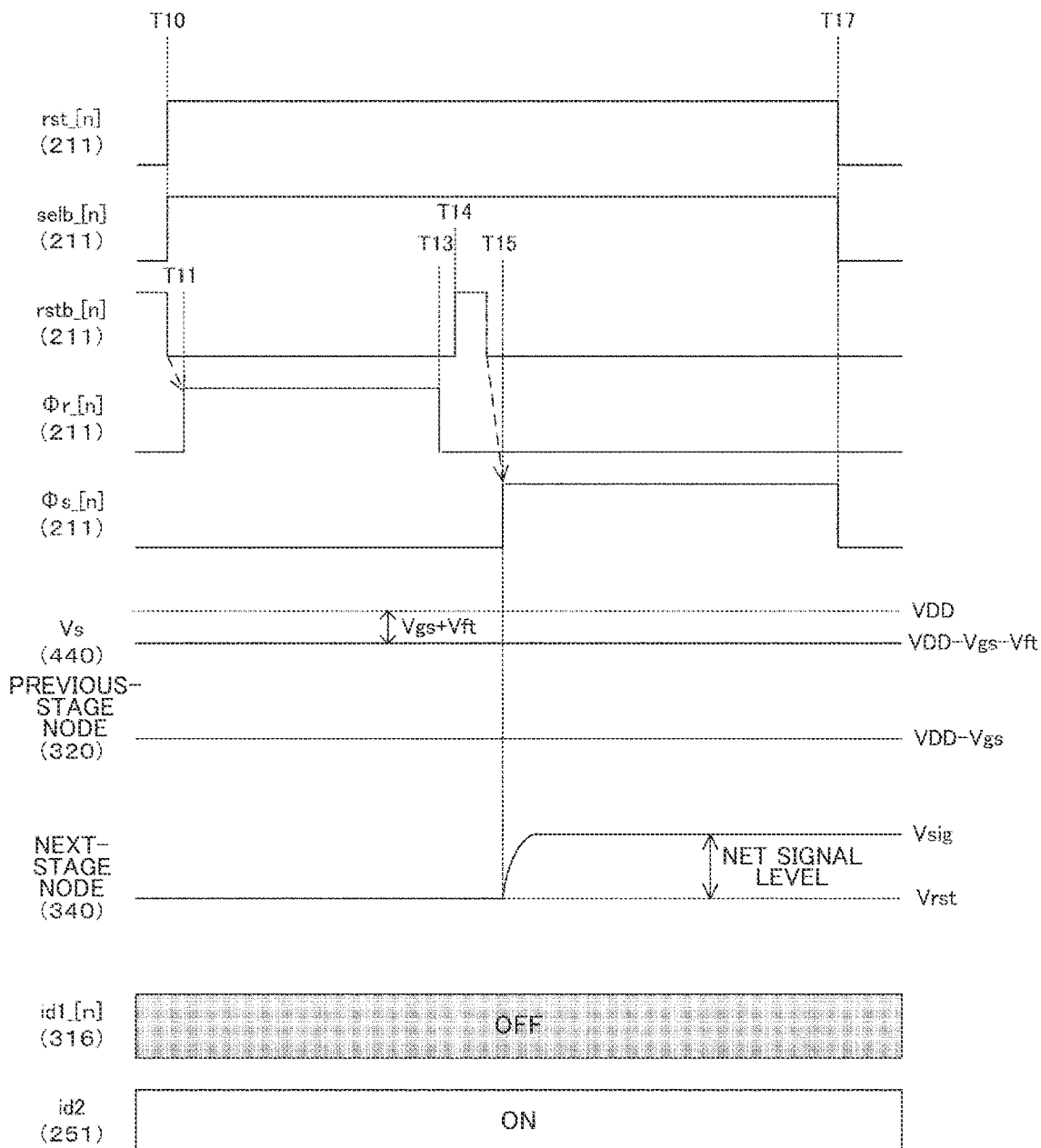
FIG. 37 is a timing chart showing an example of a reading operation according to the seventh embodiment of the present technique.

FIG. 37 is a timing chart illustrating an example of a reading operation according to the seventh embodiment of the present technique. In the seventh embodiment, the switching unit 440 selects the generation voltage $V_{gen}$ and supplies the generation voltage $V_{gen}$ as a source voltage Vs at the time of reading. The generation voltage $V_{gen}$ is adjusted to VDD-Vgs-Vft. Also, in the seventh embodiment, the vertical scanning circuit 211 controls the current source transistor 316 of all the rows (all the pixels) and stops the supply of the current id1.

FIG. 38 is a diagram for explaining effects of the seventh embodiment of the present technique. In the first embodiment, the source follower (the previous-stage amplification transistor 315 and the current source transistor 316) of the pixel 300 as a reading target is turned on in the reading of each row. However, there is a concern that circuit noise of the previous-stage source follower is propagated to the next stage (the capacitance element, the next-stage source follower, the ADC) and reading noise increases according to the driving method.

For example, kTC noise generated in the pixels at the time of the global shutter operation is 450 (μVrms) as shown as an example in the drawing in the first embodiment. Also, noise generated in the previous-stage source follower (the previous-stage amplification transistor 315 and the current source transistor 316) at the time of reading for each row is 380 (μVrms). Noise generated at and after the next-stage source follower is 160 (μVrms). Therefore, total noise is 610 (μVrms). In this manner, the amount of contribution of noise of the previous source follower in the total noise value is relatively large in the first embodiment.

In order to reduce noise of the previous-stage source follower, a voltage (Vs) that can be subjected to voltage adjustment is supplied to the source of the previous-stage source follower as described above in the seventh embodiment. The switching unit 440 selects the power source voltage VDD and supplies the power source voltage VDD as a source voltage Vs at the time of the global shutter (exposure) operation. Then, the switching unit 440 switches the source voltage Vs to VDD-Vgs-Vft after an end of the exposure. Also, the timing control circuit 212 turns on the previous-stage current source transistor 316 at the time of the global shutter (exposure) operation and turns off the current source transistor 316 after an end of the exposure.

Through the aforementioned control, the potentials of each previous-stage node become the same at the time of the global shutter operation and at the time of the reading for each row, and PRNU can be improved as shown as an example in FIGS. 36 and 37. Also, since the previous-stage source follower is brought into an OFF state at the time of reading for each row, circuit noise of the source follower does not occur and becomes 0 (µVrms) as shown as an example in FIG. 38. Note that the previous-stage amplification transistor 315 in the previous-stage source follower is in an ON state.

According to the seventh embodiment of the present technique, the previous-stage source follower is brought into an OFF state at the time of reading, and it is thus possible to reduce noise generated in the source follower.

8. Eighth Embodiment

Although whether or not the black spot phenomenon has occurred is determined for each pixel in the aforementioned fifth embodiment, the reference voltage VREF also varies at the same proportion when the power source voltage VDD varies in a case where the reference voltage VREF in accordance with the power source voltage VDD is used. There is a concern that detection accuracy of the black spot phenomenon is degraded due to variations in reference voltage VREF. A solid-state imaging element 200 according to an eighth embodiment is different from that according to the fifth embodiment in that a reference voltage VREF is generated with reference to a potential Vreg when a next-stage node is initialized.

Figure 39:
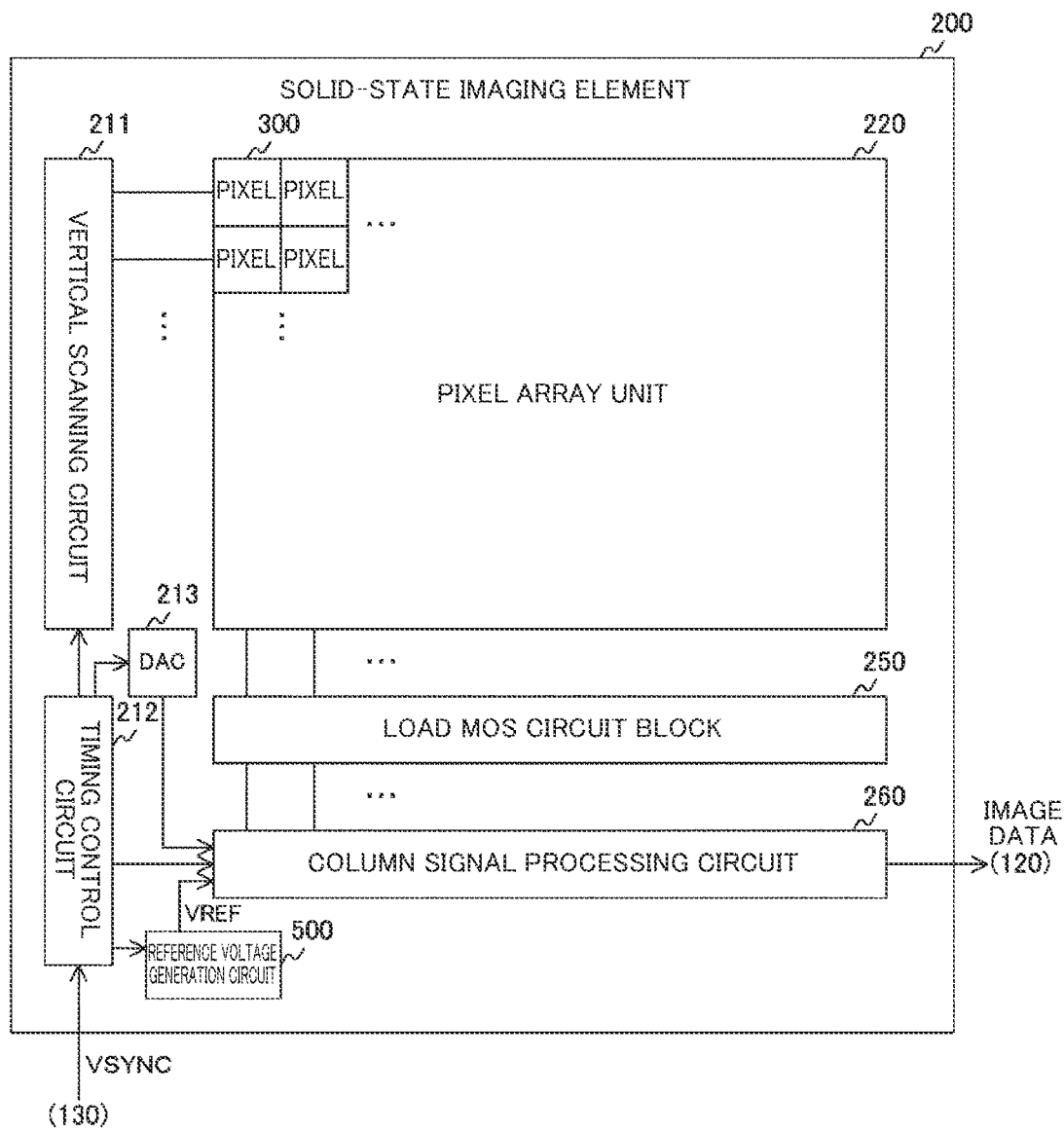
FIG. 39 is a block diagram showing a configuration example of a solid-state imaging element according to an eighth embodiment of the present technique.

FIG. 39 is a block diagram showing a configuration example of the solid-state imaging element 200 according to the eighth embodiment of the present technique. The solid-state imaging element 200 according to the eighth embodiment is different from that according to the fifth embodiment in that the solid-state imaging element 200 according to the eighth embodiment further includes a reference voltage generation circuit 500. The reference voltage generation circuit 500 generates a reference voltage VREF with reference to the potential Vreg when a next stage node is initialized and supplies the reference voltage VREF to a column signal processing circuit 260.

Figure 40:
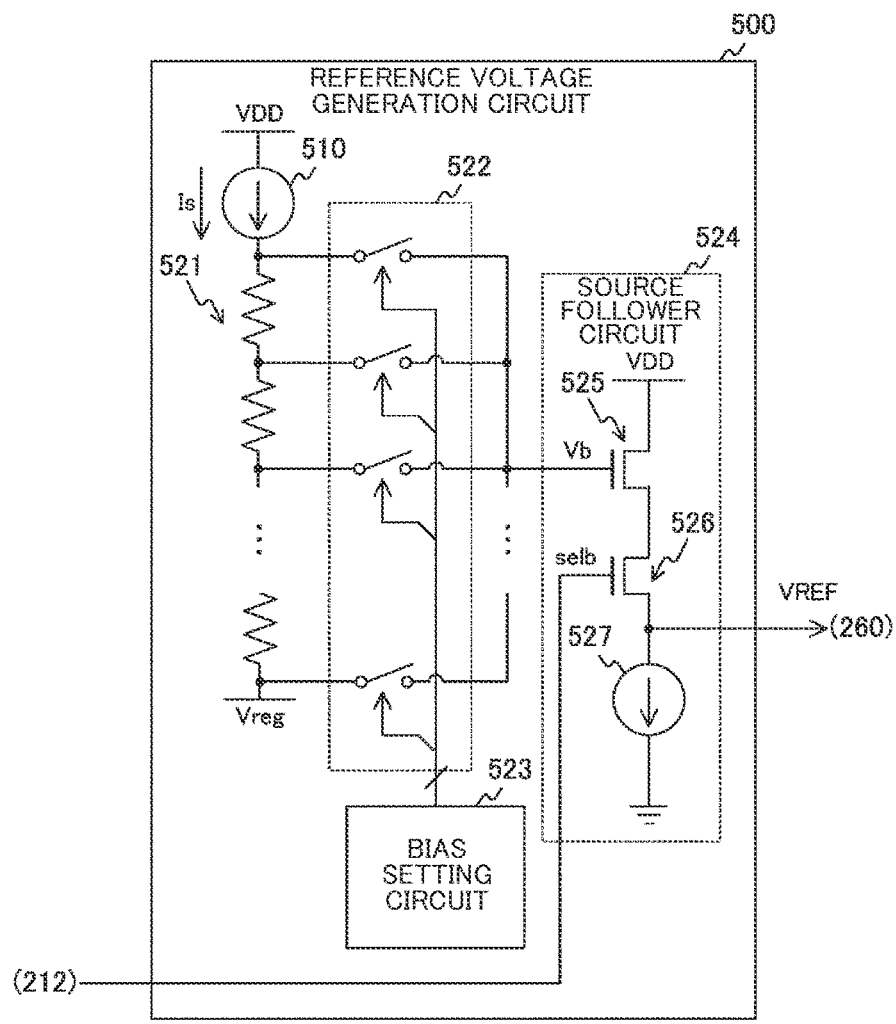
FIG. 40 is a circuit diagram showing a configuration example of a reference voltage generation circuit according to the eighth embodiment of the present technique.

FIG. 40 is a circuit diagram showing a configuration example of the reference voltage generation circuit 500 according to the eighth embodiment of the present technique. The reference voltage generation circuit 500 according to the eighth embodiment includes a current source 510, a predetermined number of resistors 521, a bias selection unit 522, a bias setting circuit 523, and a source follower circuit 524.

The current source 510 supplies a predetermined reference current Is. The predetermined number of resistors 521 are connected in series between a node of a potential Vreg and the current source 510. The bias selection unit 522 selects any one of connection nodes of each of the current source 510, the predetermined number of resistors 521, and the node of the potential Vreg in accordance with a control signal from the bias setting circuit 523. The bias selection unit 522 supplies the voltage of the selected connection node as a bias voltage Vb to the source follower circuit 524.

On the assumption that the number of resistors 521 is K (K is an integer), the number of connection nodes between the current source 510 and the potential Vreg is K+1. A switch is provided for each connection node in the bias selection unit 522. Each switch opens and closes a path between the corresponding connection node and the source follower circuit 524.

The bias setting circuit 523 controls the bias selection unit 522 with a control signal and selects any one of the K+1 connection nodes. The control signal is a K+1-bit digital signal, for example. The bias setting circuit 523 includes a register or the like holding the control signal.

The source follower circuit 524 generates a reference voltage VREF from the bias voltage Vb. The source follower circuit 524 includes an amplification transistor 525, a selection transistor 526, and a load MOS transistor 527. As these transistors, nMOS transistors are used, for example. In the drawing, the load MOS transistor 527 is represented by a diagram symbol of a current source.

A connection configuration of the amplification transistor 525, the selection transistor 526, and the load MOS transistor 527 is similar to a connection configuration of a next-stage amplification transistor 351, a next-stage selection transistor 352, and a load MOS transistor 251 inside a next-stage circuit 350. However, a bias voltage Vb from the bias selection unit 522 is applied to a gate of the amplification transistor 525. Also, a next-stage selection signal selb is input to a gate of the selection transistor 526. Additionally, a voltage of the connection node of the selection transistor 526 and the load MOS transistor 527 is supplied as a reference voltage VREF to the column signal processing circuit 260.

The bias voltage Vb is controlled in K+1 levels with a control signal. In a case where the connection node of the resistor 521 on the side closest to the power source and the current source 510 is selected by the bias selection unit 522, for example, the bias voltage Vb to be supplied is represented by the following expression.

$$Vb = Vreg + K \times Is \times R \qquad \text{Expression 8}$$

In the above expression, R is a resistance value of each of the K resistors 521.

Also, on the assumption that a voltage between the gate and the source of the amplification transistor 525 is Vgs and a voltage between the drain and the source of the selection transistor 526 is Vds, the reference voltage VREF is represented by the following expression. Note that the amplification transistor 525 and the selection transistor 526 operate in a saturation region, and the voltage Vgs between the gate and the source and the voltage Vds between the drain and the source are assumed to be constant.

$$VREF = Vb \cdot Vgs \cdot Vds \qquad \text{Expression 9}$$

On the basis of Expression 8 and Expression 9, the reference voltage VREF is a value with reference to the potential Vreg.

Figure 41:
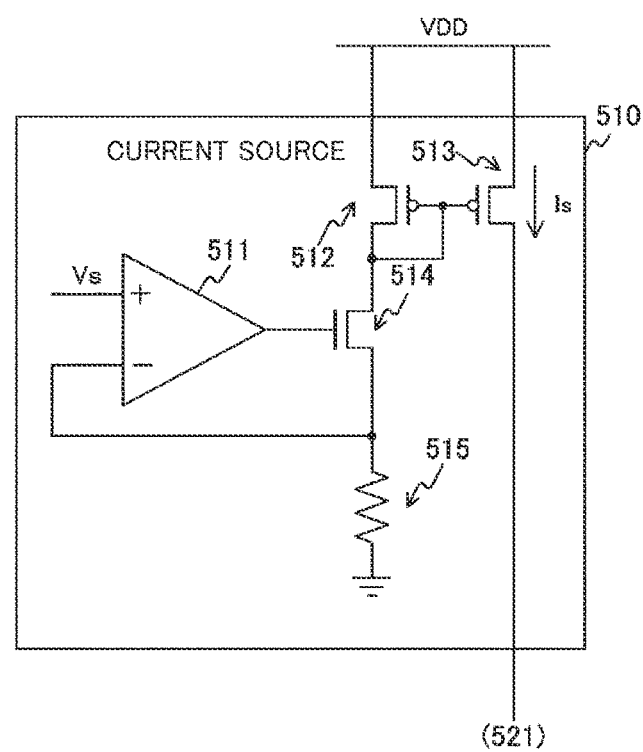
FIG. 41 is a circuit diagram showing a configuration example of a current source according to an eighth embodiment of the present technique.

Here, the reference current Is supplied by the current source 510 is preferably a value that depends on variations in resistance value of the resistors 521. Such resistance dependency can be realized by a circuit of the current source 510 shown as an example in FIG. 41, for example. The current source 510 includes a comparison machine 511, pMOS transistors 512 and 513, an nMOS transistor 514, and a resistor 515.

A drain of the pMOS transistor 512 is connected to the power source voltage VDD, and a gate and a source are short-circuited. A drain of the pMOS transistor 513 is connected to the power source voltage VDD, and a gate is connected to the gate of the pMOS transistor 512. The reference current Is is supplied from a source of the pMOS transistor 513.

Also, the nMOS transistor 514 is inserted between the source of the pMOS transistor 512 and the resistor 515. The comparison machine 511 compares the predetermined reference voltage Vs with the connection node of the nMOS transistor 514 and the resistor 515 and supplies a comparison result to the gate of the nMOS transistor 514. The resistor 515 is of the same type as that of the resistor 521, and variations in resistance value due to the power source, the process, and the temperature are in similar levels.

Figure 42:
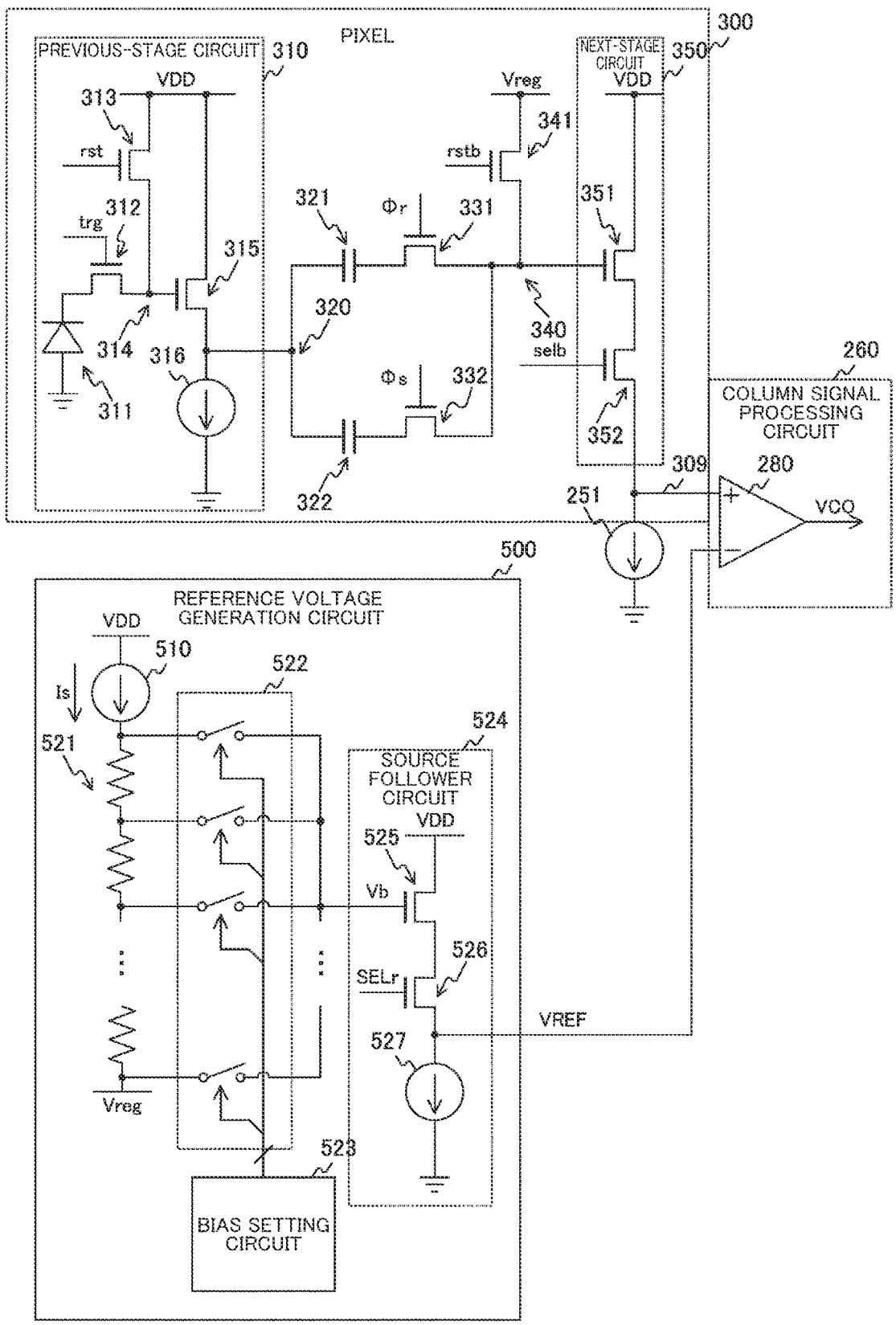
FIG. 42 is a diagram showing a pixel, a reference voltage generation circuit, and a column signal processing circuit according to the eighth embodiment of the present technique.

FIG. 42 is a diagram showing the pixel 300, the reference voltage generation circuit 500, and the column signal processing circuit 260 according to the eighth embodiment of the present technique.

The previous-stage circuit 310 inside the pixel 300 generates a predetermined reset level and a signal level in accordance with the amount of exposure in order and causes the capacitance elements 321 and 322 to hold them. The next-stage reset transistor 341 initializes the next-stage node 340 to a potential Vreg that is lower than the power source voltage VDD of the previous-stage circuit 310. The next-stage circuit 350 reads the reset level and the signal level via the next-stage node 340 and outputs the reset level and the signal level to the vertical signal line 309.

Also, the reference voltage generation circuit 500 generates the reference voltage VREF with reference to the potential Vreg. The comparator 280 inside the column signal processing circuit 260 compares the reference voltage VREF with the potential of the vertical signal line 309. The next-stage configuration of the comparator 280 is similar to that in the fifth embodiment shown as an example in FIG. 28. Additionally, the global shutter operation and the reading operation according to the eighth embodiment are similar to those according to the fifth embodiment shown as an example in FIGS. 29 and 30.

Figure 43:
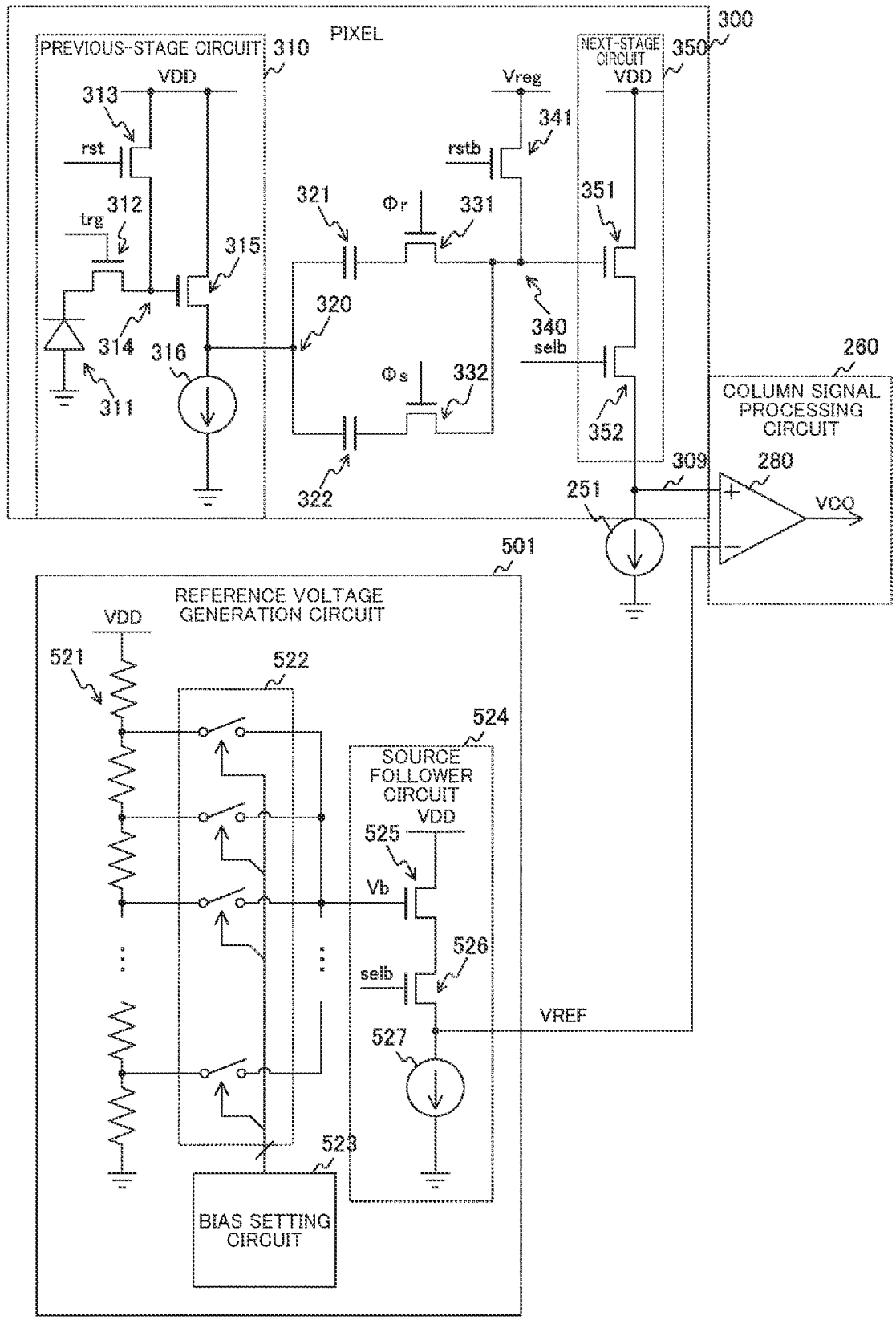
FIG. 43 is a diagram illustrating a pixel, a reference voltage generation circuit, and a column signal processing circuit according to a comparative example.

As shown as an example in FIG. 30, the comparison result VCO of the comparator 280 immediately after the FD reset indicates whether or not the black spot phenomenon has occurred. In a case where the black spot phenomenon has occurred, the next-stage digital signal processing unit 290 changes the digital signal to a full code. In this manner, degradation of image quality due to the Here, a configuration in which the reference voltage generation circuit 500 in FIG. 42 is replaced with a reference voltage generation circuit 501 that generates the reference voltage VREF in accordance with the power source voltage VDD will be illustrated in FIG. 43 as a comparative example. The reference voltage generation circuit 501 according to the comparative example does not include a current source 510. In addition, the predetermined number of resistors 521 are inserted in series between the power source voltage VDD and the ground voltage. With the circuit configuration in the drawing, the voltage obtained by dividing the power source voltage VDD is supplied as a bias voltage Vb to the source follower circuit 524. On the basis of Expression 9, the reference voltage VREF is a voltage in accordance with the power source voltage VDD.

In the circuit of the voltage domain scheme as in the drawing, the potential of the vertical signal line is raised as the amount of light increases. Therefore, the potential Vreg when the next-stage node 340 is initialized is needed to be a constant value that is lower than the power source voltage VDD. If the power source voltage VDD varies due to variations in manufacturing process or temperature at the time of reading of the reset level, the reference voltage VREF also varies in accordance with the variations. On the other hand, since the reset level of the comparison target is read via the next-stage node 340 initialized by the potential Vreg that is different from the power source voltage VDD, only the reference voltage VREF varies. As a result, detection accuracy of the black spot phenomenon of the comparator 280 may be degraded in the comparative example.

On the other hand, the reference voltage generation circuit 500 generates the reference voltage VREF with reference to the potential Vreg as described above in the eighth embodiment. Therefore, even if the power source voltage VDD varies, the reference voltage VREF does not vary in accordance with the variations. Although the potential Vreg may vary independently from the power source voltage VDD, the reference voltage VREF also similarly varies in accordance with the variations in potential Vreg by Expression 8 and Expression 9, and the influences that variations in potential Vreg give the comparison result are canceled out. As a result, it is possible to improve detection accuracy of the black spot phenomenon as compared with the comparative example. In this manner, it is possible to improve image quality of image data.

Figure 44:
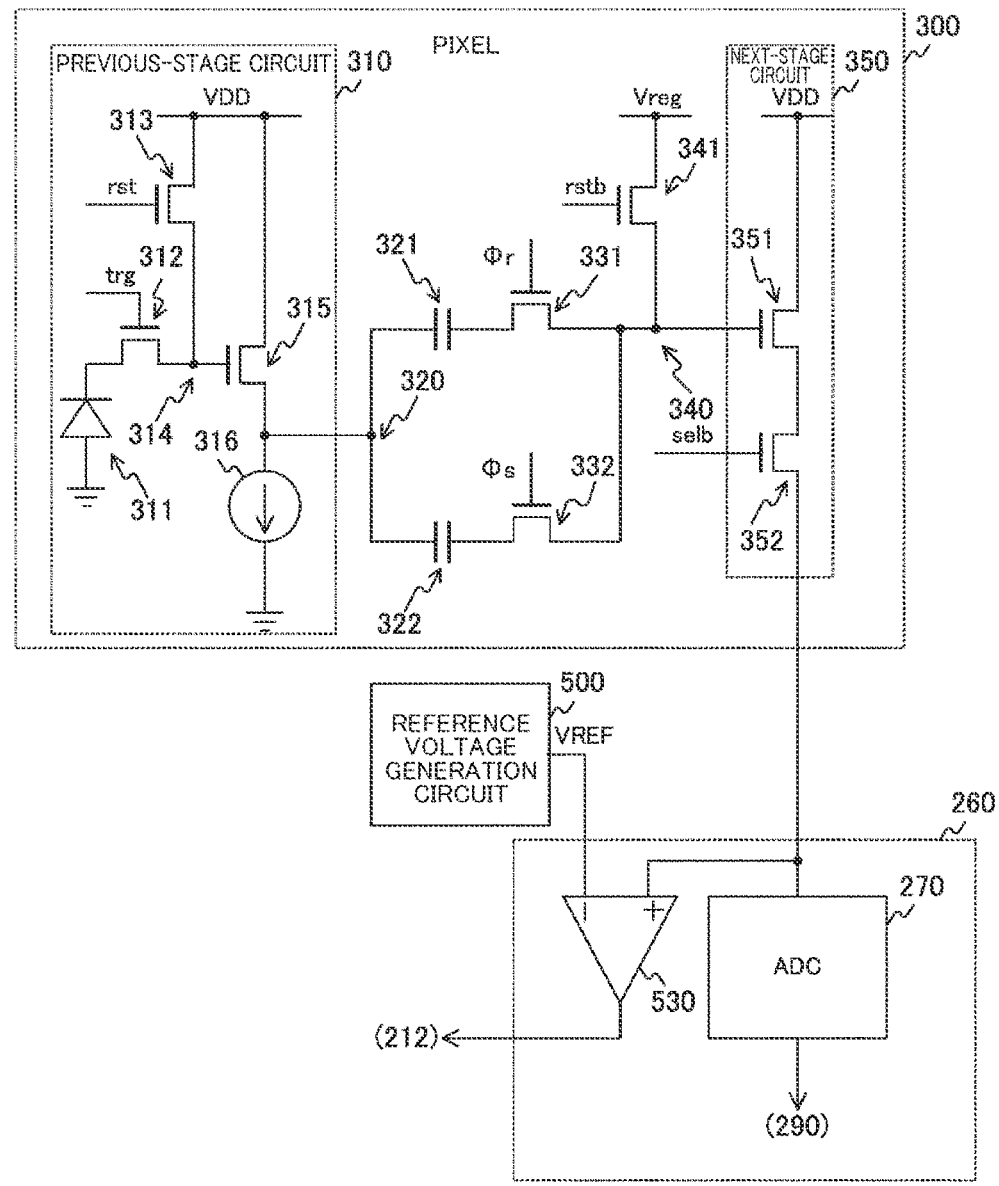
FIG. 44 is a diagram showing another example of a pixel, a reference voltage generation circuit, and a column signal processing circuit according to the eighth embodiment of the present technique.

Note that although the comparator 280 in the ADC 270 detects the black spot phenomenon as shown as an example in FIG. 28, the present technique is not limited to the configuration. For example, it is also possible to employ a configuration in which a comparator 530 is added in parallel with the ADC 270 as shown as an example in FIG. 44 and the comparator 530 detects the black point phenomenon. In this case, the selector 281 inside the ADC 270 is not needed. Also, it is possible to apply each embodiment other than the fifth embodiment to the eighth embodiment.

According to the eighth embodiment of the present technique, the reference voltage generation circuit 500 generates the reference voltage VREF with reference the potential Vreg when the next stage node 340 is initialized in this manner, and it is thus possible to improve detection accuracy of the black spot phenomenon.

First Modification Example

Although the selection circuit 330 that individually opens and closes each of the path between the capacitance element 321 and the next-stage node 340 and the path between the capacitance element 322 and the next-stage node 340 is disposed inside the pixel in the aforementioned eighth embodiment, the present technique is not limited to the configuration. A solid-state imaging element 200 according to a first modification example of the eighth embodiment is different from that according to the eighth embodiment in that the solid-state imaging element 200 according to the first modification example includes a sampling transistor instead of the selection circuit 330.

Figure 45:
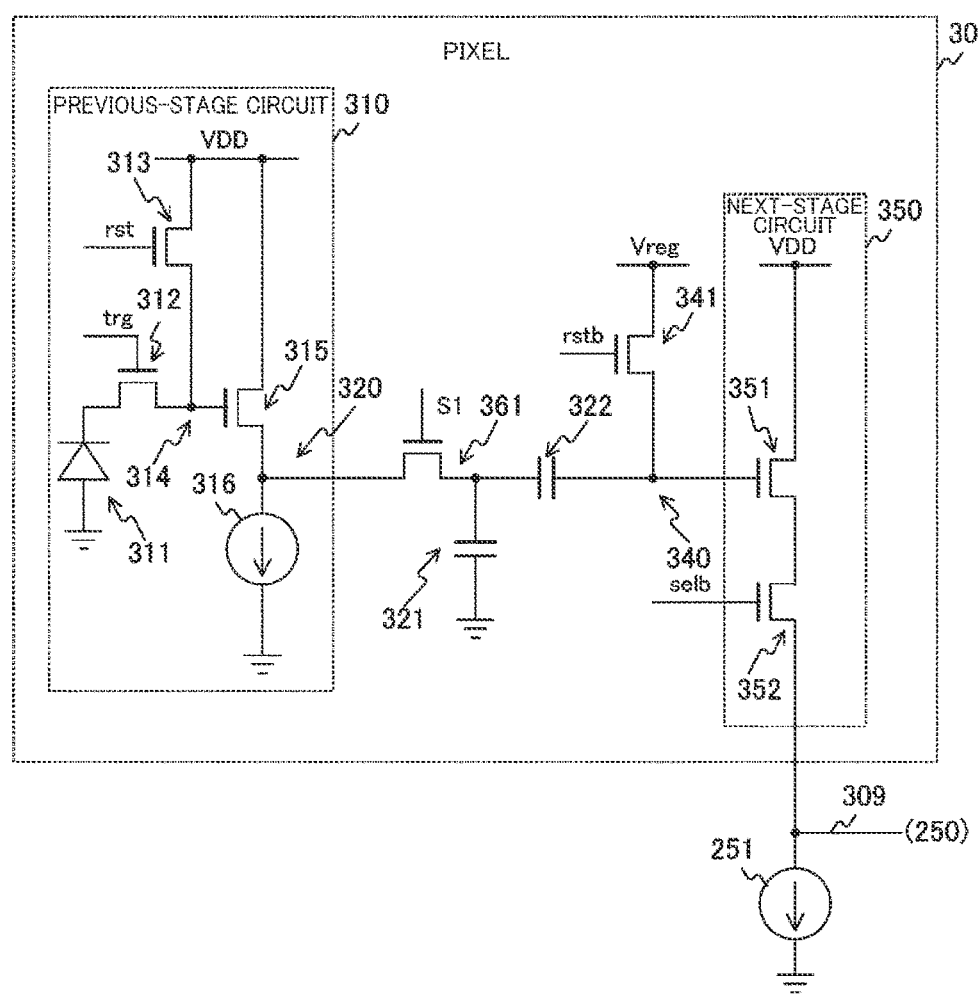
FIG. 45 is a circuit diagram showing a configuration example of a pixel according to a first modification example of the eighth embodiment of the present technique.

FIG. 45 is a circuit diagram showing a configuration example of a pixel 300 according to the first modification example of the eighth embodiment of the present technique. The pixel 300 according to the first modification example of the eighth embodiment includes a sampling transistor 361 instead of the selection circuit 330. The sampling transistor 361 opens and closes a path between the previous-stage node 320 and a node to which an end of each of the capacitance elements 321 and 322 is commonly connected in accordance with a control signal S1. In addition, the other end of the capacitance element 322 is connected to a next-stage node 340. The exposure control and the reading control of the pixel 300 in the drawing are described in FIG. 5.5.2 of NPL 1, for example.

The reference voltage generation circuit 500 that generates the reference voltage VREF with reference to the potential Vreg is disposed similarly to the eighth embodiment in the first modification example of the eighth embodiment shown as an example in the drawing as well. Since the next-stage node 340 is initialized with the potential Vreg in the pixel 300 shown as an example in the drawing as well, it is possible to improve detection accuracy of the black spot phenomenon by generating the reference voltage VREF with reference to the potential Vreg. In addition, it is possible to reduce the number of transistors per pixel as compared with a case where the selection circuit 330 including two transistors is provided.

According to the first modification example of the eighth embodiment of the present technique, the sampling transistor 361 is disposed instead of the selection circuit 330 including two transistors in this manner, and it is thus possible to reduce the number of transistors per pixel.

Second Modification Example

Although the bias voltage is switched in the K+1 levels by selecting the connection node of each of the current source 510 and the K resistors 521 in the aforementioned eighth embodiment, the number of resistors 521 increases as the number of levels of control increases with this configuration. A solid-state imaging element 200 according to a second modification example of the eighth embodiment is different from that according to the eighth embodiment in that a bias voltage is generated by using a variable current source.

Figure 46:
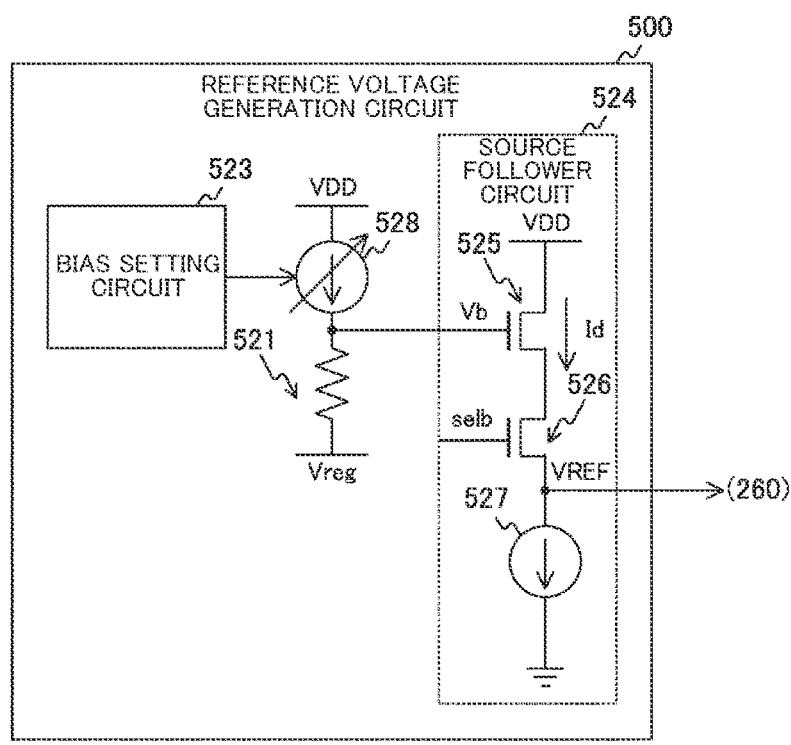
FIG. 46 is a circuit diagram showing a configuration example of a reference voltage generation circuit according to a second modification example of the eighth embodiment of the present technique.

FIG. 46 is a circuit diagram showing a configuration example of a reference voltage generation circuit 500 according to the second modification example of the eighth embodiment of the present technique. The reference voltage generation circuit 500 according to the second modification example of the eighth embodiment is different from that according to the first embodiment in that the reference voltage generation circuit 500 according to the second modification example includes a variable current source 528 instead of the current source 510 and the number of resistors 521 is only one.

The variable current source 528 supplies a current in accordance with a control signal from a bias setting circuit 523 as a reference current Is. For example, the bias setting circuit 523 supplies a voltage signal as a control signal, and the variable current source 528 generates the reference current Is in proportion to a level of the signal. An MOS transistor, for example, is used as the variable current source 528. In addition, a connection node between the variable current source 528 and the resistor 521 is connected to a gate of the amplification transistor 525.

As shown as an example in the drawing, it is possible to continuously control the bias voltage Vb by generating the bias voltage Vb by using a reference current Is in accordance with a control signal. Also, the number of resistors 521 can be reduced.

According to the second modification example of the eighth embodiment of the present technique, the variable current source 528 supplies the reference current Is in accordance with the control signal in this manner, and it is thus possible to reduce the number of resistors 521.

9. Example of Application to Mobile Object

The technology according to the present disclosure (the present technology) can be applied to various products. For example, the technology according to the present disclosure may be realized as a device equipped in any type of moving body such as an automobile, an electric vehicle, a hybrid electric vehicle, a motorcycle, a bicycle, a personal mobility device, an airplane, a drone, a ship, and a robot.

Figure 47:
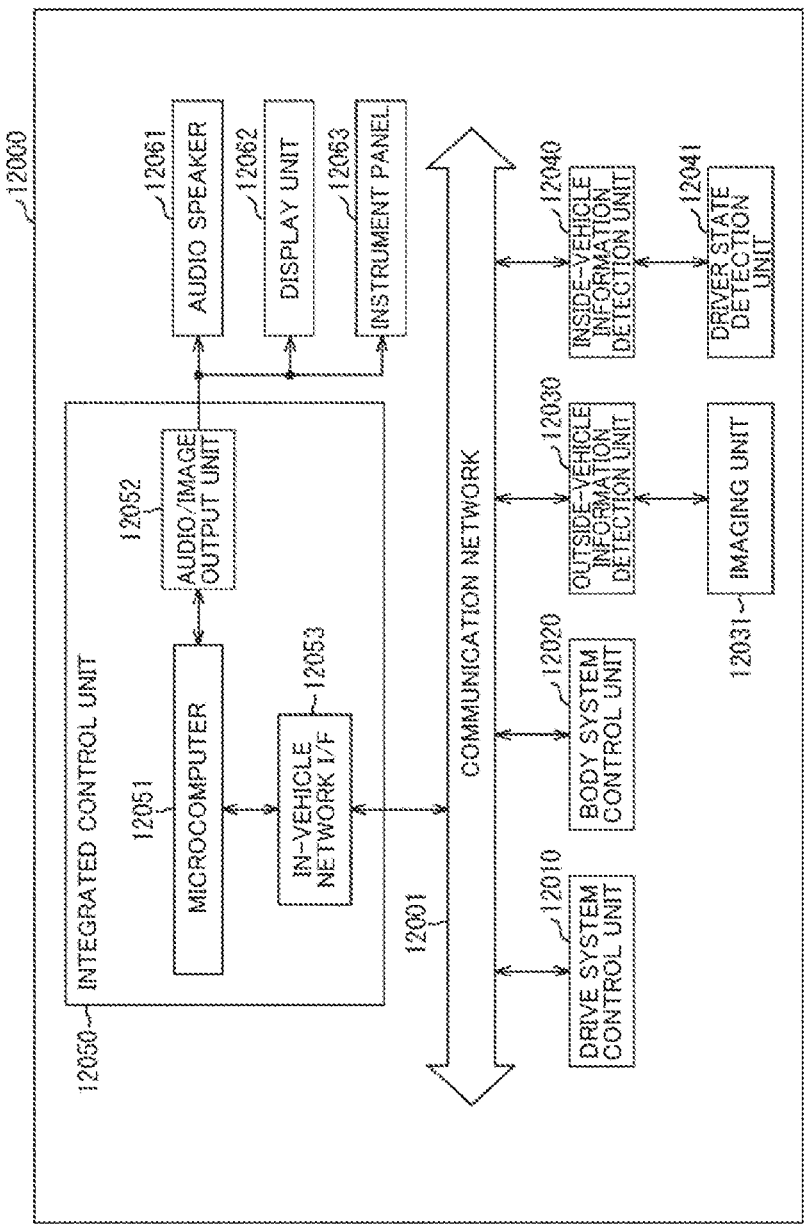
FIG. 47 is a block diagram showing a schematic configuration example of a vehicle control system.

FIG. 47 is a block diagram showing a schematic configuration example of a vehicle control system, which is an example of a moving body control system to which the technique according to the present disclosure can be applied.

The vehicle control system 12000 includes a plurality of electronic control units connected thereto via a communication network 12001. In the example illustrated in FIG. 47, the vehicle control system 12000 includes a drive system control unit 12010, a body system control unit 12020, an outside-vehicle information detection unit 12030, an inside-vehicle information detection unit 12040, and an integrated control unit 12050. In addition, as a functional configuration of the integrated control unit 12050, a microcomputer 12051, an audio/image output unit 12052, and an in-vehicle network interface (I/F) 12053 are shown.

The drive system control unit 12010 controls an operation of an apparatus related to a drive system of a vehicle according to various programs. For example, the drive system control unit 12010 functions as a driving force generator for generating a driving force of a vehicle such as an internal combustion engine or a driving motor, a driving force transmission mechanism for transmitting a driving force to wheels, a steering mechanism for adjusting a turning angle of a vehicle, and a control apparatus such as a braking apparatus that generates a braking force of a vehicle.

The body system control unit 12020 controls operations of various devices mounted in the vehicle body according to various programs. For example, the body system control unit 12020 functions as a control device of a keyless entry system, a smart key system, a power window device, or various lamps such as a headlamp, a back lamp, a brake lamp, a turn signal, and a fog lamp. In this case, radio waves transmitted from a portable device that substitutes for a key or signals of various switches may be input to the body system control unit 12020. The body system control unit 12020 receives inputs of the radio waves or signals and controls a door lock device, a power window device, and a lamp of the vehicle.

The outside-vehicle information detection unit 12030 detects information on the outside of the vehicle having the vehicle control system 12000 mounted thereon. For example, an imaging unit 12031 is connected to the outside-vehicle information detection unit 12030. The outside-vehicle information detection unit 12030 causes the imaging unit 12031 to capture an image of the outside of the vehicle and receives the captured image. The outside-vehicle information detection unit 12030 may perform object detection processing or distance detection processing for peoples, cars, obstacles, signs, and letters on the road on the basis of the received image.

The imaging unit 12031 is an optical sensor that receives light and outputs an electrical signal according to the amount of the received light. The imaging unit 12031 can also output the electrical signal as an image or distance measurement information. In addition, the light received by the imaging unit 12031 may be visible light or invisible light such as infrared light.

The inside-vehicle information detection unit 12040 detects information on the inside of the vehicle. For example, a driver state detection unit 12041 that detects a driver's state is connected to the inside-vehicle information detection unit 12040. The driver state detection unit 12041 includes, for example, a camera that captures an image of a driver, and the inside-vehicle information detection unit 12040 may calculate a degree of fatigue or concentration of the driver or may determine whether or not the driver is dozing on the basis of detection information input from the driver state detection unit 12041.

The microcomputer 12051 can calculate control target values for the driving force generation device, the steering mechanism, or the braking device based on the information on the interior and exterior of the vehicle obtained by the outside-vehicle information detection unit 12030 or the inside-vehicle information detection unit 12040, and output control commands to the drive system control unit 12010. For example, the microcomputer 12051 can perform coordinated control for the purpose of implementing functions of an advanced driver assistance system (ADAS) including vehicle collision avoidance, impact mitigation, following traveling based on an inter-vehicle distance, constant vehicle speed driving, vehicle collision warnings, and vehicle lane departure warning.

Further, the microcomputer 12051 can perform cooperative control for the purpose of automated driving or the like in which autonomous travel is performed without depending on operations of the driver, by controlling the driving force generator, the steering mechanism, or the braking device and the like on the basis of information about the surroundings of the vehicle, the information being acquired by the outside-vehicle information detection unit 12030 or the inside-vehicle information detection unit 12040.

In addition, the microcomputer 12051 can output a control command to the body system control unit 12020 on the basis of the information acquired by the outside-vehicle information detection unit 12030 outside the vehicle. For example, the microcomputer 12051 can perform cooperative control for the purpose of preventing glare, such as switching from a high beam to a low beam, by controlling the headlamp according to the position of a preceding vehicle or an oncoming vehicle detected by the outside-vehicle information detection unit 12030.

The audio/image output unit 12052 transmits an output signal of at least one of sound and an image to an output device capable of visually or audibly notifying a passenger or the outside of the vehicle of information. In the example of FIG. 47, an audio speaker 12061, a display unit 12062, and an instrument panel 12063 are illustrated as examples of the output device. The display unit 12062 may include at least one of an on-board display and a head-up display, for example.

Figure 48:
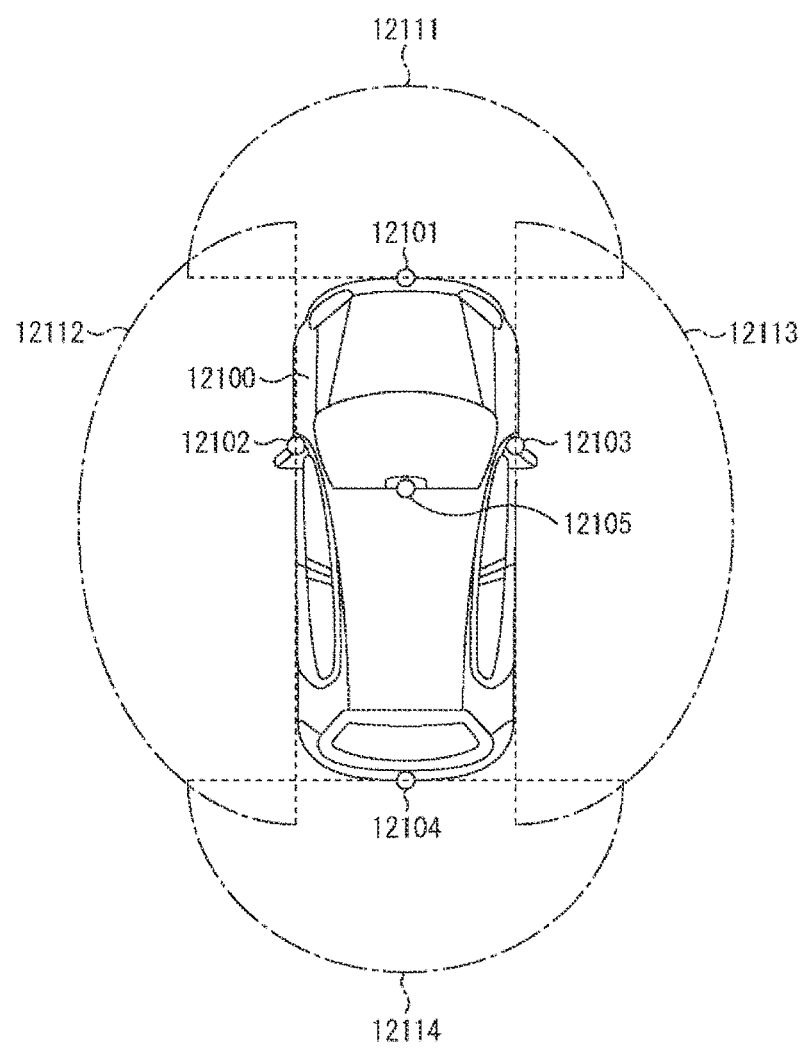
FIG. 48 is an explanatory diagram showing an example of installation positions of imaging units.

FIG. 48 is a diagram showing an example of an installation position of the imaging unit 12031.

In FIG. 48, imaging units 12101, 12102, 12103, 12104, and 12105 are provided as the imaging units 12031.

The imaging units 12101, 12101, 12102, 12103, 12104, and 12105 are provided at positions such as a front nose, side-view mirrors, a rear bumper, a back door, and an upper portion of a windshield in a vehicle interior of the vehicle 12100, for example. The imaging unit 12101 provided on the front nose and the imaging unit 12105 provided in the upper portion of the windshield in the vehicle interior mainly acquire images of the front of the vehicle 12100. The imaging units 12102 and 12103 provided on the side-view mirrors mainly acquire images of a lateral side of the vehicle 12100. The imaging unit 12104 provided on the rear bumper or the back door mainly acquires images of the rear of the vehicle 12100. The imaging unit 12105 provided in the upper portion of the windshield in the vehicle interior is mainly used for detection of preceding vehicles, pedestrians, obstacles, traffic signals, traffic signs, lanes, and the like.

FIG. 48 illustrates an example of imaging ranges of the imaging units 12101 to 12104. An imaging range 12111 indicates an imaging range of the imaging unit 12101 provided at the front nose, imaging ranges 12112 and 12113 respectively indicate the imaging ranges of the imaging units 12102 and 12103 provided at the side-view mirrors, and an imaging range 12114 indicates the imaging range of the imaging unit 12104 provided at the rear bumper or the back door. For example, by superimposing image data captured by the imaging units 12101 to 12104, it is possible to obtain a bird's-eye view image viewed from the upper side of the vehicle 12100.

At least one of the imaging units 12101 to 12104 may have a function for obtaining distance information. For example, at least one of the imaging units 12101 to 12104 may be a stereo camera constituted by a plurality of imaging elements or may be an imaging element that has pixels for phase difference detection.

For example, the microcomputer 12051 can extract, particularly, a closest three-dimensional object on a path along which the vehicle 12100 is traveling, which is a three-dimensional object traveling at a predetermined speed (for example, 0 km/h or higher) in the substantially same direction as the vehicle 12100, as a preceding vehicle by acquiring a distance to each of three-dimensional objects in the imaging ranges 12111 to 12114 and temporal change in the distance (a relative speed with respect to the vehicle 12100) on the basis of the distance information obtained from the imaging units 12101 to 12104. Further, the microcomputer 12051 can set an inter-vehicle distance which should be secured in front of the vehicle in advance with respect to the preceding vehicle and can perform automated brake control (also including following stop control) or automated acceleration control (also including following start control). In this way, it is possible to perform cooperative control for the purpose of automated driving or the like in which a vehicle autonomously travels without depending on operations of the driver.

For example, the microcomputer 12051 can classify and extract three-dimensional data regarding three-dimensional objects into two-wheeled vehicles, normal vehicles, large vehicles, pedestrians, and other three-dimensional objects such as electric poles based on distance information obtained from the imaging units 12101 to 12104 and can use the three-dimensional data to perform automated avoidance of obstacles. For example, the microcomputer 12051 differentiates surrounding obstacles of the vehicle 12100 into obstacles which can be viewed by the driver of the vehicle 12100 and obstacles which are difficult to view. Then, the microcomputer 12051 determines a collision risk indicating the degree of risk of collision with each obstacle, and when the collision risk is equal to or higher than a set value and there is a possibility of collision, an alarm is output to the driver through the audio speaker 12061 or the display unit 12062, forced deceleration or avoidance steering is performed through the drive system control unit 12010, and thus it is possible to perform driving support for collision avoidance.

At least one of the imaging units 12101 to 12104 may be an infrared camera that detects infrared rays. For example, the microcomputer 12051 can recognize a pedestrian by determining whether there is a pedestrian in the captured image of the imaging units 12101 to 12104. Such pedestrian recognition is performed by, for example, a procedure in which feature points in the captured images of the imaging units 12101 to 12104 as infrared cameras are extracted and a procedure in which pattern matching processing is performed on a series of feature points indicating an outline of an object to determine whether or not the object is a pedestrian. When the microcomputer 12051 determines that there is a pedestrian in the captured images of the imaging units 12101 to 12104 and the pedestrian is recognized, the audio/image output unit 12052 controls the display unit 12062 so that a square contour line for emphasis is superimposed and displayed with the recognized pedestrian. In addition, the audio/image output unit 12052 may control the display unit 12062 so that an icon indicating a pedestrian or the like is displayed at a desired position.

An example of the vehicle control system to which the technology according to the present disclosure can be applied has been described above. The technology according to the present disclosure can be applied to the imaging unit 12031 within the configuration described above. Specifically, for example, the imaging device 100 of FIG. 1 can be applied to the imaging unit 12031. By applying the technique according to the present disclosure to the imaging unit 12031, a captured image that is easy to see can be obtained by reducing kTC noise, and the fatigue of a driver can thus be reduced.

It should be noted that the above-described embodiments show examples for embodying the present technique, and matters in the embodiments and matters specifying the invention in the claims have a corresponding relationship with each other. Similarly, the matters specifying the invention in the claims and the matters in the embodiments of the present technology having the same name have a corresponding relationship with each other. However, the present technology is not limited to the embodiments and can be embodied by applying various modifications to the embodiments without departing from the gist thereof.

The effects described in the present specification are merely examples and are not intended as limiting, and other effects may be obtained.

The present technology can also have the following configurations.

(1) A solid-state imaging element including: first and second capacitance elements; a previous-stage circuit that generates a predetermined reset level and a signal level in accordance with an amount of exposure in order and causes the first and second capacitance elements to hold the predetermined reset level and the signal level; a next-stage reset transistor that initializes a level of a next-stage node connected to any one of the first and second capacitance element to a predetermined potential that is lower than a power source voltage of the previous-stage circuit; a next-stage circuit that reads the reset level and the signal level via the next-stage node and outputs the reset level and the signal level to a vertical signal line; a reference voltage generation circuit that generates a reference voltage with reference to the predetermined potential; and a comparator that compares the reference voltage and a potential of the vertical signal line.

(2) The solid-state imaging element according to (1), in which the reference voltage generation circuit includes a current source that supplies a predetermined reference current, a predetermined number of resistors that are connected in series between the current source and the node of the predetermined potential, a bias selection unit that selects, as a bias voltage, a voltage of any one of connection nodes of each of the current source, the predetermined number of resistors, and the node of the predetermined potential, and a source follower circuit that generates the reference voltage from the bias voltage.

(3) The solid-state imaging element according to (1), in which the reference voltage generation circuit includes a variable current source that supplies a current in accordance with a control signal as a reference current, a resistor that is inserted between the variable current source and the node of the predetermined potential, and a source follower circuit that generates the reference voltage from a bias voltage of a connection node of the variable current source and the resistor.

(4) The solid-state imaging element according to (1) or (2), further including: a sampling transistor that opens and closes a path between the previous-stage circuit and a connection node to which one end of each of the first and second capacitance elements is commonly connected, in which the other end of the second capacitance element is connected to the next-stage node.

(5) The solid-state imaging element according to (1) or (2), further including: a selection circuit that performs control of connecting one of the first and second capacitance elements to a predetermined next-stage node, control of disconnecting both the first and second capacitance elements from the next-stage node, and control of connecting the other one of the first and second capacitance elements to the next-stage node in order, in which the next-stage reset transistor initializes a level of the next-stage node when both the first and second capacitance elements are disconnected from the next-stage node.

(6) The solid-state imaging element according to (5), further including: a previous-stage selection transistor that opens and closes a path between the previous-stage circuit and a predetermined previous-stage node; and a previous-stage reset transistor that initializes a level of the previous-stage node, in which one end of each of the first and second capacitance elements is commonly connected to the previous-stage node, and the other end of each of the first and second capacitance elements is connected to the selection circuit.

(7) The solid-state imaging element according to (5) or (6), in which the previous-stage circuit includes a photoelectric conversion element, a previous-stage transfer transistor that transfers an electric charge from the photoelectric conversion element to a floating diffusion layer, a first reset transistor that initializes the floating diffusion layer, and a previous-stage amplification transistor that amplifies a voltage of the floating diffusion layer and outputs the voltage to a predetermined previous-stage node, and one end of each of the first and second capacitance elements is commonly connected to the previous-stage node, and the other end of each of the first and second capacitance elements is connected to the selection circuit.

(8) The solid-state imaging element according to (7), further including: a switching unit that adjusts a source voltage to be supplied to a source of the previous-stage amplification transistor, in which the previous-stage circuit further includes a current source transistor that is connected to a drain of the previous-stage amplification transistor, and the current source transistor transitions from an ON state to an OFF state after an end of an exposure period.

(9) The solid-state imaging element according to (7) or (8), in which the previous-stage circuit further includes a discharge transistor that discharges the electric charge from the photoelectric conversion element.

(10) The solid-state imaging element according to any one of (7) to (9), further including: a control circuit that controls a reset power source voltage of the previous-stage circuit, in which the first reset transistor initializes a voltage of a floating diffusion layer to the reset power source voltage, and the control circuit changes, in a reading period for reading the reset level and the signal level, the reset power source voltage to a voltage that is different from a voltage in an exposure period.

(11) The solid-state imaging element according to (1), further including: a digital signal processing unit that adds a pair of continuous frames, in which the previous-stage circuit causes one of the first and second capacitance elements to hold the reset level and then causes the other one of the first and second capacitance elements to hold the signal level during an exposure period of one of the pair of frames, and causes the other one of the first and second capacitance elements to hold the reset level and then causes the one of the first and second capacitance elements to hold the signal level during an exposure period of the other one of the pair of frames.

(12) The solid-state imaging element according to (1), in which the comparator includes a comparison machine that compares each of levels of a pair of input terminals and outputs a comparison result, and an input-side selector that selects any one of the vertical signal line and a node of the reference voltage and connects the selected one to one of the pair of input terminals, and a ramp signal is input to the one of the pair of input terminals.

(13) The solid-state imaging element according to (12), further including: a control circuit that determines whether or not illuminance is higher than a predetermined value on the basis of the comparison result and outputs a control signal: a counter that counts a count value over a period until the comparison result is inverted and outputs the digital signal indicating the count value; a correlated double sampling (CDS) processing unit that executes correlated double sampling processing on the digital signal; and an output-side selector that outputs any one of the digital signal on which the correlated double sampling processing has been executed and a digital signal of a predetermined value on the basis of the control signal.

(14) The solid-state imaging element according to any one of (1) to (13), further including: a vertical scanning circuit that controls a plurality of rows in each of which a predetermined number of pixels are aligned and performs control of starting exposure at the same time, in which the first and second capacitance elements, the previous-stage circuit, the selection circuit, the next-stage reset transistor, and the next-stage circuit are arranged in each of the pixels.

(15) The solid-state imaging element according to any one of (1) to (14), in which the previous-stage circuit is provided on a first chip, and the first and second capacitance elements, the selection circuit, the next-stage reset transistor, and the next-stage circuit are provided on a second chip.

(16) The solid-state imaging element according to (15), in which the comparator is provided on the second chip.

(17) The solid-state imaging element according to (15), in which the comparator is provided on a third chip.

REFERENCE SIGNS LIST

100 Imaging device
110 Imaging lens
120 Recording unit
130 Imaging control unit
200 Solid-state imaging element
201 Upper pixel chip
202, 204 Lower pixel chip
203 Circuit chip
211 Vertical scanning circuit
212 Timing control circuit
213 DAC
220 Pixel array unit
221 Upper pixel array unit
222 Lower pixel array unit
250 Load MOS circuit block
251, 527 Load MOS transistor
260 Column signal processing circuit
261, 270 ADC
262, 290 Digital signal processing unit
271 Counter
280, 530 Comparator
281, 292 Selector
282, 283, 321, 322 Capacitance element
284, 286 Auto-zero switch
285, 511 Comparison machine
291 CDS processing unit
300 Pixel
301 Effective pixel
310 Previous-stage circuit
311 Photoelectric conversion element
312 Transfer transistor
313 FD reset transistor
314 FD
315 Previous-stage amplification transistor
316 Current source transistor
317 Discharge transistor
323 Previous-stage reset transistor
324 Previous-stage selection transistor
330 Selection circuit
331, 332 Selection transistor
341 Next-stage reset transistor
350 Next-stage circuit
351 Next-stage amplification transistor
352 Next-stage selection transistor
361 Sampling transistor
410 Pad
420 Regulator
421 Low pass filter
422 Buffer amplifier
423 Capacitance element
430 Dummy pixel
431 Reset transistor
432 FD
433 Amplification transistor
434 Current source transistor
440 Switching unit
441 Inverter
442 Switching circuit
443, 444 Switch
500, 501 Reference voltage generation circuit
510 Current source
512, 513 pMOS transistor 514 nMOS transistor
515, 521 Resistor
522 Bias selection unit
523 Bias setting circuit
524 Source follower circuit
525 Amplification transistor
526 Selection transistor
528 Variable current source
12031 Imaging unit

The invention claimed is:

1. A solid-state imaging element, comprising:
 a first capacitance element and a second capacitance element;
 a previous-stage circuit configured to generate a specific reset level and a signal level in accordance with an amount of exposure in order and cause the first capacitance element and the second capacitance element to hold the specific reset level and the signal level;
 a next-stage reset transistor configured to initialize a level of a next-stage node connected to one of the first capacitance element or the second capacitance element to a specific potential that is lower than a power source voltage of the previous-stage circuit;
 a next-stage circuit configured to read the specific reset level and the signal level via the next-stage node and output the specific reset level and the signal level to a vertical signal line;
 a reference voltage generation circuit configured to generate a reference voltage with reference to the specific potential; and
 a comparator configured to compare the reference voltage and a potential of the vertical signal line.

2. The solid-state imaging element according to claim 1, wherein the reference voltage generation circuit includes:
 a current source configured to supply a specific reference current;
 a predetermined number of resistors that are connected in series between the current source and a node of a specific potential;
 a bias selection unit configured to select, as a bias voltage, a voltage of any one of connection nodes of each of the current source, the specific number of resistors, and the node of the specific potential; and
 a source follower circuit configured to generate the reference voltage from the bias voltage.

3. The solid-state imaging element according to claim 1, wherein the reference voltage generation circuit includes:
 a variable current source configured to supply a current in accordance with a control signal as a reference current;
 a resistor that is inserted between the variable current source and a node of the specific potential; and
 a source follower circuit configured to generate the reference voltage from a bias voltage of a connection node of the variable current source and the resistor.

4. The solid-state imaging element according to claim 1, further comprising:
 a sampling transistor configured to open and close a path between the previous-stage circuit and a connection node to which one end of each of the first capacitance element and the second capacitance element is commonly connected,
 wherein the other end of the second capacitance element is connected to the next-stage node.

5. The solid-state imaging element according to claim 1, further comprising:
 a selection circuit configured to:
 perform control of connecting one of the first capacitance element and the second capacitance element to a specific next-stage node;
 perform control of disconnecting both the first capacitance element and the second capacitance element from the next-stage node; and
 perform control of connecting the other one of the first capacitance element and the second capacitance element to the next-stage node in order,
 wherein the next-stage reset transistor is further configured to initialize a level of the next-stage node when both the first capacitance element and the second capacitance element are disconnected from the next-stage node.

6. The solid-state imaging element according to claim 5, further comprising:
 a previous-stage selection transistor configured to open and close a path between the previous-stage circuit and a specific previous-stage node; and
 a previous-stage reset transistor configured to initialize a level of the specific previous-stage node,
 wherein one end of each of the first capacitance element and the second capacitance element is commonly connected to the specific previous-stage node, and the other end of each of the first capacitance element and the second capacitance element is connected to the selection circuit.

7. The solid-state imaging element according to claim 5, wherein the previous-stage circuit includes:
 a photoelectric conversion element;
 a previous-stage transfer transistor configured to transfer an electric charge from the photoelectric conversion element to a floating diffusion layer;
 a first reset transistor configured to initialize the floating diffusion layer; and
 a previous-stage amplification transistor configured to amplify a voltage of the floating diffusion layer and output the voltage to a specific previous-stage node,
 one end of each of the first capacitance element and the second capacitance element is commonly connected to the specific previous-stage node, and
 the other end of each of the first capacitance element and the second capacitance element is connected to the selection circuit.

8. The solid-state imaging element according to claim 7, further comprising:
 a switching unit configured to adjust a source voltage to be supplied to a source of the previous-stage amplification transistor,
  wherein the previous-stage circuit further includes a current source transistor that is connected to a drain of the previous-stage amplification transistor, and
  the current source transistor is further configured to transition from an ON state to an OFF state after an end of an exposure period.

9. The solid-state imaging element according to claim 7, wherein the previous-stage circuit further includes a discharge transistor configured to discharge the electric charge from the photoelectric conversion element.

10. The solid-state imaging element according to claim 7, further comprising:
 a control configured to control a reset power source voltage of the previous-stage circuit,
 wherein the first reset transistor is further configured to initialize a voltage of the floating diffusion layer to the reset power source voltage, and the control circuit is further configured to change, in a reading period for reading the specific reset level and the signal level, the reset power source voltage to a voltage that is different from a voltage in an exposure period.

11. The solid-state imaging element according to claim 1, further comprising:
a digital signal processing unit configured to add a pair of continuous frames,
wherein the previous-stage circuit is further configured to cause one of the first capacitance element or the second capacitance element to hold the specific reset level and then cause the other one of the first capacitance element or the second capacitance element to hold the signal level during an exposure period of one of the pair of frames, and
cause the other one of the first capacitance element or the second capacitance element to hold the specific reset level and then cause the one of the first capacitance element or the second capacitance element to hold the signal level during an exposure period of the other one of the pair of frames.

12. The solid-state imaging element according to claim 1, wherein the comparator includes:
a comparison machine configured to compare each of levels of a pair of input terminals and output a comparison result, and
an input-side selector configured to select one of the vertical signal line or a node of the reference voltage and connect the selected one to one of the pair of input terminals, and
a ramp signal is input to the one of the pair of input terminals.

13. The solid-state imaging element according to claim 12, further comprising:
a control circuit configured to:
determine whether or not illuminance is higher than a specific value based on the comparison; and
outputs a control signal;
a counter configured to:
count a count value over a period until the comparison result is inverted; and
output a first digital signal indicating the count value;
a correlated double sampling (CDS) processing unit configured to execute correlated double sampling processing on the first digital signal; and
an output-side selector configured to output any one of the first digital signal on which the correlated double sampling processing has been executed a second digital signal of a specific value based on the control signal.

14. The solid-state imaging element according to claim 1, further comprising:
a vertical scanning circuit configured to control a plurality of rows in each of which a specific number of pixels are aligned and perform control to start exposure at simultaneously,
wherein the first capacitance element, the second capacitance element, the previous-stage circuit, the selection circuit, the next-stage reset transistor, and the next-stage circuit are arranged in each of the pixels.

15. The solid-state imaging element according to claim 1, wherein the previous-stage circuit is on a first chip, and
the first capacitance element, the second capacitance element, the selection circuit, the next-stage reset transistor, and the next-stage circuit are on a second chip.

16. The solid-state imaging element according to claim 15, wherein the comparator is on the second chip.

17. The solid-state imaging element according to claim 15, wherein the comparator is on a third chip.

* * * * *